(12) United States Patent
Monari et al.

(10) Patent No.: US 9,674,435 B1
(45) Date of Patent: Jun. 6, 2017

(54) VIRTUAL REALITY PLATFORMS FOR CAPTURING CONTENT FOR VIRTUAL REALITY DISPLAYS

(71) Applicants: Lawrence Maxwell Monari, Palm Bay, FL (US); Lawrence Scott Monari, Palm Bay, FL (US)

(72) Inventors: Lawrence Maxwell Monari, Palm Bay, FL (US); Lawrence Scott Monari, Palm Bay, FL (US)

( * ) Notice: Subject to any disclaimer, the term of this patent is extended or adjusted under 35 U.S.C. 154(b) by 0 days.

(21) Appl. No.: 15/341,189

(22) Filed: Nov. 2, 2016

Related U.S. Application Data

(63) Continuation-in-part of application No. 15/202,801, filed on Jul. 6, 2016.

(51) Int. Cl.
*H04N 5/232* (2006.01)
*G06F 3/16* (2006.01)
*G06T 19/00* (2011.01)
*H04N 13/02* (2006.01)

(52) U.S. Cl.
CPC ........... *H04N 5/23238* (2013.01); *G06F 3/16* (2013.01); *G06T 19/006* (2013.01); *H04N 13/0203* (2013.01)

(58) Field of Classification Search
CPC .. H04N 5/23238; H04N 13/0203; G06F 3/16; G06T 19/006
See application file for complete search history.

(56) References Cited

U.S. PATENT DOCUMENTS

| | | | | |
|---|---|---|---|---|
| 6,232,735 B1* | 5/2001 | Baba | ...................... | B25J 9/1689 318/567 |
| 6,665,003 B1* | 12/2003 | Peleg | ................... | G06T 3/4038 348/36 |
| 6,831,677 B2* | 12/2004 | Peleg | ................... | G06T 3/4038 348/36 |
| 6,917,701 B2* | 7/2005 | Martins | .............. | H04N 5/23238 345/419 |
| 7,193,645 B1* | 3/2007 | Aagaard | ................ | H04N 5/222 348/157 |
| 8,959,555 B2* | 2/2015 | Monari | ................ | H04N 5/2252 348/143 |
| 9,167,228 B2* | 10/2015 | Monari | ................ | H04N 5/2252 |
| 9,270,976 B2* | 2/2016 | Houvener | .............. | G03B 35/08 |

(Continued)

FOREIGN PATENT DOCUMENTS

BR    2009004708 A2 *  7/2011

*Primary Examiner* — John Villecco

(57) ABSTRACT

Three different systems are disclosed for producing data bases that are used to drive virtual reality display apparatus. The systems employ 3-D stereo camera pairs, airborne microphones, conduction microphones, physical and chemical sensors, CPU's and supporting electronics. The data bases can be used by virtual reality audiences in real time as the data bases are created or they can be stored and used at a later time. The systems are dedicated to eliminating artifacts that would otherwise tend to interfere with the enjoyment of the virtual reality experience for virtual reality viewing audiences. The systems cover multidimensional video content, multidimensional audio content, multidimensional physical content and multidimensional chemical content. The systems are intended to be set up inside a venue for capturing VR content.

14 Claims, 22 Drawing Sheets

(56) References Cited

U.S. PATENT DOCUMENTS

| | | | | |
|---|---|---|---|---|
| 2003/0210329 A1* | 11/2003 | Aagaard | H04N 7/181 | 348/159 |
| 2004/0183941 A1* | 9/2004 | McCutchen | H04N 5/2251 | 348/373 |
| 2005/0104999 A1* | 5/2005 | Wada | H04N 13/0239 | 348/373 |
| 2005/0179774 A1* | 8/2005 | Fletcher | H04N 5/2252 | 348/61 |
| 2006/0013469 A1* | 1/2006 | Wang | B25J 5/007 | 382/153 |
| 2006/0072020 A1* | 4/2006 | McCutchen | G03B 17/02 | 348/218.1 |
| 2007/0247519 A1* | 10/2007 | Riaziat | G09F 19/12 | 348/37 |
| 2008/0027591 A1* | 1/2008 | Lenser | G05D 1/0274 | 701/2 |
| 2008/0281467 A1* | 11/2008 | Pinter | H04L 63/029 | 700/245 |
| 2012/0105574 A1* | 5/2012 | Baker | G03B 35/08 | 348/36 |
| 2012/0229596 A1* | 9/2012 | Rose | G06T 3/4038 | 348/36 |
| 2013/0176401 A1* | 7/2013 | Monari | H04N 5/2252 | 348/47 |
| 2013/0176403 A1* | 7/2013 | Varga | H04N 13/0242 | 348/48 |
| 2014/0013361 A1* | 1/2014 | Monari | H04N 5/2252 | 725/62 |
| 2014/0340487 A1* | 11/2014 | Gilliland | G01S 7/4863 | 348/48 |
| 2015/0228028 A1* | 8/2015 | Friedman | G06Q 40/08 | 705/4 |
| 2015/0341557 A1* | 11/2015 | Chapdelaine-Couture | G03B 35/08 | 348/38 |
| 2015/0341617 A1* | 11/2015 | Cole | G03B 17/561 | 348/36 |
| 2015/0347827 A1* | 12/2015 | Dickinson | G06K 9/00302 | 382/103 |
| 2015/0348580 A1* | 12/2015 | van Hoff | G11B 19/20 | 348/38 |
| 2016/0239978 A1* | 8/2016 | Cole | G06T 7/593 | |
| 2016/0303735 A1* | 10/2016 | Nappo | B25J 9/161 | |
| 2016/0352982 A1* | 12/2016 | Weaver | H04N 5/23238 | |
| 2016/0373640 A1* | 12/2016 | van Hoff | H04N 5/23206 | |
| 2016/0381257 A1* | 12/2016 | Kuo | H04N 5/2252 | 348/38 |
| 2017/0019588 A1* | 1/2017 | Gordon | H04N 5/23203 | |
| 2017/0064240 A1* | 3/2017 | Mangat | G06F 17/30268 | |

\* cited by examiner

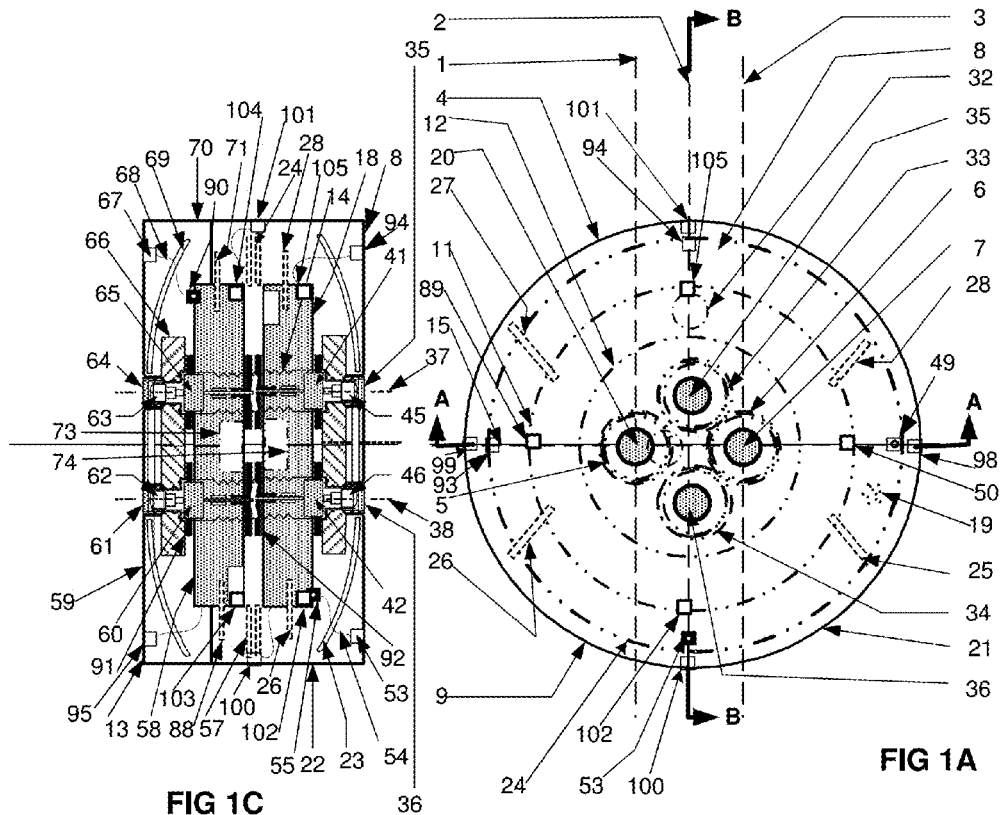
FIG 1C
FIG 1A
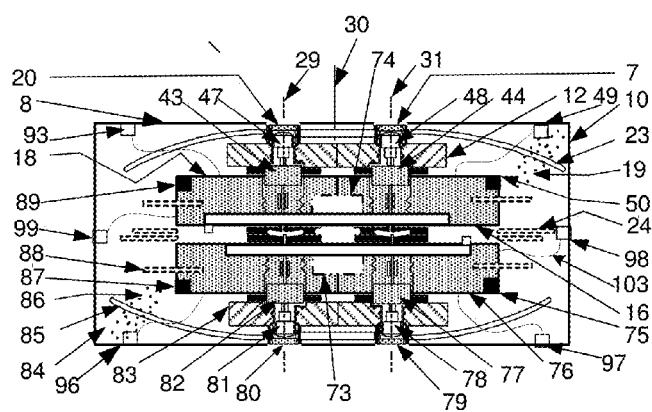
FIG 1B

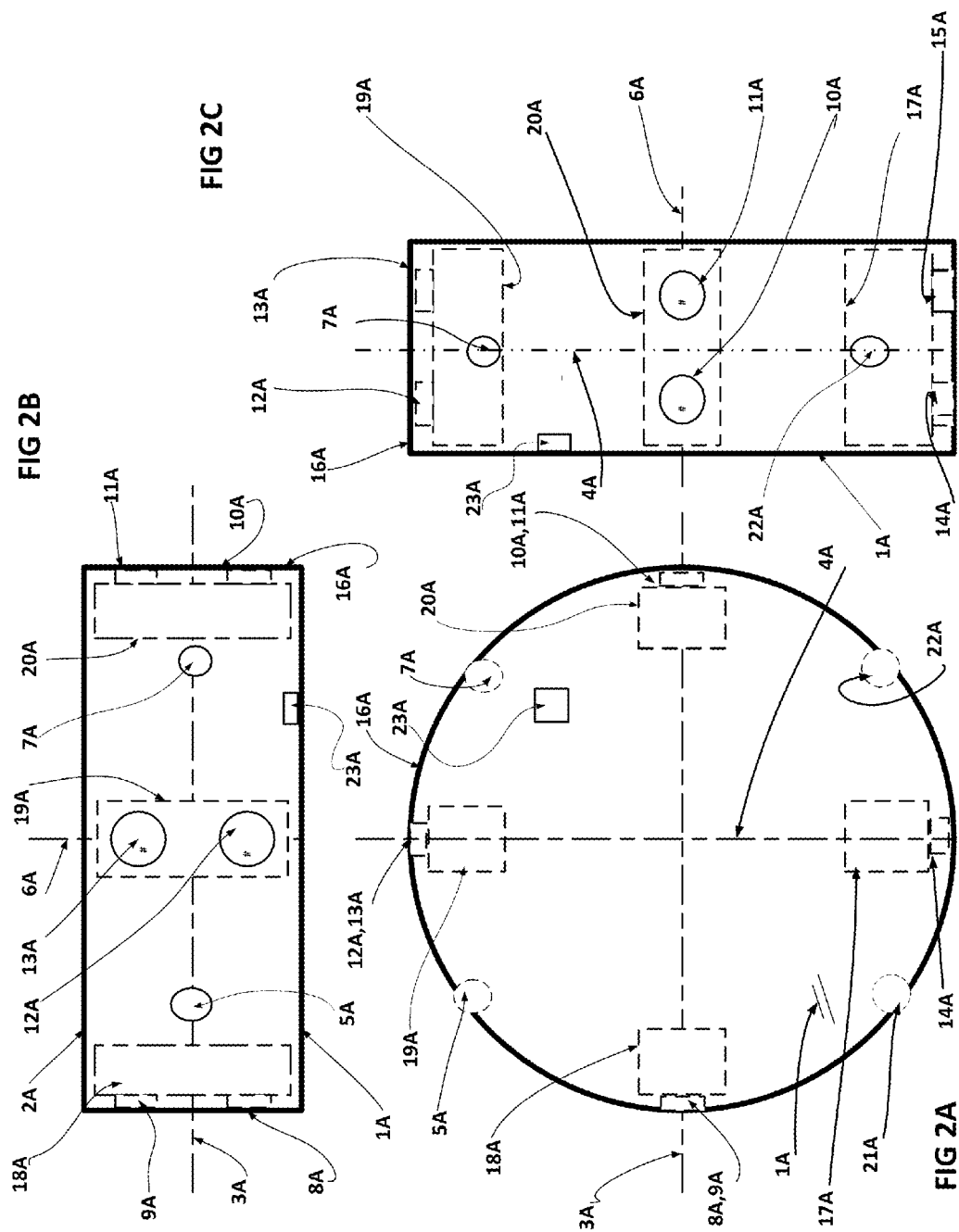

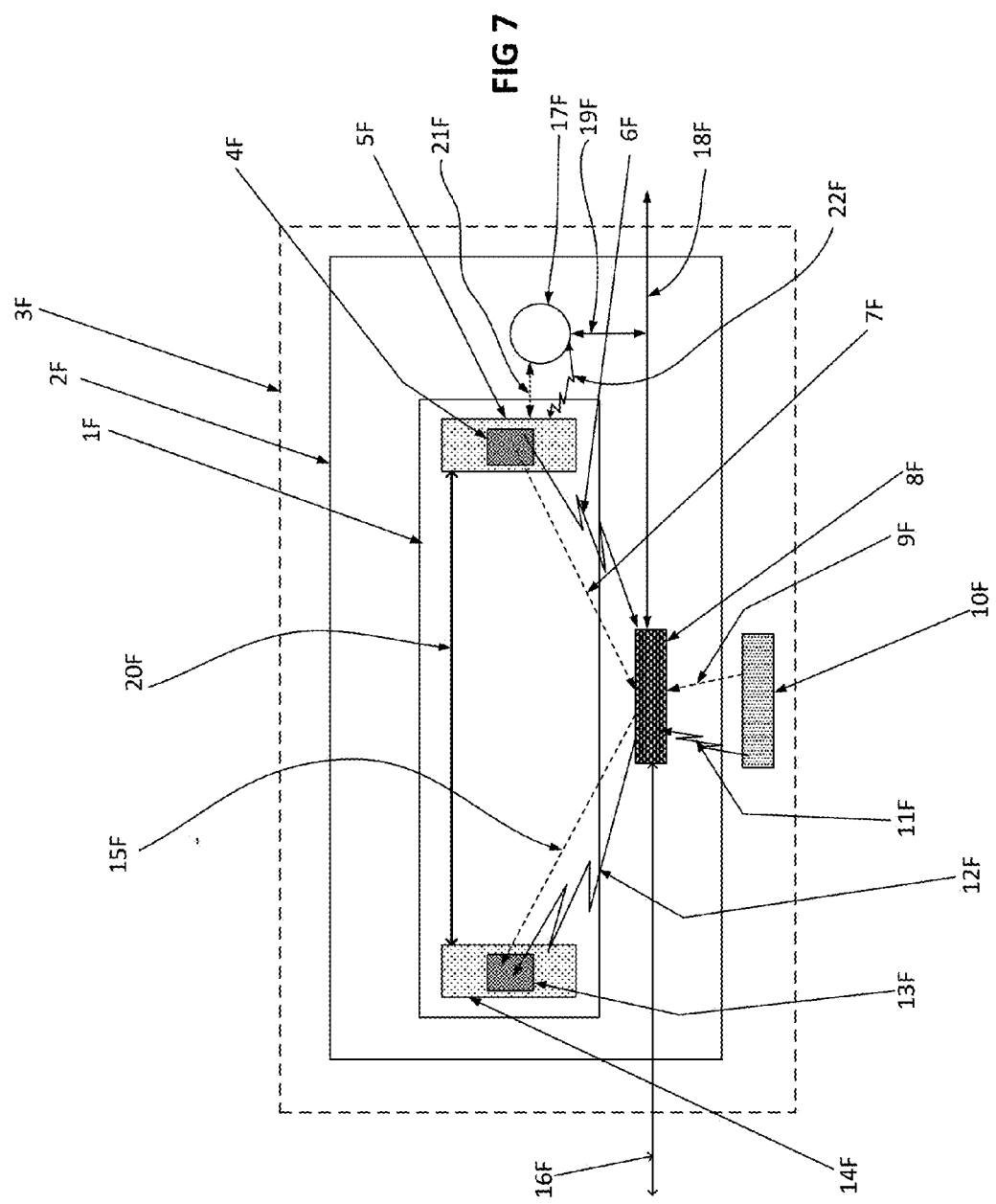

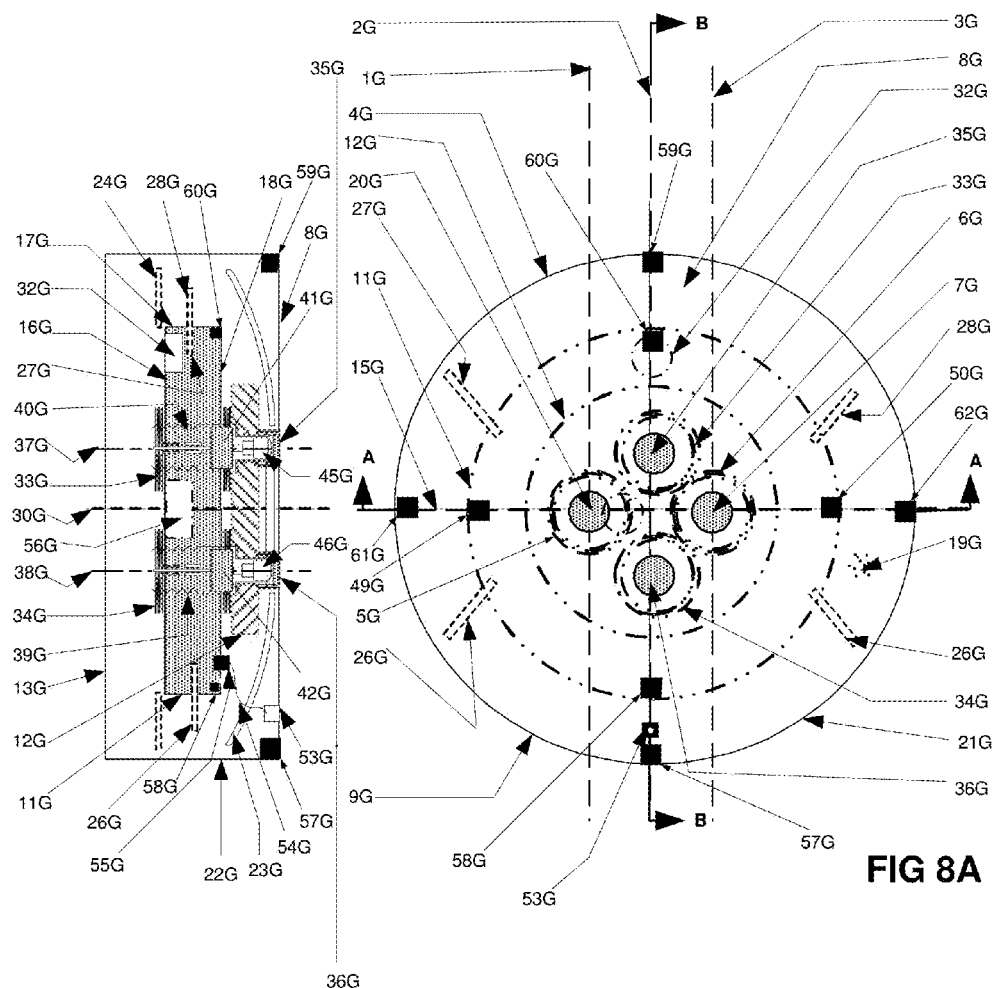
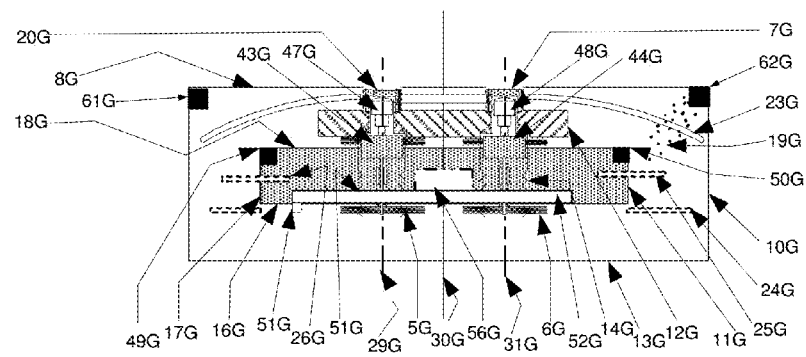

FIG 15A  FIG 15B

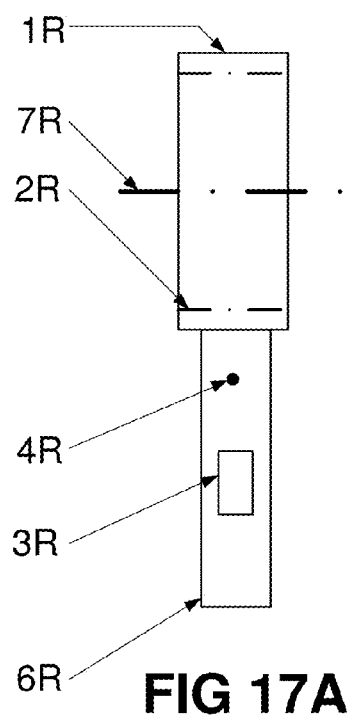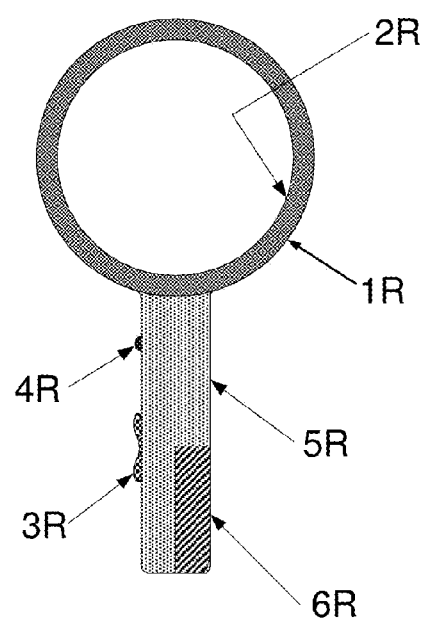
FIG 17A   FIG 17B

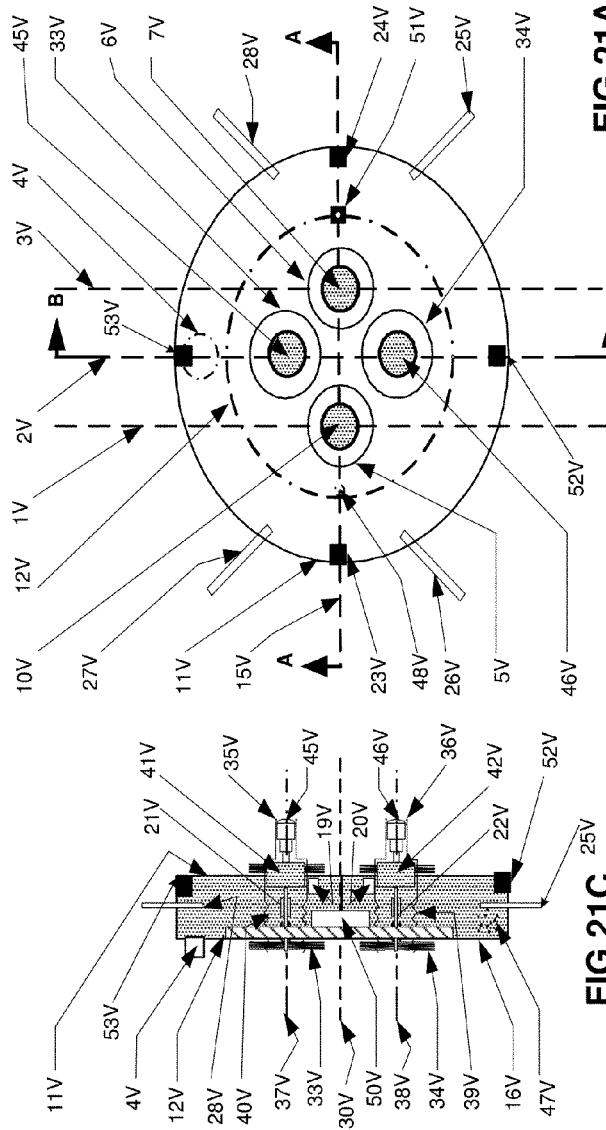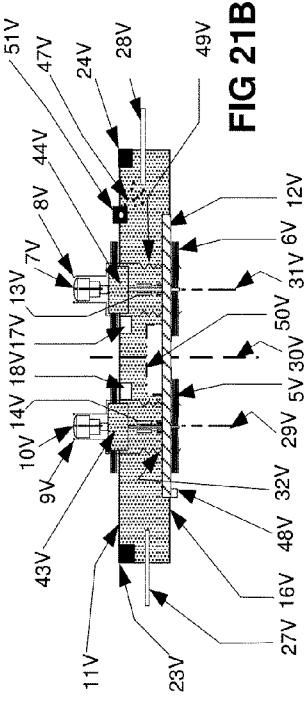

VIRTUAL REALITY PLATFORMS FOR CAPTURING CONTENT FOR VIRTUAL REALITY DISPLAYS

BACKGROUND OF THE INVENTION

1. Field of the Invention

The present invention relates generally to virtual reality (VR), and in particular to virtual reality platforms that capture, process and communicate VR multimedia content from a VR venue to VR viewing audiences.

2. Description of the Prior Art

Over time, VR is becoming more dependent on multidimensional video content and multidimensional audio content. Multidimensional physical content and multidimensional chemical content is close at hand in the near future to further enhance the VR experience.

Prior art devices have been disclosed for capturing multimedia content i.e. multimedia video content and multimedia audio content from inside VR venues. The multimedia content captured by these prior art devices is used to drive generic VR display apparatus used by the VR viewing audiences to enjoy the VR experience.

Three new VR modules are disclosed in the present invention to enhance the capture of multidimensional video content, multidimensional audio content, multidimensional physical content and multidimensional chemical content inside VR venues.

1. It would be useful to camouflage the surfaces of VR modules to match the color, texture etc. of the VR venue while a VR session is in progress to make the VR modules inconspicuous to the players in sports venues during games.
2. It would be useful to make the materials and veneers chosen to be used for VR modules in sports VR venues to play the same as the regular sports paraphernalia with regard to i.e. texture, resilience, rigidity, and durability, so that coming into contact with a VR module doesn't alter the feel of the game.
3. It would be useful for the VR module to capture the entire 360 degree three dimensional spherical field of view in the space around the VR module without artifacts.
4. It would be useful for some VR modules to have a disk like shape for them to be conveniently precision loaded and aligned into an easily bored precision cylindrical hole in the floor, ground, ice or walls of the VR venue in order to have a vantage point for capturing multimedia content, such as for example a boxing ring, a basketball court, an ice hockey rink, and an symphony orchestra stage platform.
5. It would be useful for the multimedia video content to be captured in 3-D.
6. It would be useful for having VR module camera configurations with the lines of sight of the cameras pointing in opposite directions 180 degrees apart,
7. It would be useful for the 3-D interpupillary distance to be capable of being varied over a wide range in order to produce special 3-D entertaining effects for the VR viewing audience.
8. It would be useful for an authorized operator to have control of the magnitude of the 3-D effects.
9. It would be useful for the authorized operator to have control of the multidimensional sound effects.
10. It would be useful for the authorized operator to control the distance between microphones over a wide range in order to get control of the multidimensional sound effects and 3-D effects.
11. It would be useful for the multimedia audio content to be captured in multidimensional sound.
12. It would be useful for the captured multimedia content to be simultaneously streamed on to the Internet for Internet users as well as being broadcast to TV viewers, as well as being transmitted to VR viewing audiences.
13. It would be useful for the multimedia content to be captured by a moving system of VR modules.
14. It would be useful for the video and audio multimedia content to be stabilized despite the motion of the capturing VR modules.
15. It would be useful for the VR modules to measure and communicate the physical and chemical states of a VR venue, like wind, rain, snow, weather, the presence of gases, voltages, charge, smells, breath test, alcohol etc. The physical and chemical states are known more commonly as physical media content and chemical media content.
16. It would be useful for an array of VR modules to be deployed in chosen locations in VR venues to provide exciting and entertaining VR experiences.
17. It would be useful for the VR modules to employ a flat image sensor array of pixel elements disposed in at least one of a circular shape.
18. It would be useful for the VR modules to employ a corrugated bellows for adjusting the line of sight of the 3-D stereo camera pairs.
19. It would be useful for the VR modules to employ an array of microphones for capturing airborne sounds and an array of microphones for capturing conducted sounds.
20. It would be useful for the VR modules to employ a CPU configured for processing and recording and for storing and for retrieving multimedia content.
21. It would be useful for the VR modules to be mobile inside the VR venue and navigate under the control of an officially authorized operator.
22. It would be useful for each of the VR modules to communicate their captured and processed multimedia content by wireless, fiber optics and copper cable links.
23. It would be useful for the authorized operator to mechanically rotate the camera image sensors about their optical/line of sight axis.
24. It would be useful for the VR modules to capture video frames covering a continuous 360 degree full spherical field of view collage around the VR module without artifacts.
25. It would be useful for the VR modules to capture a collage of video frames using 3-D stereo camera pair's arranged at 90 degree intervals around the perimeter of the VR module's structure with lines of sight that look radially outward from the center of the structure.
26. It would be useful for the VR modules to use multipoint diversity reception techniques for VR venues whose electrical noise and interference interferes with the VR modules wireless communications.

BRIEF SUMMARY OF THE INVENTION

This invention relates to VR platforms, otherwise referred to in the present invention as VR modules, for capturing and processing and recording and storing and retrieving and communicating processed VR multimedia content from inside VR venues, and for communicating the processed VR multimedia content in real time or near real time or in the distant future to VR viewing audiences via generic VR display apparatus. Three new VR modules are disclosed in the present invention to enhance the capture of multidimensional video content, multidimensional audio content, multidimensional physical content and multidimensional chemical content inside VR venues.

Nomenclature and definitions used for the descriptions in the present invention:
1. A VR venue refers to a venue where one or more VR modules are positioned to capture VR multimedia content of the VR venue during a period of time referred to as a VR session.
2. VR multimedia content refers to video and audio content and physical and chemical content like weather, the presence of gases, voltages, charge, smells, breath test, alcohol, barometric readings.
3. Various different VR platforms are disclosed in the present invention for capturing the VR multimedia content of a VR venue during a VR session.
4. A VR session is the time interval spent by the VR modules positioned inside the VR venue for capturing VR multimedia content at a VR venue.
5. The VR modules are instrumented with TV cameras, microphones, CPU microprocessors, software, electronics and physical and chemical sensors to capture and communicate VR multimedia content of the VR venue to generic VR display apparatus used by a VR viewing audience in order to experience the VR venue in virtual reality.
6. The VR viewing audience consists of persons using VR display apparatus.
7. An authorized operator is a person having special encryption codes and officially approved to operate the VR modules within the VR venue.
8. Single point non diversity reception refers to a wireless communication technique whereby a single physical repeater antenna array location near to or within a VR venue is used to convey the radio frequency signals traveling to and from the VR module.
9. Multipoint diversity reception refers to a wireless communication technique whereby a network of multiple physical repeater antenna arrays are located near to or within a VR venue and are used to convey the radio frequency signals traveling to and from the VR module.

SPECIFICATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BRIEF DESCRIPTION OF THE SEVERAL VIEWS OF THE DRAWINGS

In order to more fully understand the objects of the invention, the following detailed description of the illustrative embodiments should be read in conjunction with the appended figure drawings, wherein:

FIG. 1A shows a top view of a disk like VR module having four 3-D cameras mounted on its two flat surfaces.

FIG. 1B shows a side view of a disk like VR module having four 3-D cameras mounted on its two flat surfaces.

FIG. 1C shows a side view of a disk like VR module having four 3-D cameras mounted on its two flat surfaces.

FIG. 2A shows a side view of a disk like VR module having four 3-D cameras mounted around its rim.

FIG. 2B shows a edge view of a disk like VR module having four 3-D cameras mounted around its rim.

FIG. 2C shows a edge view of a disk like VR module having four 3-D cameras mounted around its rim.

FIG. 7 is a top view of a typical VR venue that has been configured and equipped with two VR modules, for both televising from inside the VR venue, and for streaming from inside the VR venue, using bi-directional wireless radio wave communication links and/or bi-directional fiber optics cable and bi-directional high speed copper network communications cable links.

FIG. 8A is a top view of a four camera single sided VR module.

FIG. 8B is a front view of the four camera single sided VR module.

FIG. 8C is a side view of the four camera single sided VR module.

FIG. 17A shows a side view a hand-held remote control unit.

FIG. 17B shows a top view of a hand-held remote control unit.

FIG. 21A is a top view of the electronics layout of a four-camera wireless instrumentation package.

FIG. 21B is a side view of the electronics layout of a four-camera wireless instrumentation package.

FIG. 21C is a side view of the electronics layout of a four-camera instrumentation package configured with wireless and fiber optics/copper cable network communications links.

DETAILED DESCRIPTION OF THE DRAWINGS

Figure 3:
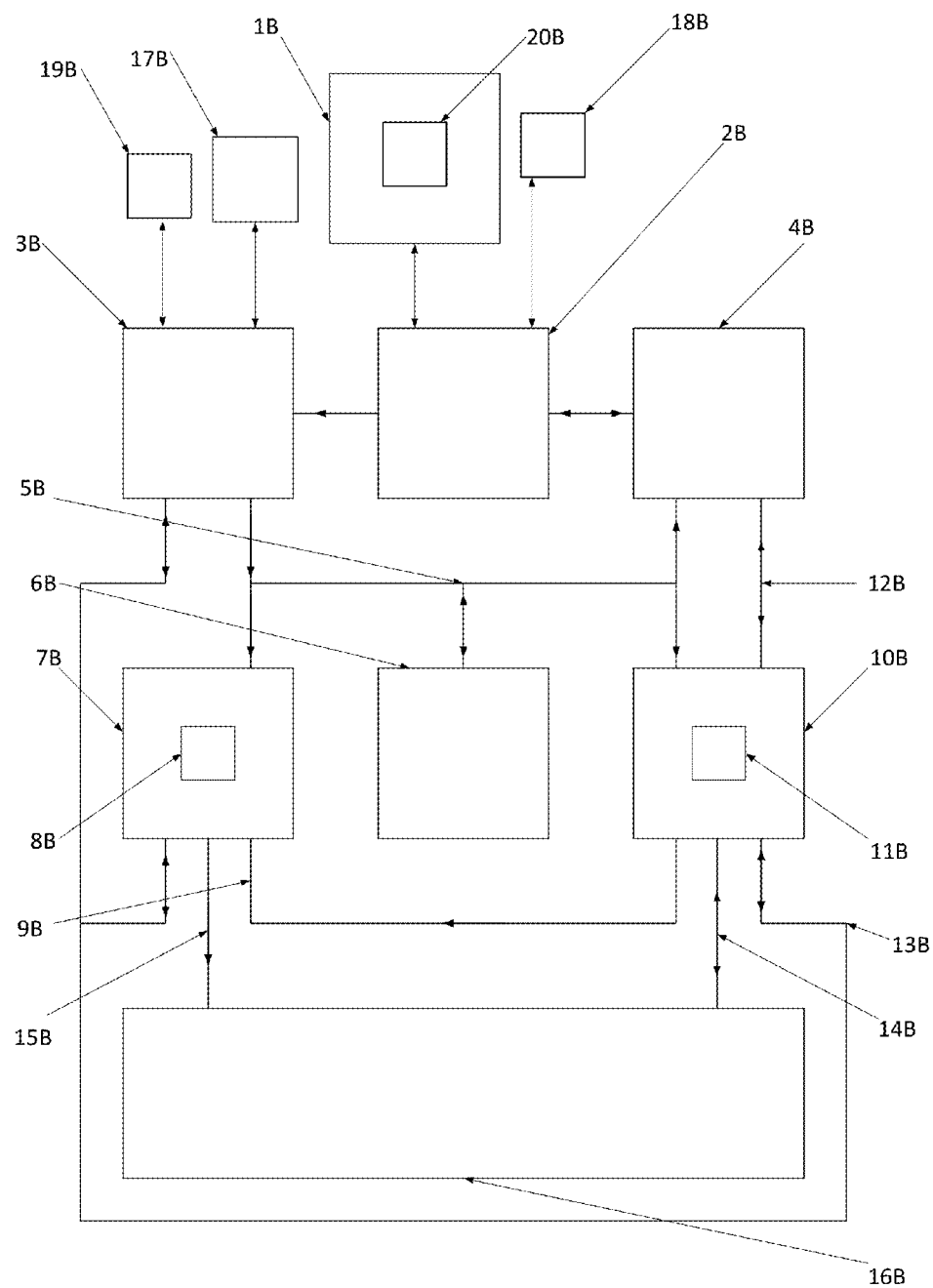
FIG. 3 is the block diagram of the power supply and battery charging circuits inside the VR modules.

FIG. 1A and FIG. 1B and FIG. 1C

The detailed physical elements disclosed in the VR module drawings shown in FIG. 1A and FIG. 1B and FIG. 1C are identified as follows: 1 is the y-axis of camera 43. 2 is the y-axis of symmetry of the VR module. 3 is the y-axis of camera 44. 4 is the side of the VR module. 5 is a lower induction coil used to charge the battery pack inside the VR module. 6 is a lower induction coil used to charge the battery pack inside the VR module. 7 is a plane-parallel-flat optical window. 8 is the top surface of the VR module. 9 is the front side of the VR module. 10 is the side of the VR module. 11 is the central hub of the VR module containing the battery pack. 12 is the buffer plate. 13 is the edge of the bottom of the VR module. 14 is the bellows section of the VR module belonging to optical window 35. 15 is the x-axis of symmetry of the VR module. 16 is the bottom of the VR module. 17 (not shown). 18 is the top of the VR module. 19 is the molded shell material of the VR module. 20 is the plane-parallel-flat optical window. 21 is the side of the VR module. 22 is the side of the VR module. 23 is the upper protective cover plate. 24 is the lower protective cover plate. 25 is a wireless radio antenna. 26 is a wireless radio antenna. 27 is a wireless radio antenna. 28 is a wireless radio antenna, 29 is the z-axis of the camera whose optical window is 20. 30 is the z-axis of the VR module. 31 is the z-axis of the camera whose optical window is 7. 32 is a fiber optics/copper cable connector in the bottom of the VR module. 33 is a lower induction coil. 34 is a lower induction coil. 35 is an optical window. 36 is an optical window. 37 is the z-axis of the camera whose optical window is 35. 38 is the z-axis of the camera whose optical window is 36. 39 is the bellows section of the VR module belonging to optical window 36. 40 (not shown). 41 is a camera. 42 is a camera. 43 is a camera. 44 is a camera. 45 is a camera lens. 46 is a camera lens. 47 is a camera lens. 48 is a camera lens. 49 is a microphone. 50 is a microphone. 51 is a gas valve. 52 is an access lid heat sink. 53 is a microphone. 54 is the microphone cable. 55 is the microphone connector. 56 (not shown). 57 is the lower protective cover plate. 58 is the top of the VR module. 59 is the bottom surface of the VR module. 60 is a camera. 61 is an optical window. 62 is a camera lens. 63 is a camera lens. 64 is an optical window. 65 is a camera. 66 is a buffer plate assembly. 67 is a microphone. 68 is a microphone cable. 69 is the upper cover plate. 70 is the side of the VR module. 71 is a wireless radio antenna. 72 is a lower protective cover plate. 73 is a battery pack. 74 is a battery pack. 75 is a microphone. 76 is the bottom of the VR module. 77 is a camera. 78 is a camera lens. 79 is an optical window. 80 is an optical window. 81 is a camera lens. 82 is a camera. 83 is a buffer plate assembly. 84 is the molded shell material of the VR module. 85 is the upper protective cover plate. 86 is the molded shell material of the VR module. 87 is a microphone. 88 is a wireless radio antenna. 89 is a microphone. 90 is a microphone connector. 91 is an induction coil. 92 is an induction coil, 93 is a microphone. 94 is a microphone. 95 is a microphone. 96 is a microphone. 97 is a microphone. 98 is a microphone. 99 is a microphone. 100 is a microphone. 101 is a microphone. 102 is a microphone. 103 is a microphone. 104 is a microphone. 105 is a microphone.

FIG. 1A shows a top view of a disk like VR module having four 3-D cameras mounted on its two flat surfaces.

FIG. 1B shows a side view of a disk like VR module having four 3-D cameras mounted on its two flat surfaces.

FIG. 1C shows a side view of a disk like VR module having four 3-D cameras mounted on its two flat surfaces.

The present invention contemplates that the VR module be instrumented with a transceiver and antenna that transmits radio signals encoded with the picture and sound information captured by the VR module to a VR display apparatus used by the VR viewing audience. The present invention contemplates that the VR module that is positioned at the VR venue, is instrumented with cameras and microphones enabling it to capture VR multimedia content comprised of pictures and sounds of the VR venue. The CPU microprocessor shown in FIG. 13 processes the VR multimedia content. The processed VR multimedia content is then communicated to the VR viewing audience using their VR display apparatus in real-time or near real-time. The microprocessor also records and stores a continuous record of the captured processed VR multimedia content in memory inside the VR module. This record may be retrieved and played at a later time to the VR viewing audience.

Referring to the preferred embodiment disclosed in FIG. 1A and FIG. 1B and FIG. 1C, a VR module is equipped with four wireless radio wave 3-D stereo television camera pairs 41 and 42, 43 and 44, 60 and 65, and 77 and 82, and employing single point, multi point and/or multi point diversity reception techniques is specified. Two 3-D stereo camera pairs look out perpendicularly from each of the VR module's two planar surfaces.

The preferred embodiment disclosed in the present invention in FIG. 1A and FIG. 1B and FIG. 1C has an advantage over VR modules having cameras and microphones peering and hearing from only one side. The VR module preferred embodiment in the present invention in FIG. 1A and FIG. 1B and FIG. 1C has cameras and microphones peering out from both of the VR module's two planar surfaces enabling video and sound to be communicated from both sides of the VR module depending on which side is facing upward from the floor of the VR venue. This embodiment is advantageous in the game of ice hockey because either planar side of the VR module may be facing upward from the ice during a game.

The electronics shown in FIG. 21A and FIG. 21B and FIG. 21C 13, 14, 21, 22 contain the CPUs in the VR module.

This embodiment is also advantageous because it provides for three additional microphone channels to be processed by the VR display apparatus into 3-D surround sound for the VR viewing audience.

The VR module is equipped to be enabled, commanded and controlled by administrative data conveyed simultaneously and bi-directionally from/to an authorized operator utilizing wireless radio communication. The VR module uses the same electronics 13, 14, 21, 22 shown in the instrumentation package FIG. 21A and FIG. 21B and FIG. 21C. The VR module shown in FIG. 1A and FIG. 1B and FIG. 1C uses two instrumentation packages that are shown in FIG. 21A and FIG. 21B and FIG. 21C.

In a preferred embodiment, the VR module is approximately three inches in diameter and approximately one inch thick. The color of the VR module is made similar to the background color of the VR venue in order for the VR module to be inconspicuous. In another preferred embodiment, the color of the VR module is made dissimilar to the background color of the VR venue in order for the VR module to be conspicuous so their whereabouts can be easily identified.

The VR module contains identical electronics like 18 and 76 as shown in FIG. 21A and FIG. 21B. The VR module has a set of four TV cameras looking out from each of their respective sides of the VR module. Optical windows protect the cameras and their lenses. In a preferred embodiment, the VR module shell material 19, 84 and 86 is vulcanized hard black rubber to permit the passage of RF to and from its antennas inside the shell. In another preferred embodiment, the VR module shell material 19, 84 and 86 is plastic to permit the passage of RF to and from its antennas inside the shell. In a preferred embodiment, the VR module is three inches in diameter and one inch thick. The distance between the VR module top 8 and its bottom 13 is one inch. Surfaces 8 and 13 are flat and parallel to one another so that the cameras on the top surface and the bottom surface peer out on to the VR venue 180 degrees from one another.

Referring to drawings FIG. 1A and FIG. 1B and FIG. 1C, in a preferred embodiment, the present invention contemplates a VR module, which can wirelessly and autonomously communicate captured VR multimedia content of the VR venue simultaneously from its electronics, and operate under the command and control of an authorized operator.

In the preferred embodiment, the VR module employs two four camera electronics groups like 18 and 76 shown in FIG. 21A and FIG. 21B. In a preferred embodiment, the VR module can be positioned and arranged at the beginning of a VR multimedia session at a VR venue with either of its planar surfaces facing upward from the VR venue floor with its cameras looking skyward. In another preferred embodiment, the VR module can be positioned and arranged at the beginning of a VR multimedia session at a VR venue with either of its planar surfaces facing downward from a ceiling with its cameras looking downward. Multiple VR modules can be used at a VR venue during a VR multimedia session where some VR modules are facing upward, and some VR modules are facing downward, and some VR modules may be simultaneously facing in other directions. In another preferred embodiment, the VR module can be positioned and arranged at the beginning of a VR multimedia session at a VR venue with either of its planar surfaces facing horizontally from a VR venue wall with its cameras looking skyward. Their cylindrical shapes permit VR modules to be mounted in cylindrically cored holes in walls, ceilings and floors with precision. The VR modules can also be hung on walls like paintings. The VR modules can also be hung from ceilings like hanging lamps. The VR modules can also be placed on floors. The VR modules can also be raised above a floor i.e. on a cushion.

In a preferred embodiment, a VR venue can be configured for use with one or more VR modules. The VR venue can be configured with bi-directional wireless radio wave communication links between the VR modules and the viewer's VR multimedia display apparatus. In another preferred embodiment, the VR venue can be configured with bi-directional wireless and/or fiber optics cable/and/or a high speed copper cable network of communications links between the VR modules and the viewer's VR multimedia display apparatus. As with previous preferred embodiments, the present invention provides the VR viewing audience with 3-D stereo pictures and 3-D stereophonic surround sound or multidimensional sound. These links provide for real time communications or near real-time communications. The VR viewer may also use multimedia content recorded previously by the VR modules.

It is understood that as the state of the art in TV camera technology advances, that there will be other better cameras that use other than CCD or CMOS technology. The present invention will work equally well with them as they become available. Therefore, the present invention uses CCD TV and CMOS TV cameras as examples of TV cameras that may be used simply because they are the best that today's technology offers, and are not confined only to their sole use in the future.

The VR module has two identical instrumentation packages like are shown in FIG. 21A and FIG. 21B and FIG. 21C, mounted inside the VR module. Each instrumentation package carries four identical electronics shown in FIG. 21A and FIG. 21B and FIG. 21C as 13, 14, 21, 22. Details of the electronics 13, 14, 21, 22 are specified in FIG. 19A and FIG. 19B and FIG. 19C and FIG. 13 and FIG. 14.

Each of the VR module's electronics shown in FIG. 21A and FIG. 21B and FIG. 21C as 13, 14, 21, 22, carry eight CCD or CMOS sensor arrayed TV cameras, for example 41, 42, 43, and 44, and 60, 65, 77 and 82 respectively shown in FIG. 1A and FIG. 1B and FIG. 1C.

The four cameras 41, 42, 43, and 44 in the top surface of the VR module are arranged into two pairs 41, 42 and 43, 44; where 41 and 42 constitute a stereo camera pair, and 43 and 44 constitute another stereo camera pair.

The four cameras 60, 65, 77 and 82 in the bottom surface of the VR module are arranged into two pairs 60, 65 and 77 and 82; where 60 and 65 constitute a stereo camera pair, and 77 and 82 constitute another stereo camera pair.

In another preferred embodiment, the four cameras 41, 42, 43, and 44 in the top surface of the VR module are arranged into two pairs 41, 43 and 42, 44; where 41 and 43 constitute a stereo camera pair, and 42 and 44 constitute another stereo camera pair; and the four cameras 60, 65, 77 and 82 in the bottom surface of the VR module are arranged into two pairs 60, 65 and 77 and 82; where 60 and 77 constitute a stereo camera pair, and 65 and 82 constitute another stereo camera pair.

The top of the VR module 18 carries four microphones 89, and 50, and 102 and 105. Microphones 89, 50, 102, and 105 are internal to the VR module and hear sounds created by any contact with the VR module by conduction of sound.

Four additional microphones 94, 49, 53 and 93 are recessed below the top surface 8 of the VR module and phased at ninety degree intervals around central axis 30 and wired by cable inside the VR module 18 and hear sounds above 8. An additional four microphones 99, 100, 98 and 101 are mounted and phased at ninety degree intervals and recessed beneath the cylindrical surface 4 between the flat top surface 8 and bottom surface 59, and wired by cable inside the VR module 18.

The bottom of the VR module 18 also carries four microphones 75 and 87, and 103 and 104. Microphones 75 and 87, and 103 and 104 are internal to the VR module and hear sounds created by any contact with the VR module by conduction of sound. Four additional microphones 67, 95, 96, and 97 are mounted recessed beneath the bottom surface 59 of the VR module and phased at ninety degree intervals around 4 and wired by cable (i.e. 68) inside the VR module 18.

The VR module has a total of sixteen microphones. These microphones provide the audio inputs to the VR module 18 which communicates these audio channels via antennas 27, 28, 25, 26, 71, 88, etc. to the VR display apparatus of the VR viewing audience to processes the data to create the outputs needed by the VR viewing audience for the creation of surround sound.

The imagery from each camera in the stereo camera pairs is combined by the processors in the VR display apparatus of the VR viewing audience as 3-D video to the VR viewing audience. On the top surface of the VR module, each camera pair effectively becomes a 3-D stereo camera pair. The first 3-D stereo camera pair is comprised of cameras 41 and 42. The second 3-D stereo camera pair is comprised of cameras 43 and 44. The pairs of cameras 41, 42 and 43, 44 act independently of one another to simultaneously produce two 3-D stereo TV pictures of the VR venue. Each of the cameras 41 and 42 that form the first 3-D stereo camera pair 41, 42 are separated by an interpupillary distance. Each of the cameras 43 and 44 that form the second 3-D stereo camera pair 43, 44 are separated by an interpupillary distance. The bottom surface of the VR module is configured similarly.

The linear distance separation of the optical axes of the two camera lenses that make up the stereo camera pairs is an important function of the buffer plate. The buffer plate is a mechanical mount that establishes the distance measured between the optical axes of the lenses which is defined as the interpupilarly distance between the camera lenses. For example, the interpupilary distance between cameras 41 and 42 is the linear distance between optical axes 37 and 38; the interpupilary distance between cameras 43 and 44 is the linear distance between optical axes 29 and 31. In an alternative preferred embodiment, the cameras are mounted independently of one another in order to reduce cost.

The diameter of the VR module is on or about three inches. This dimension puts a practical limitation on the maximum interpupillary distance between the cameras that make up a 3-D stereo camera pairs. For todays state of the art SD/HD cameras with body diameters of 0.7 inches for example, and assuming a generous clearance of 0.25 inches between the walls of the VR module and the camera bodies, this leaves 1.8 inches for interpupillary distance, or 45.72 mm. Therefore, the axial separation between each 3-D stereo pair of camera lenses can vary up to 46 mm in this example. Therefore, in this example, the separation between 29 and 31 can vary up to 46 mm, and the separation between 37 and 38 can vary up to 46 mm also. It is understood that different interpupillary distances produce different 3-D effects. For example, larger interpupillary distance will produce more striking 3-D effects. In the future, as SD/HD cameras get smaller in diameter we will be able to raise the interpupillary distance i.e. from 46 to 57 mm.

The 3-D stereo camera pair 41 and 42 in the VR module 18 that forms the first 3-D stereo camera pair has optical windows 35 and 36 respectively. The 3-D stereo camera pair 43 and 44 in the VR module 18 that forms the second 3-D stereo camera pair has optical windows 20 and 7 respectively. The two cameras 41 and 42 in the VR module 18 that form the first 3-D stereo camera pair have optical axes 37 and 38. The two cameras 43 and 44 in the VR module 11 that form the second 3-D stereo camera pair have optical axes 29 and 31. The interpupillary distance for both of these 3-D stereo camera pairs is set to be identical.

The lines of sight of the first and of the second 3-D stereo camera pairs are both looking straight upward from the top surface 8 of the VR module along their respective optical axes. Their lines of sight are all parallel to one another. The SD/HD letter box picture formats of cameras 41 and 42 are aligned together. The SD/HD letter box picture formats of cameras 43 and 44 are aligned together also. Video information from all eight cameras is transmitted simultaneously from the VR module to the VR multimedia display apparatus where it is processed for the VR viewing audience.

The SD/HD letter box picture formats of cameras 41 and 42 and 43 and 44 are aligned together so that any two of the four cameras can be configured to be a 3-D stereo camera pair in the VR display apparatus of the VR viewing audience's processing software.

In a preferred embodiment where the VR module has motion, gyroscope data from the VR module's pitch, roll and yaw gyroscope encoders accompanies the video data inside the VR module where the VR module's electronics hardware and software processes the video imagery data to yield stabilized video imagery in the direction of forward motion of the VR module.

The VR module's processing that stabilizes the imagery in its picture frame format also holds the picture upright for communication to the VR display apparatus of the VR viewing audience.

Figure 13:
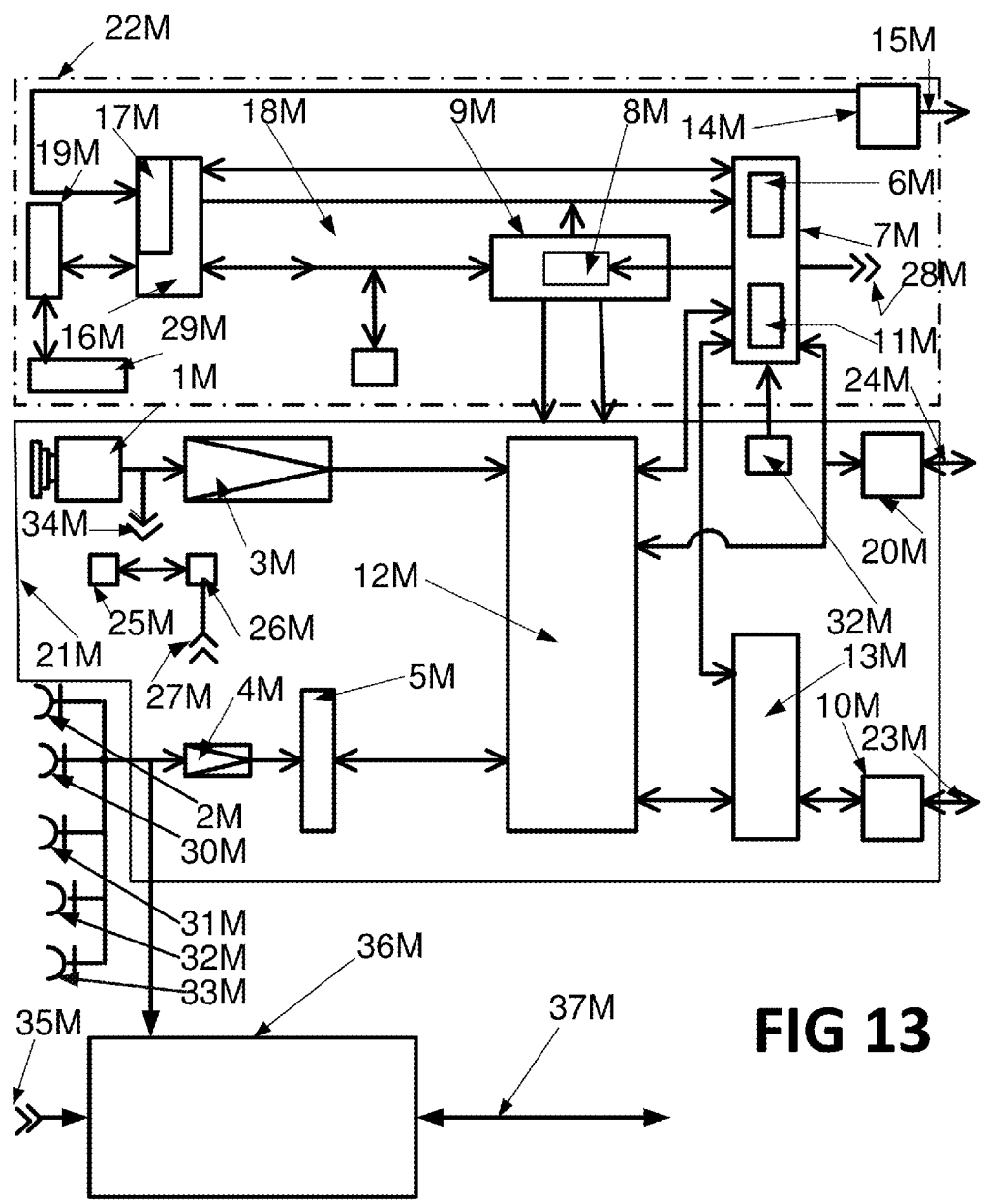
FIG. 13 is the instrumentation package element's signal and data electronics block diagram.

The VR module disclosed in FIG. 1A and FIG. 1B and FIG. 1C uses the electronics shown in FIG. 21A and FIG. 21B and FIG. 21C. The gyroscopic transducers are specified in the electronics block diagram FIG. 13. A detailed example of the operation of the gyroscopic transducers follows as applied to VR modules. Referring to FIG. 13, a self contained three-dimensional gyroscopic transducer 32 is shown. This transducer consists of three separate individual low power semiconductor based encoders. Each of these three encoders is configured at the time of manufacture to respond to a pre-determined action of motion specific to the direction of rotation, forward or backward motion and rise or fall conditions of the VR module in real-time. The VR module's pitch, roll and yaw are encoded. Roll is associated with the spin of the VR module about its vertical z-axis. Each encoder provides a pulse coded binary data output that varies in accordance with the relative direction and rate of movement of the VR module. For example, motion of the VR module during a VR venue session may suddenly accelerate the VR module in a horizontal direction. The amplitude of this acceleration is perceived by the horizontal motion encoder and its resultant pulse coded data output is fed to an interrupt request port of microprocessor 7. The connection between 32 and 7 is such that each of the encoders will accurately convey information about the multiple possibilities of physical motions of the VR module during a typical VR session. This data is combined with the video data, as previously described above, for processing in the VR module to stabilize the video before transmission to the VR display apparatus of the VR viewing audience via the administrative data link established by components 7, 10, 13 and 23 respectively.

An authorized operator is defined as a person or persons given responsibility to remotely intervene in the operation of the VR module(s). The authorized operator communicates with the VR module(s) with his/her laptop computer and hand held unit.

At the time of boot-up, microprocessor 7 in FIG. 13 is instructed by the firmware contents contained within read only memory 6 to continually execute a routine check of the data presented to its interrupt ports at a sampling rate sufficiently high enough so as to accurately convey the resultant pulse coded data output that represents the direction of rotation, forward or backward motion and rise or fall conditions of the VR module in real-time to a computer at the authorized operator for use by special software. The administrative data link referenced above is a bi-directional communications path over which control commands, as well as status data between the VR module and the authorized operator are conveyed. These commands and/or status data consist of data packets or streams that are independent in function of those that are used to convey image and/or sound information to the VR display apparatus of the VR viewing audience but share the same communications transport mechanism overall. This communications transport mechanism is formed whenever the microprocessor within the VR module communicates with the authorized operator over the particular mode of communications connectivity that the VR module has been equipped for i.e. fiber optics, copper cable or wireless radio. This microprocessor is connected via an I/O port to the network transceiver within the VR module and periodically monitors this port for activity. When a data stream arrives at this port from the authorized operator, the microprocessor executes a series of instructions contained in ROM in such a way that it will respond and act only on those commands that are correctly identified based on a unique identification integer code present in the signal that immediately precedes the control data stream contents. If the stream is identified as valid, the microprocessor will execute the received command as determined by the firmware stored in ROM and transmit a status data acknowledgement to the authorized operator. Status data received by the authorized operator's transceiver is handled in a manner similar to the data received by the authorized operator previously described. When the authorized operator's transceiver intercepts an appropriately coded transmission over the particular mode of communications connectivity that the VR module has been equipped for i.e. fiber optics, copper cable or wireless radio, it will respond and act on it in the manner determined by the communications handling provisions of the special software running on the associated authorized operator's computer. For example, when the VR module is first initialized prior to use from an idle position, normally by a command sent over the administrative data link from the authorized operator, microprocessor 7 according to its firmware instructions contained within read only memory 6 initializes the gyroscopic encoders in a zero motion state so that the authorized operator's computer is able to synchronize the previously mentioned special software. During a typical VR venue session the VR module's processor simultaneously receives the image data streams inside the VR module and automatically, using the previously mentioned special software, continuously calculates and applies to the received image data stream temporarily stored in memory the correct amount of counter adjustment necessary to hold the images in an upright stable unscrambled position before transmission to the VR display apparatus of the VR viewing audience. The authorized operator also has the ability to manually issue commands that affect the amount of correction applied to the final image stream. Such commands are very useful in conjunction with other special effects often used during a VR venue session.

Referring back to FIG. 1A and FIG. 1B and FIG. 1C, the VR module has two protective cover plates 23 and 85 facing either of the two planar sides of the VR module. One protective cover plate 23 is on one side of the VR module, and 85 is on the other side of the VR module. The bodies of the protective cover plates 23 and 85 are made spherically dome shaped. The two protective cover plates 24 and 72 are disk-like, and are located in the middle of the VR module, and are made flat with rounded edges like the edges on protective cover plates 23 and 85. The materials chosen for the protective cover plates 23, 85, 24 and 72 in the present preferred embodiment are polycarbonates, ABS or fiber reinforced plastics. Although a variety of other materials would function equally as well, polycarbonates, ABS or fiber reinforced plastics have an advantage in that they are lightweight and stiff, enabling their thickness to remain thin while still delivering the significant stiffness needed to perform their mechanical shielding function in the limited space they can occupy within the VR module. They have an additional advantage in that they are transparent to the transmitted and received radio waves which need to move to and from the antennas 25, 26, 27, 28, 71, 88 etc. inside the VR module without absorption or reflection. In another preferred embodiment, the protective cover plates are absent and not needed; especially in non-hostile VR venues where there is little risk of damage to the VR module. In these common instances the cost to manufacture the VR modules is reduced and very desirable.

18 and 76 are sandwiched between the top and bottom protective cover plates 23 and 85. The purpose of these protective cover plates 23 and 85 is to act as mechanical shields to protect the VR module from being damaged by the environment. During the normal course of a VR venue session, 8 and 13 of the VR module may be hit and crushed. For example, players moving in the VR venue may step on the VR module or slide into it. They may even drop their knees on it. The two protective cover plates 23 and 85 protect the VR module from physical damage due to these hits. The antennas 25, 26, 27, 28, 71, 88 etc. are further protected from damage by the flat disk-like plates 24 and 72.

The space between the planar surfaces 8 and 13 is filled with vulcanized hard rubber or synthetic rubber or plastic material 10, 19, 84 and 86. Synthetic rubber is an example of a material that is used besides vulcanized hard rubber to mold the VR module. When cured, this material 10, 19, 84 and 86 acts to absorb shock and vibration to the contents of VR module. The material 10, 19, 84 and 86 encapsulates the protective cover plates 23 and 85 and maintains their positions inside the molded VR module. The space between the protective cover plates 23 and 85 and the buffer plate assemblies is also filled with the same encapsulating material. When cured, this encapsulating material acts to absorb shock and vibration to the VR module. The encapsulating material encapsulates the buffer plates inside the VR module and thereby maintains their positions centered and coaxial with the mechanical z-axis 30 inside the molded VR module.

In a preferred embodiment, wherein the protective cover plates are absent and not needed, the material 10, 19, 84 and 86 is absent as well and not needed. In these common instances the cost to manufacture the VR modules is reduced as well and is very desirable.

The protective cover plates 23 and 85 are made flat in their innermost regions close to their optical windows 35, 36 and 20, 7 and 61, 64, 79, and 80 respectively. The purpose of making them flat in their innermost regions is to provide maximum protection for the optical windows 35, 36 and 20, 7 and 61, 64, 79, and 80 whose flat surfaces are flush with the planar surfaces 8 and 73 of the VR module. The flat shape enables the protective cover plates 23 and 85 to surround the optical windows 35, 36 and 20, 7 and 61, 64, 79, and 80 of the VR module where the optical windows are most likely to be exposed to the greatest threat of damage due to hits to, and scraping. The protective cover plates 23 and 85 are buried in encapsulating material at the center top of the VR module around the optical windows 35, 36 and 20, 7 and 61, 64, 79, and 80 by approximately ⅓₂ inch or more below 8 and 73 respectively. The dome shape enables the protective cover plates 23 and 85 to come very close to the top center of the VR module where VR venue players will have only grazing contact with its curved surface if they crash into the VR module, thereby eliminating the threat of injury to the players if they hit the top of the VR module. Furthermore, the spherical shape of the protective cover plates 23 and 85 causes their edges to be rounded downward away from 8 and 73 and places them well below 8 and 73 respectively.

The protective cover plates 24 and 72 are disk-like and flat and are buried equidistant in encapsulating material approximately ½ inch from both 8 and 13. The bodies of protective cover plates 24 and 72 are made flat because they are buried inside the VR module and there is no danger of people coming into violent contact with them. The flat shape is easier and less expensive to manufacture. The thickness of the plates is made in the range of approximately ¹⁄₁₆ inches. In all cases, the rounded edges of the protective cover plates 23 and 24 come within no less than ¼ inch or more from all sides of the VR module.

Alignment and sync of the four cameras inside each of the VR modules is achieved using the following example of a representative alignment procedure. Identical ultra wide angle lenses 47, 48, 45, 46, and 62, 63, 78 and 81 are used in each of the VR module's 18 and 76 respectively. When the VR module is arranged in the VR venue so that the cameras of the VR module 18 are pointed upward from the floor, the first 3D-stereo camera pair 43 and 44 is aligned and synched together in rotation about their respective z-axes within the VR module 18 so that they simultaneously yield wirelessly transmitted upright 3-D stereo images of the VR venue to the authorized operator which appear between the center and the bottom of the picture frame, and have their letterbox picture frames aligned together. The VR module is then flipped over. The second camera pair 41 and 42 is aligned and synched together in rotation about their respective z-axes within the VR module 18 so that they simultaneously yield wirelessly transmitted upright 3-D stereo images of the VR venue which appear between the center and the bottom of the picture frame, and have their letterbox picture frames aligned together with those of cameras 43 and 44 so that they are all superimposed on one another. The cameras 60, 65, 77, 82 are aligned and synched together in a similar way. The eight cameras 41, 42, 43, 44 and 60, 65, 77. 82 are aligned and synched together in a similar way.

In another preferred embodiment, where the cameras use square CCD or square CMOS sensor array chips in their focal planes, in conjunction with fisheye type camera lenses for example, the circular imagery field of view of the fisheye lens is made to fill the square array out to the edges of the chip's square array, or alternately completely fill the entire square array with imagery. The HD letterbox picture frame format is replaced in this instance with an HD circular picture frame format or an HD square picture frame format.

3-D stereo camera pair 43 and 44 will enable the VR audience to see what the VR module sees as the VR module travels within the VR venue. The VR viewing audience will see different parts of the VR venue get larger as the VR module gets closer to them.

Microphones 49, 50, 53 and 67, 75, 87, will communicate and deliver the sounds that the VR module hears to the VR viewing audience via the VR display apparatus. In a preferred embodiment, sounds from at least two VR modules, separated widely inside the VR venue, are needed for the VR display apparatus to create a 3-D sound experience for the VR viewing audience.

Under certain environmental circumstances, the VR module experiences unwanted rotational motions. These unwanted rotational motions, if not compensated for by the VR module's hardware and software, would cause the VR module to communicate unstable multimedia content, i.e. unstable video images and unstable audio, to the VR viewing audience. Through processing aboard the VR module, the VR module's hardware and software compensates for these unwanted rotational motions and permits the VR module to communicate stabilized images and sound of the VR venue to the VR viewing audience.

In a preferred embodiment, if a VR module moves from place to place within the VR venue, while experiencing pitch, roll and yaw, the sounds received from each of its microphones are processed inside the VR module using special software thereby enabling the VR module to communicate stabilized sound, in the direction of its forward motion, to the VR display apparatus for the VR viewing audience.

The VR images captured by the VR module, that are communicated to and viewed by the VR viewing audience, are maintained upright in the HD letterbox picture frame despite the pitch, roll and yaw rotational motions of the VR module. The VR module's pitch, yaw and roll motion data derived from its three gyroscopes, along with its captured image data of the VR venue, are processed together by the VR module's hardware and software which derotates the imagery and holds it upright and stable in the direction of forward motion of the VR module before being communicated to the VR viewing audience. The pitch, yaw and roll gyroscopes and encoders are part of the supporting electronics in each VR module inside 18 and 76. The VR viewing audience always sees an upright picture of the VR venue looking in the direction of forward motion of the VR module.

The VR multimedia sounds captured by the VR module that are communicated to, and heard by the VR viewing audience using their VR display apparatus, are pre-processed using the VR module's hardware and software to stabilize the sounds in the direction of forward motion of the VR module. The VR module's pitch, yaw and roll motion data derived from its three gyroscopes, along with its audio data from the VR venue, are processed together by the VR module's hardware and software. The VR module's hardware and software derotates the audio and holds it stable in the direction of forward motion before being communicated to the VR viewing audience. The sound processing software simultaneously removes the effect of the VR module's spin from the six microphones and properly phases the sound to the stabilized picture. The sound is phased and synced front to back and right to left with the upright picture scene looking in the forward direction of the VR module's motion. By using the data from the gyroscope encoders, the sound processing software in the VR module keeps track of the angular positions of each of the microphones mounted in the VR module relative to the direction of forward motion of the VR module.

In another preferred embodiment, any combination of any two of the four cameras of instrumentation package 18 can be electronically commanded and controlled by the authorized operator to act as 3-D stereo camera pairs. Using this process produces six possible 3-D stereo camera pairs. For example 41 and 42, 41 and 43, 41 and 44, 42 and 43, 42 and 44, 43 and 44. These combinations permit the authorized operator to have a choice of different interpupillary distances. Similarly, this process produces six possible 3-D stereo camera pairs for 65 and 77, 65 and 60, 65 and 82, 77 and 60, 77 and 82, 60 and 82. Similarly, these combinations also permit the authorized operator to have a choice of different interpupillary distances. The purpose of changing the interpupillary distances is to control the increase or decrease of the 3-D effects seen by the VR viewers.

Consider two VR modules each having a TV camera. Consider that the two cameras define a 3-D stereo camera pair. In a preferred embodiment, if more than one VR module is employed i.e. two VR modules inside the VR venue, where the spacing between the VR modules becomes the interpupillary distance between the two cameras, then the interpupillary distance between the two cameras can be increased by increasing the separation between the VR modules, thereby increasing the 3-D effects when the video of the two cameras is processed in the VR display apparatus. Also, with regard to sound effects, by spacing the VR modules from one another it also increases the distance between their respective microphones inside each of the VR modules. Increasing the separation between microphones is useful in capturing the audio multimedia content to be used to create 3-D surround sound or multidimensional sound in the VR display apparatus. When processed by the VR display apparatus, the phase difference between the same sounds heard by each of the two microphones increases, thereby increasing the multidimensional sound effects.

With regard to audio again, each of the twelve microphones 49, 93, 94, 89, 50, 53 and 95, 96, 97, 67, 75, 87 listens for sounds from their respective vantage points inside and on the VR module. Sounds detected by these microphones have separate simultaneous channels to the VR viewing audience where they are processed into a sound experience format for the VR viewing audience to hear using the VR display apparatus.

The condenser microphones enable the VR viewing audience to hear real-time contacts, impacts and shocks to the skin of the VR module. The microphones enable the VR viewing audience to hear sounds that result from any physical contacts or vibrations to the VR module; like for example, the crash of a player sliding into the VR module. Microphones 49, 53, 93, 94 are on the surface of the VR module hear airborne sounds of activity from sources outside the VR module itself. Microphones 67, 95, 96, 97 are on the surface of the VR module and hear airborne sounds of activity from sources outside the VR module itself.

Microphones 49, 53, 93, 94 protrude through holes in the top planar surface of the VR module and are slightly recessed below their top planar surface. Microphones 67, 95, 96, 97 protrude through holes in the bottom planar surface of the VR module and recessed below the bottom the planar surface as well.

Microphone 53 is connected by cable to electrical connector 55. 55 is connected to the electronics in the VR module 18. Microphone 53 enables the VR viewing audience to hear sounds that occur in the VR venue like extemporaneous remarks from the players or the scraping of their feet on the floor. In certain VR venues the authorized operator may decide to disable these sounds. The authorized operator may disable these sounds by transmitting a microphone disabling signal to the VR module from the hand-held remote control unit. Microphone 53 enables the VR viewing audience to hear the whoosh of air as an object wises past the VR module.

Conduction microphones 50, 89 and 75, 87 are internal to the VR module and hear sounds created by any conducted sounds through the flooring into the VR module and any contact with the VR module by conduction of sound waves through the VR module.

With the four cameras of the VR module 18 i.e. looking upward from the floor, live 3-D video pictures are taken simultaneously by the TV cameras 41, 42, 43 and 44 of their respective field of views of the action inside the VR venue. Cameras 41, 42, 43 and 44 will enable the VR viewing audience to see close-ups from the VR module's perspective as players at the VR venue change their positions. In summary, the VR module provides video and sound to the VR viewing audience that is exciting and realistic that it makes the individual members of the VR viewing audience feel that they are actually inside the VR venue. In many ways this is more exciting than viewing the VR venue in person.

In like fashion, with the four cameras of the VR module 76 looking upward from the floor, live 3-D TV pictures are taken simultaneously by the TV cameras 60, 65, 77, 82 of their respective field of views of the live action in the VR venue. Video cameras 60, 65, 77, 82 will enable the VR audience to see close-ups from the VR module's perspective as persons and objects maneuver above.

In a preferred embodiment, the VR modules are installed in the floor of a basketball court. Looking upward from the floor level where the VR module's top surface is flush with the floor, imagine using your VR display apparatus to see and hear the basketball players maneuver above you. Hearing the player's movements on the floor creating conducted sounds through the floor intensifies the VR experience.

In another preferred embodiment, the VR modules are installed in the floor of a boxing ring. Looking upward from the floor level of the boxing ring where the VR module's top surface is flush with the ring floor, imagine the excitement of using your VR display apparatus to see and hear the prize fighters maneuver above you.

In yet another preferred embodiment, the VR modules are installed in the ground on a soccer playing field. Looking upward from the ground level of the soccer playing field where the VR module's top surface is flush with the ground, imagine the excitement of using your VR display apparatus to see and hear the soccer players maneuver above you. Hearing the player's movements on the ground creating conducted sounds through the ground intensifies the VR experience.

In still yet another preferred embodiment, the VR modules are installed in the stage floor of a symphony orchestra. Looking upward from the floor level of the stage where the VR module's top surface is flush with the stage's floor, imagine the excitement of using your VR display apparatus to see and hear the conductor and the violinists playing above you. Being so close amongst the musicians playing their instruments is truly an exciting experience.

Furthermore, consider yet another preferred embodiment, where the VR modules are installed flush with the ground or astro turf on a football playing field. Looking upward from the ground level of the field where the VR module's top surface is flush with the ground or astro turf, imagine the excitement of using your VR display apparatus to see and hear the players above you. The player's movements on the ground creates conducted sounds through the ground that intensifies the VR experience. Besides hearing conducted sounds from the players through the ground, the VR module hears airborne sounds made by the rush of air above the VR module caused by the moving players, and by their voices.

Even furthermore, consider yet another preferred embodiment, where the top surface of the VR modules is installed flush with the surface of the ice on a ice hockey rink. Looking upward from the surface of the ice, where the VR module's top surface is flush with the surface of the ice, imagine the excitement of using a VR display apparatus to see the puck and ice scrapings fly and hear the airborne sounds of the players skating above you. Hearing the player's movements on the ice creates conducted sounds through the ice as well that are heard by the conduction microphones that intensifies the VR experience.

The data from all six of the VR module's microphones is simultaneously transmitted to the VR display apparatus and processed by the VR display apparatus software to generate 3-D surround sound. In a preferred embodiment, there is more than one VR module deployed in the VR venue.

In a preferred embodiment, the VR module is moving. By using the data from the gyroscope encoders, the 3-D surround sound processing software in the VR module keeps track of the angular positions of each of the six microphones mounted in the VR module relative to the direction of forward motion of the VR module. In addition, the VR viewing audience always sees a stabilized upright picture of the VR venue looking in the direction of forward motion of the VR module.

The eight CCD and CMOS sensor arrayed TV cameras 41, 42, 43, 44, 60, 65, 77, 82 are chosen to be identical to one another. The eight TV camera lenses 45, 46, 47, 48, 62, 63, 78, 81 are chosen to be identical to one another. The interpupillary distance between 41 and 42 is identical to the interpupillary distance between 43 and 44. The field of view of each of the lenses is an ultra wide angle approaching one hundred and eighty degrees. Except for the small parallax between the four images due to the interpupillary distances between the four camera lenses 45, 46, 47 and 48, the images of the VR venue as seen by the four TV cameras as projected onto their four HD CCD and CMOS sensor arrays, are identical to one another. The cameras and their lenses are arranged symmetrically around the z-axis 30 of the VR module.

FIG. 2A and FIG. 2B and FIG. 2C

The detailed physical elements disclosed in the VR module drawings shown in FIG. 2A and FIG. 2B and FIG. 2C are identified as follows: 1A is a flat surface of the disk like VR module. 2A is a flat surface of the disk like VR module. 3A is the x-axis of symmetry of the VR module. 4A is the y-axis of symmetry of the VR module. 5A is a dual microphone. 6A is the z-axis of the VR module. 7A is a dual microphone. 8A is a camera. 9A is a camera. 10A is a camera. 11A is a camera. 12A is a camera. 13A is a camera. 14A is a camera. 15A is a camera. 16A is the rim of the VR module. 17A is an instrumentation package. 18A is an instrumentation package. 19A is an instrumentation package. 20A is an instrumentation package. 21A is a dual microphone. 22A is a dual microphone. 23A is the physical and chemical sensor. 24A a means for continuously rotating or spinning the VR module about the x-axis or the y-axis (not shown).

FIG. 2A shows a side view of a disk like VR module having four 3-D cameras mounted around its rim.

FIG. 2B shows a edge view of a disk like VR module having four 3-D cameras mounted around its rim.

FIG. 2C shows a edge view of a disk like VR module having four 3-D cameras mounted around its rim.

8A and 9A is a 3-D stereo camera pair. 10A and 11A is a 3-D stereo camera pair. 14A and 15A is a 3-D stereo camera pair. 12A and 13A is a 3-D stereo camera pair. The lines of sight of 8A and 9A are parallel to one another. The lines of sight of 10A and 11A are parallel to one another. The lines of sight of 12A and 13A are parallel to one another. The lines of sight of 14A and 15A are parallel to one another. The lines of sight of the four 3-D stereo camera pairs look out radially from the center of the VR module x-y-z axis origin.

17A is an instrumentation package. 17A is mounted on the rim or perimeter of the disk like VR module.

18A is an instrumentation package. 18A is mounted on the rim or perimeter of the disk like VR module.

19A is an instrumentation package. 19A is mounted on the rim or perimeter of the disk like VR module.

20A is an instrumentation package. 20A is mounted on the rim or perimeter of the disk like VR module.

In a preferred embodiment, 17A, 18A, 19A and 20A are angularly equally spaced at 90 degrees intervals apart from one another around the rim 16A.

In an alternate preferred embodiment, a generalized structure is used to hold the cameras in place. The number of 3-D stereo camera pairs can be any useful number. The 3-D stereo camera pairs are equally spaced angularly around the perimeter of the structure. The field of view of the cameras is chosen so as to permit CPU processing to abut and join the letterbox frames of adjacent 3-D stereo camera pairs around the perimeter into a seamless 360 degree annular collage Cameras 10A and 11A constitute a 3-D stereo camera pair.
Cameras 12A and 13A constitute a 3-D stereo camera pair.
Cameras 14A and 15A constitute a 3-D stereo camera pair.
Cameras 16A and 17A constitute a 3-D stereo camera pair.

Each of the four dual microphones 5, 7, 21 and 22 is comprised of two microphones. One of the microphones is for hearing airborne sounds. The other microphone is for hearing conducted sounds.

In a preferred embodiment, the VR module is comprised of four instrumentation packages 17A, 18A, 19A and 20A mounted around the rim of the disk like structure shown in FIG. 2A and FIG. 2B and FIG. 2C. The operation of 17A, 18A, 19A and 20A is shown in the instrumentation package drawings FIG. 20A and FIG. 20B and FIG. 20C. 17A, 18A, 19A and 20A are equally angularly spaced at 90 degrees intervals apart from one another around the rim 16A. The angular fields of view and focal lengths of the lenses of each of the eight cameras 8A, 9A, 10A, 11A, 12A, 13A, 14A and 15A are made to be identical. The fields of view of the heights of the letterbox picture frames of each adjacent 3-D stereo camera pairs are processed by the CPU's in the four instrumentation packages 17A, 18A, 19A and 20A and made to overlap and abut one another. This produces a seamless annular 360 deg field of view collage without artifacts for transmission to the VR viewing audience.

In a preferred embodiment, assume that the x-y plane of the VR module is held vertically so the z-axis 6 is horizontal and the y-axis 4A is vertical. Then in order to cover the total 360 degree angular space around the VR module, the angular field of view of the height dimension of the letterbox picture frames for each of the four 3-D stereo camera pairs is chosen to be 90 degrees i.e. 4×90 deg=360 deg. Given a letterbox aspect ratio of 9/16, the angular width dimension is therefore 90 deg×16/9=160 degrees. Therefore, for the example cited above, the letterbox angular field of view of each of the four 3-D stereo camera pairs is 90 deg high and 160 deg wide. Now if we spin i.e. mechanically rotate, the VR module about its y-axis or its x-axis using 24A, we can join and knit together the widths of adjacent frames every 160 degrees to form a seamless collage of frames. This produces a seamless 360 deg field of view collage of frames which cover the entire three dimensional space around the VR module without any artifacts, for transmission to the VR viewing audience for an enjoyable exciting high quality VR experience.

In an alternative preferred embodiment, assume that the x-y plane of the VR module is held horizontally so the z-axis 6 is vertical and the y-axis 4A is horizontal. Then in order to cover the total 360 degree angular space around the VR module, the angular field of view of the width dimension of the letterbox picture frames for each of the four 3-D stereo camera pairs is chosen to be 90 degrees i.e. 4×90 deg=360 deg. Given a letterbox aspect ratio of 9/16, the angular height dimension of the letterbox is therefore 90 deg×9/16=50.625 degrees. Therefore, for the alternative example cited above, the letterbox angular field of view of each of the four 3-D stereo camera pairs is 50.625 deg high and 90 deg wide. Now if we spin i.e. mechanically rotate, the VR module about its y-axis or its x-axis using 24, we can knit together the heights of adjacent frames every 50.625 degrees to form a seamless collage of frames. This produces a seamless 360 deg field of view collage of frames which cover the entire three dimensional space around the VR module without any artifacts for transmission to the VR viewing audience for an enjoyable exciting high quality VR experience.

The means 24A can be implemented in any number of ways i.e. synchronous electric motor drives, magnetic drives, air bearing drives, etc. The rotary motion must be smooth. Variable speed drives with low friction are useful to control the spin rate. The spin rate can be adjusted remotely by the authorized operator to match the action circumstances taking place in the VR venue environment.

The present invention contemplates that the VR module be instrumented with a transceiver and antenna that transmits radio signals encoded with the picture and sound information captured by the VR module to a VR display apparatus used by the VR viewing audience. The present invention contemplates that the VR module that is positioned at the VR venue, is instrumented with cameras and microphones enabling it to capture VR multimedia content comprised of pictures and sounds of the VR venue. The CPU microprocessor shown in FIG. 13 as item 7 processes the VR multimedia content. The processed VR multimedia content is then communicated to the VR viewing audience using their VR display apparatus in real-time or near real-time. The microprocessor also records and stores a continuous record of the captured processed. VR multimedia content in memory inside the VR module. This record may be retrieved and played at a later time to the VR viewing audience.

Referring to the preferred embodiment disclosed in FIG. 2A and FIG. 2B and FIG. 2C, a VR module is equipped with four wireless radio wave 3-D stereo television camera pairs and employ single point, multi point and/or multi point diversity reception techniques. The four 3-D stereo camera pairs look out radially in four mutually orthogonal directions from around the VR module's cylindrical rim.

The preferred embodiment disclosed in the present invention in FIG. 2A and FIG. 2B and FIG. 2C has an advantage over VR modules having cameras and microphones peering and hearing from only one side or two sides. The VR module preferred embodiment in the present invention covers a field of view of 360 degrees comprised of four mutually perpendicular lines of sight.

The electronics shown in FIG. 13 shows the CPU microprocessor 7A in the VR module's instrumentation package.

The VR module is equipped to be enabled, commanded and controlled by administrative data conveyed simultaneously and bi-directionally from/to an authorized operator utilizing wireless radio communication. The VR module uses the same electronics 13A, 14A, 21A, 22A shown in the instrumentation package FIG. 20A and FIG. 20B and FIG. 20C. The VR module shown in FIG. 2A and FIG. 2B and FIG. 2C uses four instrumentation packages that are shown in FIG. 20A and FIG. 20B and FIG. 20C.

In a preferred embodiment, the VR module is a disk like structure. It is approximately three inches in diameter and approximately one inch thick. It should be emphasized however that almost any size disk or structure form can be used. The color of the VR module is made similar to the background color of the VR venue in order for the VR module to be inconspicuous during VR sessions. In another preferred embodiment, the color of the VR module is made dissimilar to the background color of the VR venue in order for the VR module to be conspicuous so their whereabouts can be easily identified.

Figure 20A:
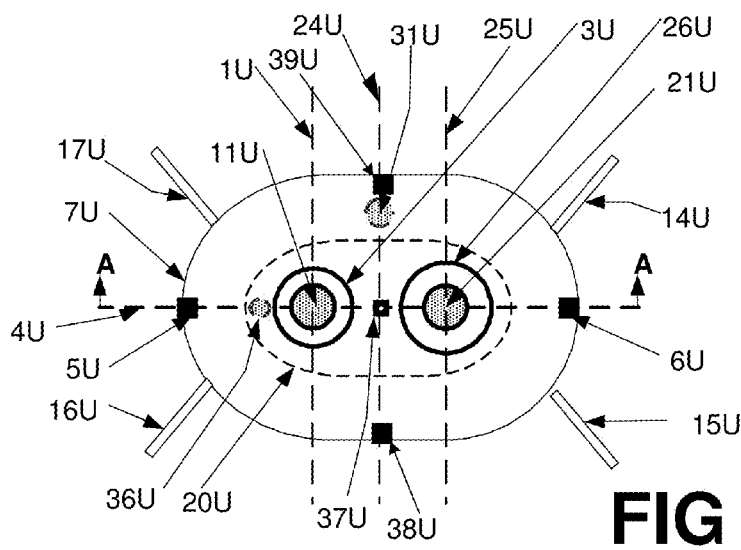
FIG. 20A is a top view of the two-camera and fiber optics/copper instrumentation package.
Figure 20B:
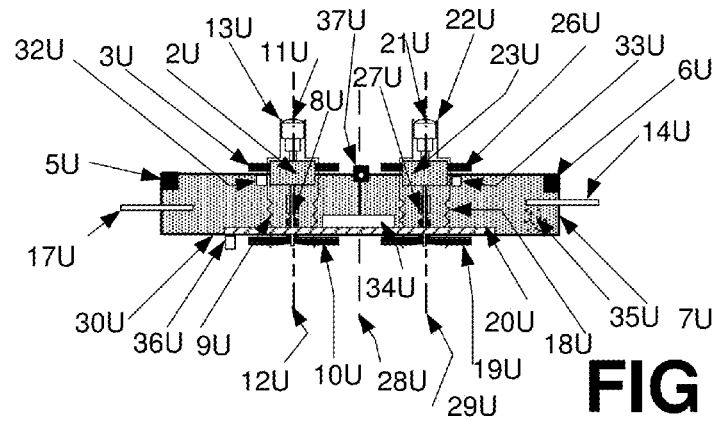
FIG. 20B is a side view of the two-camera wireless instrumentation package.
Figure 20C:
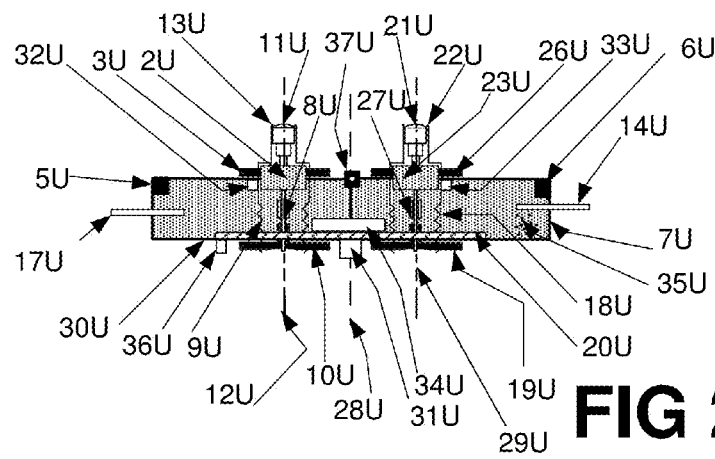
FIG. 20C is a side view of the two-camera wireless and fiber optics/copper cable instrumentation package

The VR module contains the identical electronics shown in FIG. 20A and FIG. 20B and FIG. 20C. Optical windows protect the cameras and their lenses. In a preferred embodiment, the VR module shell material 19A, 84A and 86A is chosen to permit the passage of RF to and from its antennas inside the shell. In another preferred embodiment, the VR module shell material 19A, 84A and 86A is plastic to permit the passage of RF to and from its antennas inside the shell.

Referring to drawings FIG. 2A and FIG. 2B and FIG. 2C, in a preferred embodiment, the present invention contemplates a VR module, which can wirelessly and autonomously communicate captured VR multimedia content of the VR venue simultaneously from its electronics, and operate under the command and control of an authorized operator.

In a preferred embodiment, a VR venue can be configured for use with one or more i.e. an array, VR modules. The VR venue can be configured with bi-directional wireless radio wave communication links between the VR modules and the viewer's VR multimedia display apparatus. In another preferred embodiment, the VR venue can be configured with bi-directional wireless and/or fiber optics cable/and/or a high speed copper cable network of communications links between the VR modules and the viewer's VR multimedia display apparatus.

In another preferred embodiment, a physical and chemical sensor 23A is for capturing the physical VR content and a chemical VR content i.e. weather, gases etc., in the VR venue where the VR module is deployed. 23A is a solid state sensor and resides flush with the flat VR module surface 1A. We want 23A to be exposed to the environment inside the VR venue so that it can communicate its physical and chemical findings to the CPU's. Physical and chemical state signals captured by 23A i.e. like weather, the presence of gases, voltages, charge, smells, breath test, alcohol, barometric readings, gases, shocks, vibrations etc. are communicated to the CPU microprocessors where they are processed and communicated to the VR viewing audience.
FIG. 3

The detailed physical elements disclosed in the instrumentation package element power supply and battery charging circuits drawing shown in FIG. 3 are identified as follows: 1B is the induction coil interface. 2B is the impedance matching data and power isolation network. 3B is the battery charging circuit. 4B is the 250 kHz data modem. 5B is the dc power bus. 6B is the rechargeable lithium ion battery pack for example. 7B is the power supply regulator circuit. 8B is the power control switch. 9B is the power control data bus. 10B is the microprocessor. 11B is the read only memory. 12B is the communications data bus. 13B is the status information data bus. 14B is the system control data bus. 15B is the switched dc power bus. 16B is the switched components block. 17B fiber optics/copper communications cable and dc power connector. 18B is the electronic package unit interface. 19B is the wireless communications connector. 20B is the 250 kHz induction coil(s).

FIG. 3 is the block diagram of the power supply and battery charging circuits inside all the VR modules.

The signals and data flows to and from the power supply and battery charging electronic circuits are specified in FIG. 3. Power to the electronics may be turned on or off inside the VR modules by any of the following methods. Firstly, power may be turned on of off by sending a wireless RF control signal over the internet to the instrumented sports paraphernalia via an RF tower. Secondly, power may be turned on of off by sending a wireless RF control signal from the authorized operator to the VR modules via the antenna relay junction assembly. Thirdly, power may be turned on of off by sending a signal by magnetic induction from the hand held remote to the VR modules. Fourthly, power may be turned on of off by sending a control signal by magnetic induction from the battery charging station to the VR modules. In cases where the VR modules have fiber optic/copper cable communication link connections, power may be turned on of off by sending a control signal over the cable to the VR modules from the authorized operator or from the internet.

FIG. 3 shows an induction coil interface 1B whose purpose is to convey electrical energy from a light-weight air core induction coil(s) 20B located onboard the VR modules. The coil(s) 20B is wound of only a few turns of a relatively small gauge magnet wire with sufficient capacity to handle the required current to recharge the batteries also onboard the instrumentation package with minimal temperature rise.

Impedance matching diverter 2B is connected to 1B forming a parallel resonant tank circuit with the aforementioned induction coil 20B tuned to approximately 250 kHz. When any of the VR modules containing the instrumentation package is properly placed on or in proximity to the recharging station such that its induction coil 20B is subject to the intense magnetic flux created by the coil within the recharging station, 20B will supply magnetically coupled electrical power from the recharging station via 1B and 2B to battery charging circuit 3B. In addition, 1B and 2B also convey a packet of administrative and control data signals between the recharging station and Data transceiver 4B. Furthermore, 2B includes a high-stability fail-safe protection circuit which prevents 4B from being catastrophically destroyed by the high voltage present across 1B that is necessary during a typical recharging cycle. Circuits 1B, 2B and 3B are so arranged that whenever the VR modules containing the instrumentation package is not placed or is improperly placed on the recharging station or is being used in a game, the circuits comprised of 1B, 2B and 3B do not present an electrical load on 7. This feature set also ensures the longest possible life of the battery during idle periods of no-use by not permitting unnecessary loading of 7B by 1B, 2B and 3B In the event that the voltage level appearing at battery bus line 5B has fallen below the charging set-point threshold of 3B, charging of rechargeable battery 6B will begin to commence automatically as charging current is applied to 6B via 3B and 5B whilst the base or plate containing the instrumentation package is properly placed on an active recharging station.

As the back voltage detected by 3B appearing at 6B rises abruptly above a set-point threshold of 3B, charging current is automatically reduced to prevent over-charging of the batteries, this also protects the remainder of the VR module's camera system 16B from damage due to over heating while its batteries are in the charging station.

Throughout a recharging cycle, main power supply 7B, microprocessor 10B and 4B also receive dc power from 3B via 5 so as to avoid any unnecessary battery consumption until charging is complete.

Whenever dc power is supplied to 7B via 5B, power to the remaining hardware 16B will remain in an off-state until a turn-on command is received by main power supply switch 8B from 10B via main power control data bus line 9B. This will in turn cause 8B to energize Switched Power Bus 14B and begin supplying regulated D/C power to the rest of the instrumentation package 16B. 8B will continue to supply such power until 8B receives a shutdown command from 10B via 9B or a failure of 6B occurs. As long as 8B is keeping 14B active 10B may issue commands to 16B via Bi-directional Instrumentation Package Control Data Bus Line 15B. 15B is also used to collect status information about 16B including modes of failures which may occur throughout the use of the instrumentation package. These failures in turn cause software parameters of 10B stored within 11B to be executed by 10B and communicate these fault indications back to the base station. Such indications are intended to alert personnel of the fault condition which might otherwise result in an embarrassment to personnel i.e.: an aging battery in need of recharging or a damaged camera.

Each VR modules instrumentation package is equipped with a unique identification code and operating firmware embedded in the read only memory 11B areas of 10B. As soon as power to 10B via 5B becomes available, initialization of 10B is commenced loading this id code and operating firmware into 10B via 11B. Once this initialization of 10B is complete, synchronization of 4B with the recharging station's onboard data transceiver begins, via data transceiver bus line 12B, thereby establishing an administrative and control data link between 10 and the recharging station's human interface panel via 1B, 2B, 3B, 4B and 12B respectively.

The overall rate and length of time at which 3B will continue to supply charging current and hence recharge the batteries within the VR modules instrumentation package is dependent on the specific rating and initial condition of the battery, and the entries made in the user adjustable settings menu of the recharging station's human interface panel based on the operating parameters contained in 11B transferred to the microprocessor onboard the recharging station during synchronization of 4B as previously described.

As soon as a typical charging cycle is commenced, continuous fail-safe monitoring data of the charging current and voltage supplied by 3B is sent to 10B via Power control data bus line 13B. If at any time a problem develops during a charging cycle that could result in catastrophic destruction of the VR modules instrumentation package, batteries and/or the recharging station, a total system shutdown sequence is initiated and personnel advisory warning displayed on the recharging station's human interface panel, thereby removing power and safeguarding the hardware as described.

While VR modules that are equipped with the instrumentation package is properly placed in the recharging station a series of self diagnostic and power consumption tests may be performed on 16B. The results of which are forwarded to the human interface panel of the recharging station via 1B, 2B, 4B, 10B and 11B respectively and are useful to personnel in evaluating the VR module's camera instrumentation packages overall condition prior to its use in a game.

Since a typical team may wish to use a finite number of n VR modules equipped with the instrumentation package, a means of cataloging and archiving the charge, recharge, usage, power consumption and diagnostic testing cycles associated with each is provided by 10B via 11B. This information is available to personnel via the human interface panel on the recharging station upon command from personnel and furthermore may be stored by a Personal Computer connected to the data logging port of the recharging station charging the base(s) concerned. As previously described, each base instrumentation package contains a unique identification number; therefore the book-keeping for each VR modules involved is independent respectively.

After 6B has assumed a full and complete charge, the VR modules instrumentation package is placed into a powered-off state and except for a very small stand-by current through 4B and 10B, battery consumption is minimized until future use is desired.

Prior to using the VR modules in a VR session, 8B must be activated in order to supply dc power to 16B. Upon receiving a power-on command from 10B via 9B and 10B will take 8B out of the power-off state thus allowing 7B to supply dc power to 16B.

Invocation of the power-on command by 10B may be accomplished by any of several methods: Firstly, if the VR modules concerned is properly placed on or near a recharging station. Its human interface panel (if so equipped) may be used to invoke a power-on command sequence to 10B via 1B, 2B, 4B and 12B respectively. Secondly, the hand-held remote control device may be placed near either end of the VR modules concerned to invoke this command to 10B via 1B, 2B, 4B and 12B if desired. Thirdly, on/off control signal commands received by the electronics package units (see FIG. 11A) from the internet tower (see FIG. 11B) by the VR modules, are conveyed to the electronic package interface 18B to invoke a power-on command sequence to 10B via 1B, 2B, 4B and 12B respectively. Fourthly, on/off control signal commands received at the fiber optics/copper communications cable and dc power connector 17B from the authorized operator, invoke a power-on command sequence to 10B via 3B, and 13B respectively. Fifthly, on/off control signal commands sent wirelessly from the remote base station to the wireless communications connector 19B, invoke a power-on command sequence to 10B via 3B, and 13B respectively.

Activation of 8B by either method places the VR modules instrumentation package into a fully powered-on state.

While the instrumentation package is in a fully powered on state and not placed in the recharging station, administrative data, Identification code and control signals along with image and sound accompaniment will be transmitted and available to the authorized operator.

If during a VR session, a low battery condition, power supply or any other technical fault develops, 7B via 13B will cause 10B to transmit an appropriate warning message to the authorized operator's human interface display via the 802.11 (x) transceiver in 16B.

False signaling and invocation of the instrumentation package by other nearby potential sources of interference is avoided by the decoding algorithm stored in 11B and used by 10B when communicating critical information over either of the two distinct administrative and control data link techniques utilized by the authorized operator.

Until 6B falls to a low level set-point threshold within 7B, the VR module's instrumentation package will remain in a fully powered-on state unless 7B is de-activated via 8B after a shutdown sequence is issued by a power-off command from 10B.

To preserve the life of 6B, upon completion of its use, i.e. at the end of a VR session, the VR module's instrumentation package should be placed into a powered-off state by causing 10B to issue a power-off signal to 7B via 8B and 9B. This may be accomplished in one of several methods: Firstly using the human interface hardware, display and software at the authorized operator, authorized personnel may transmit and invoke a power-off command to 10B via the 802.11(x) administrative and control data link of 16B via 13B. Secondly, the authorized personnel at the VR venue may wish to conclude its operation by conveniently placing the hand-held remote control unit near the VR modules and depressing the power-off key on the human interface panel of the handheld remote control unit invoking a power-off command to 10B via 1B, 2B, 3B, 4B and 12B respectively.

Finally, authorized personnel may position the VR modules beneath or close to the recharging station. For example, whenever VR modules are properly placed beneath or on to an active recharging station, the VR modules instrumentation package is automatically put into a powered-off state unless otherwise instructed by authorized personnel using the human interface panel of the recharging station concerned whenever 4B is synchronized with the recharging station via 1B, 2B and 3B.

Confirmation in any of the methods just described that the VR modules instrumentation package has indeed been placed into a powered-off state is assured to authorized personnel by both visual and audible indication from the human interface concerned when 10B via 1B, 2B, 3B, 4B and 12B acknowledges receipt and execution of the power-off invocation.

The administrative data link is referred to in several places in the specification of the current invention. For purposes of elucidation, a description of the administrative data link is given as follows. The administrative data link is a bi-directional communications path over which control commands, as well as status data between the VR modules and the authorized operator are conveyed. These commands and/or status data consist of data packets or streams that are independent in function of those that are used to convey image and/or sound information to the VR audience but share the same communications transport mechanism overall. This communications transport mechanism is formed whenever the microprocessor within the VR modules communicates with the authorized operator over the particular mode of communications connectivity that the stadium has been equipped for i.e. fiber optics, copper cable or wireless radio. This microprocessor is connected via an I/O port to the network transceiver within the VR modules and periodically monitors this port for activity. When a data stream arrives at this port from the authorized operator, the microprocessor executes a series of instructions contained in ROM in such a way that it will respond and act only on those commands that are correctly identified based on a unique identification integer code present in the signal that immediately precedes the control data stream contents. If the stream is identified as valid the microprocessor will execute the received command as determined by the firmware stored in ROM and transmit a status data acknowledgement to the authorized operator. Status data received by the authorized operator transceiver is handled in a manner similar to that of the VR modules as previously described. When the authorized operator transceiver intercepts an appropriately coded transmission over the particular mode of communications connectivity that the VR venue has been equipped for i.e. fiber optics, copper cable or wireless radio, it will respond and act on it in the manner determined by the communications handling provisions of the special software running on the associated computer at the authorized operator.

Figure 4A:
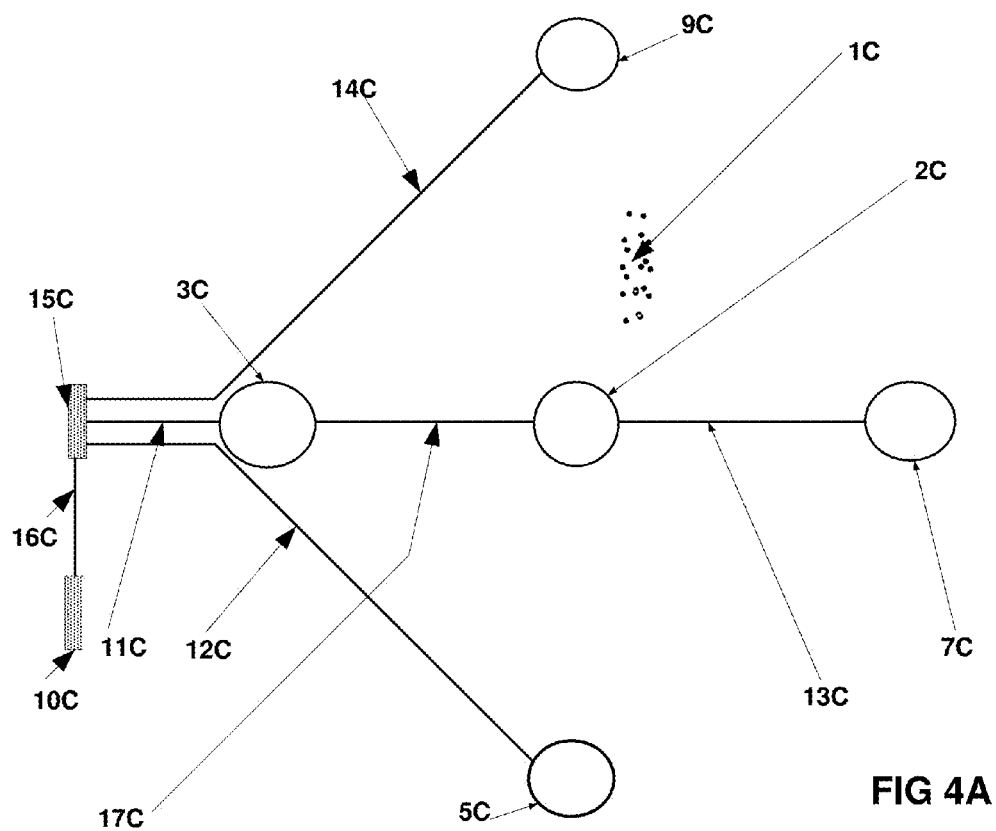
FIG. 4A is a diagram of the top view of a typical VR venue at ground/floor level equipped to televise VR multimedia content via fiber optics cable routed from beneath the ground/floor from VR modules deployed in the ground/above the ground/in the floor/above the floor inside the VR venue.
Figure 4B:
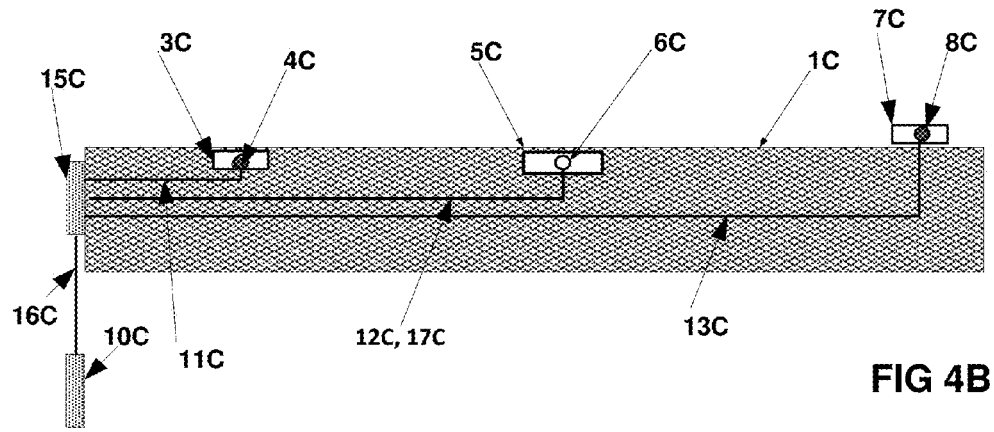
FIG. 4B is a diagram of the side view of a typical VR venue at ground/floor level equipped to televise VR multimedia content via fiber optics cable routed from beneath the ground/floor from VR modules deployed in the ground/above the ground/in the floor/above the floor inside the VR venue.

FIG. 4A and FIG. 4B

The detailed physical elements disclosed in the typical VR venue drawings shown in FIG. 4A and FIG. 4B are identified as follows: 1C is the ground or floor or ice surface of the VR venue. 2C is a VR module equipped for fiber optic connection with a fiber optics cable/copper cable connector. 3C is a VR module equipped for fiber optic connection with a fiber optics cable/copper cable connector. 4C is the instrumentation package inside VR module equipped for fiber optic connection with a fiber optics cable/copper cable connector. 3C equipped for fiber optic/copper connection with a fiber optics cable/copper cable connector. 5C is a VR module equipped for fiber optic connection with a fiber optics cable/copper cable connector. 6C is the instrumentation package inside VR module 5C equipped for fiber optic connection with a fiber optics cable/copper cable connector. 7C is a VR module equipped for fiber optic connection with a fiber optics cable/copper cable connector. 8C is the instrumentation package inside VR module 7C is a VR module equipped for fiber optic connection with a fiber optics cable/copper cable connector. 9C is a VR module. 10C is an antenna array relay junction equipped for fiber optic connection with a fiber optics cable/copper cable connector and is the communications interface to the VR audience. 11C is the bi-directional multi-function fiber optic communication cable. 12C is the bi-directional multi-function fiber optic communication cable beneath 1C. 13C is the bi-directional multi-function fiber optic communication cable. 14C is the bi-directional multi-function fiber optic communication cable beneath 1C. 15C is the field-side fiber optic/copper multi-function junction box termination point for all instrumentation packages (also known as the antenna array relay junction). It is located adjacent to the VR venue boundary. 16C is the bi-directional multi-function fiber optic/copper cables between 15C and 10C.

FIG. 4A is a diagram of the top view of a typical VR venue at ground/floor level equipped to televise VR multimedia content via fiber optics cable routed from beneath the ground/floor from VR modules deployed in the ground/above the ground/in the floor/above the floor inside the VR venue.

FIG. 4B is a diagram of the side view of a typical VR venue at ground/floor level equipped to televise VR multimedia content via fiber optics cable routed from beneath the ground/floor from VR modules deployed in the ground/above the ground/in the floor/above the floor inside the VR venue.

Referring to drawings FIG. 4A and FIG. 4B, in a preferred embodiment, a typical VR venue equipped to televise via fiber optics cable/copper cable from VR modules located inside the VR venues, is disclosed.

FIG. 4A and FIG. 4B shows a typical VR venue equipped with a fiber optics cable/copper cable communications link used to televise from VR modules to a VR audience.

Referring to the preferred embodiments disclosed in FIG. 4A and FIG. 4B a typical VR venue equipped for operation employing bi-directional multi-function fiber optic cable connectivity is specified.

Referring to the preferred embodiment disclosed in FIG. 4A and FIG. 4B the typical VR venue is equipped with bi-directional multi-function fiber optic cable communication links to televise from VR modules to a VR audience. The instrumentation package has bi-directional multi-function fiber optic cable connectivity with the VR audience via these cables. The fiber optics cable/copper cable from beneath the ground or floor of the VR venue, enters the VR modules. The top surfaces of the VR modules are flush with the floor or ground surface of the VR venue. The fiber optics cable/copper cable connector is connected to its mating instrumentation package connector in the VR modules. The instrumentation package connector is wired to the instrumentation package electronics. The VR venue fiber optic cable/copper cable run includes copper cabling which furnishes an alternate source of low voltage dc power to the VR modules.

FIG. 4A illustrates a VR venue using five VR modules each equipped with an instrumentation package employing bi-directional multi-function fiber optic cable connectivity between all VR modules and the VR audience employing bi-directional fiber optic connectivity via 10C.

Some VR venues are located in geographical areas prone to radio frequency emissions that could be disruptive to a wireless camera instrumentation system. In such cases of extreme radio frequency interference an implementation of a hard-wired system is best to ensure that the high quality video images captured in real-time are conveyed to 10 without degradation and to reduce the time required by personnel during setup i.e. particularly in VR venues whereby frequent patterns of use would be anticipated. To do this, such a system requires an underground or under floor installation be made consisting of bi-directional multi-function fiber optic communication cables 11C, 12C, 13C, 17C and a field-side fiber optic multi-function junction box termination point 15C be used.

FIG. 4A and FIG. 4B additionally show a preferred approach of how 11C, 12C, 13C and 14C could be positioned when it is desirable to use multiple under ground trenches beneath the outer perimeter of 2C at the time of installation. Since such a system is permanently installed within 1C, personnel operating 17C need only connect bi-directional multi-function fiber optic cables 16C between 15C and 17C prior to a game or training session—making set-up simple and easy.

The underground fiber optics cable/copper cable is laid in three separate underground trenches. The first trench extends from the fiber optics junction box 15C to the VR module 3C and continues on to the VR module 7C. The second trench extends from 15C to the VR module 5C. The third trench extends from 15C to the instrumented VR module 9C.

The VR module 3C, VR module 5C, VR module 7C, and VR module 9C are each connected to the fiber optics cable/copper cable using their respective fiber optics/copper cable connectors. The fiber optics cables/copper cables 11C, 12C, 13C and 14C are connected to their respective instrumentation packages 4C, 6C, 8C and 10C via the fiber optics/copper cable connectors.

The fiber optics cables/copper cables 11C, 12C, 13C and 14C are routed up from under the ground and up through the VR module respectively. The respective fiber optics cable/copper cable with its connector enters the instrumented baseball VR module respectively. The fiber optics cables/copper cables 11C, 12C, 13C and 14C are each connected to their mating connectors of the instrumentation package 4C, 6C, 8C, and 10C in the VR module 3C and the three VR modules 5C, 7C and 9C respectively. In an alternative preferred embodiment the fiber optics cable/copper cable is routed around the outside of the VR module and connected to the fiber optics connector. The value of this alternative preferred embodiment is that it doesn't require altering the existing prior art.

VR venues employing the use of fiber optics cable/copper cable based system like that shown in FIG. 4A have some additional features otherwise unavailable in a completely wireless system. First these features include the ability to send dc power to 4C, 6C, 8C and 10C via 11C, 12C, 13C and 14C supplied by 17C via 15C and 16C respectively. Secondly, 3C, 5C, 8C and 10C may be upgraded or replaced to incorporate additional camera angles easily at the discretion of the system operator. Finally, but not limited to: the high quality video images in full hi-definition may be simultaneously received by 17C from any combination of 4C, 6C, 8C and 10C respectively without the need of high radio frequency bandwidth.

In another preferred embodiment, in a similar way as disclosed above, a typical VR module can be positioned in the ceiling of a VR venue, flush with the ceiling surface, looking downward from the ceiling, and equipped to communicate via fiber optics cable/copper cable routed in the ceiling.

In yet another preferred embodiment, in a similar way as disclosed above, a typical VR module can be positioned in a wall of a VR venue, flush with the surface of the wall, looking outward from the wall, and equipped to communicate via fiber optics cable/copper cable routed in the wall.

In still yet another preferred embodiment, in a similar way as disclosed above, a typical VR module can be positioned in a typical VR venue like an ice hockey rink, flush with the surface of the ice, looking upward from the ice, and equipped to communicate via fiber optics cable/copper cable routed beneath the ice.

In yet even in another preferred embodiment, in a similar way as disclosed above, in a typical water VR venue like a swimming pool, a typical VR module can be positioned above the surface of the water with its lower surface just flush with the water, and with its top surface looking upward from the surface of the water, and equipped to communicate via fiber optics cable/copper cable routed beneath the water's surface.

FIG. 5

Figure 5:
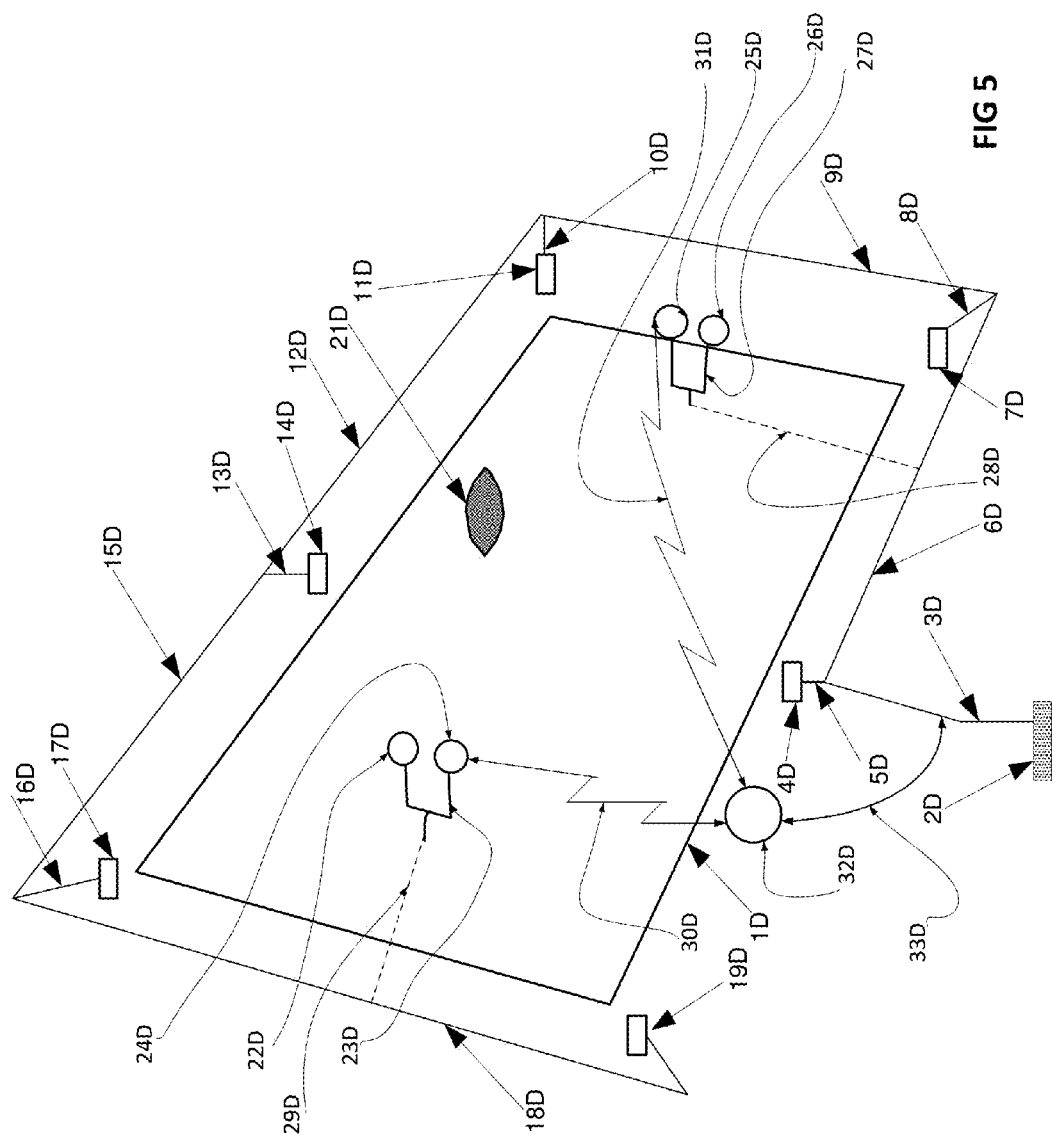
FIG. 5 is a diagram of a typical VR venue equipped with a wireless RF bi-directional communications link to communicate VR multimedia content from VR modules via multiple antenna repeaters.

The detailed physical elements disclosed in the typical football playing field VR venue drawing shown in FIG. 5 are identified as follows: 1D is the football playing field VR venue. 2D is the antenna array relay junction. 3D is the bi-directional communications cable to first antenna location. 4D is the first antenna location. 5D is the bi-directional communications cable junction of first antenna location. 6D is the bi-directional communications cable to second antenna location. 7D is the second antenna location. 8D is the bi-directional communications cable junction of second antenna location. 9D is the bi-directional communications cable to third antenna location. 10D is the bi-directional communications cable junction of third antenna location. 11D is the third antenna location. 12D is the bi-directional communications cable to fourth antenna location. 13D is the bi-directional communications cable junction of fourth antenna location. 14D is the fourth antenna location. 15D is the bi-directional communications cable to fifth antenna location. 16D is the bi-directional communications cable junction of fifth antenna location. 17D is the fifth antenna location. 18D is the bi-directional communications cable to sixth antenna location. 19D is the sixth antenna location. 20D is the linear dimension of the distance measured across the field of play diagonally. 21D is the football. 22D is a VR module mounted on top of the football goal post 23D. 23D is a football goal post. 24D is a VR module mounted on top of the football goal post 23D.

25D is a VR module mounted on top of the football goal post 27D. 26D is a VR module mounted on top of the football goal post 27D. 27D is a football goal post. 28D is a bi-directional fiber optics and/or copper cable communication link connecting 27D to 6D. 29D is a bi-directional fiber optics and/or copper cable communication link connecting 23D to 18D. 30D is a bi-directional RF communication link between 32D and 22D and 24D. 31D is a bi-directional RF communication link between 32D and 25D and 26D. 32D is an authorized operator. 33D is a bi-directional fiber optics and/or copper cable communication link connecting 32D and 3D.

FIG. 5 is a diagram of a typical VR venue equipped with a wireless RF bi-directional communications link to communicate VR multimedia content from VR modules via multiple antenna repeaters.

The detailed physical elements disclosed in the typical VR venue drawing shown in FIG. 5 are identified as follows: 1D is the VR venue.

28D is a bi-directional fiber optics and/or copper cable communications link between the VR modules 25D and 26D and 6D mounted on the top of goal post 27D.

29D is a bi-directional fiber optics and/or copper cable communications link between the VR modules 22D and 24D and 18D mounted on the top of goal post 23D.

30D is a bi-directional RF communications link between the VR modules 22D and 24D and the authorized operator 32D.

31D is a bi-directional RF communications link between the VR modules 25D and 26D and the authorized operator 32D.

FIG. 5 is a diagram of a typical VR venue equipped with a wireless RF bi-directional communications link and fiber optics links to televise VR multimedia content, from four VR modules 22D, 24D, 25D and 26D each mounted on the top of the football goal post uprights which are inside the VR venue.

Referring to the preferred embodiment specified in FIG. 5, a typical VR venue equipped to televise VR multimedia content from a multiplicity of VR modules inside the VR venue to a VR viewing audience using VR display apparatus is disclosed.

FIG. 5 shows a typical VR venue 1D equipped for televising VR multimedia content from four VR modules 22D, 24D, 25D and 26D employing multipoint diversity reception techniques. It should be noted for this preferred embodiment, that the VR modules 22D, 24D, 25D and 26D shown on top of the goal posts are not likely to be moved during a VR session. However, there may be other VR modules placed inside the VR venue besides 22D, 24D, 25D and 26D that are movable and will be moved during a VR session. It is for these movable VR modules that the multipoint diversity reception wireless communication technique is most useful.

Some VR venues are located in areas where only a poor signal to noise ratio can be achieved due to radio frequency interference from other sources within the vicinity while attempting to receive real-time televised images and sounds from VR modules 22D, 24D, 25D and 26D. In these cases the multipoint diversity reception wireless communication technique is useful for fixed VR modules like 22D, 24D, 25D and 26D as well.

Six antenna arrays 4D, 7D, 11D, 14D, 17D and 19D are each equipped with electronics that facilitate high-speed real-time bi-directional communication, with the VR modules 22D, 24D, 25D and 26D using the 802.11(xx0 protocol operating within the unlicensed 2.4 ghz or 5.8 ghz spectrum, and the authorized operator 32D via Ethernet or fiber optic cabling. The six antenna arrays 4D, 7D, 11D, 14D, 17D and 19D are deployed off of the playing field and VR venue 1D. The communication link between the six antenna arrays and the four VR modules 22D, 24D, 25D and 26D is wireless, whereas the communication link between the antenna arrays 4D and the authorized operator 32D is hard wired i.e. using 33D.

The antenna array relay junction 2D receives the high quality real-time pictures and sound captured by the VR modules 22D, 24D, 25D and 26D during a VR session using multiple antenna arrays placed at strategic points. These points may be located near the ground level or at a substantial height above the floor level of the VR venue depending on the radio frequency architecture and/or noise floor and interference characteristics of the particular VR venue.

In this preferred embodiment, a set of bi-directional communications cables 3D, 6D, 9D, 12D, 15D and 18D are used to connect each of the six antenna arrays 4D, 7D, 11D, 14D, 17D and 19D to the authorized operator 32D via bi-directional communications cable junctions 5D, 8D, 10D, 13D, and 16D.

Each of 3D, 6D, 9D, 12D, 15D and 18D consist of a separate category six UTP unshielded twisted pair cable assembly. Due to the large area of a VR venue throughout which 3D, 6D, 9D, 12D, 15D and 18D must span, category six cables should be used since they are capable of handling the required bandwidth with minimal losses to the signal path. Other types of cabling can also be used including multi-function fiber optic cable assemblies, provided such cabling can handle the required signal bandwidth.

The cabling system segments and related hardware 3D, 5D, 6D, 8D, 9D, 10D, 12D, 13D, 15D, 16D and 18D are also used to convey electric power supplied by electronic hardware within the authorized operator 32D to the electronics within each antenna array 4D, 7D, 11D, 14D, 17D and 19D.

Bi-directional communications cable junctions 5D, 8D, 10D, 13D, and 16D are points in the cable installation that facilitate ease of access to 3D, 6D, 9D, 12D, 15D and 18D by personnel in the event servicing or future upgrades of the wired network is required.

Installation of 3D, 5D, 6D, 8D, 9D, 10D, 12D, 13D, 15D, 16D and 18D within the VR venue structure can be accomplished in several ways depending on the VR venue's architecture. For example a run of electrical conduit containing 3D, 6D, 9D, 12D, 15D and 18D can be used between each antenna array location and the authorized operator 32D.

It is also possible that an existing wired or optical data network, already present within the VR venue 1D, be used in lieu of 3D, 5D, 6D, 8D, 9D, 10D, 12D, 13D, 15D, 16D and 18D, provided such existing network is capable of handling the required bandwidth and power.

The electronics within each antenna arrays 4D, 7D, 11D, 14D, 17D and 19D, convey to the electronic hardware located at the authorized operator 32D, received signal strength indication and status data information along with the specific payload data packet which consists primarily of the image and audio data captured previously by the VR modules 22D, 24D, 25D and 26D.

The electronic hardware located at the authorized operator 32D executes an algorithm that in real-time continuously monitors and compares the received signal strength indication and status data information from each of the corresponding antenna arrays 4D, 7D, 11D, 14D, 17D and 19D and determines dynamically which antenna array to use to receive the best overall specific payload data packet from the VR modules 22D, 24D, 25D and 26D.

Additionally, the electronic hardware located at the authorized operator 32D executes an algorithm that in real-time continuously monitors, compares and determines dynamically the radio frequency, gain, polarization and error correction that should be applied by the antenna array's electronics to receive the best overall specific payload data packet from the VR modules 22D, 24D, 25D and 26D.

By proper real-time selection of the radio frequency, gain and polarization the electronics hardware at the authorized operator 32D can ensure that the images and sounds captured by the VR modules 22D, 24D, 25D and 26D will be of high quality and will have sufficient stability to allow additional decoding and post processing of the payload data packet by the other electronics hardware and software.

By proper real-time selection of the correct antenna arrays, the electronics hardware can ensure that the images and sounds captured by the VR modules 22D, 24D, 25D and 26D will be of high quality and will have sufficient stability to allow additional decoding and post processing of the payload data packet by the other electronics hardware and software.

Single point non diversity reception refers to a wireless communication technique whereby a single physical repeater antenna array location within a VR venue is used to convey the radio frequency signals traveling to and from the VR modules. The quality and reliability of the signals received by the VR modules 22D, 24D, 25D and 26D when using this technique relies heavily on the assumption that a decent signal to noise ratio is attainable even while the VR modules 22D, 24D, 25D and 26D are moved throughout the VR venue during a VR session.

Multipoint diversity reception refers to a wireless communication technique whereby a network of multiple physical repeater antenna arrays are located within a VR venue and are used to convey the radio frequency signals traveling to and from the VR modules. The signals intercepted at each repeater location are individually compared by the network transceiver at the authorized operator and the strongest signal with the best signal to noise ratio is automatically selected for application to the other electronics i.e. repeater antennas at the VR venue. The quality and reliability of the signals received by the authorized operator when using this technique is far less dependent on the assumption that a decent signal to noise ratio is attainable from what a single repeater antenna array location would achieve even while the VR modules 22D, 24D, 25D and 26D are moving throughout the VR venue i.e. during a VR session.

FIG. 6

Figure 6:
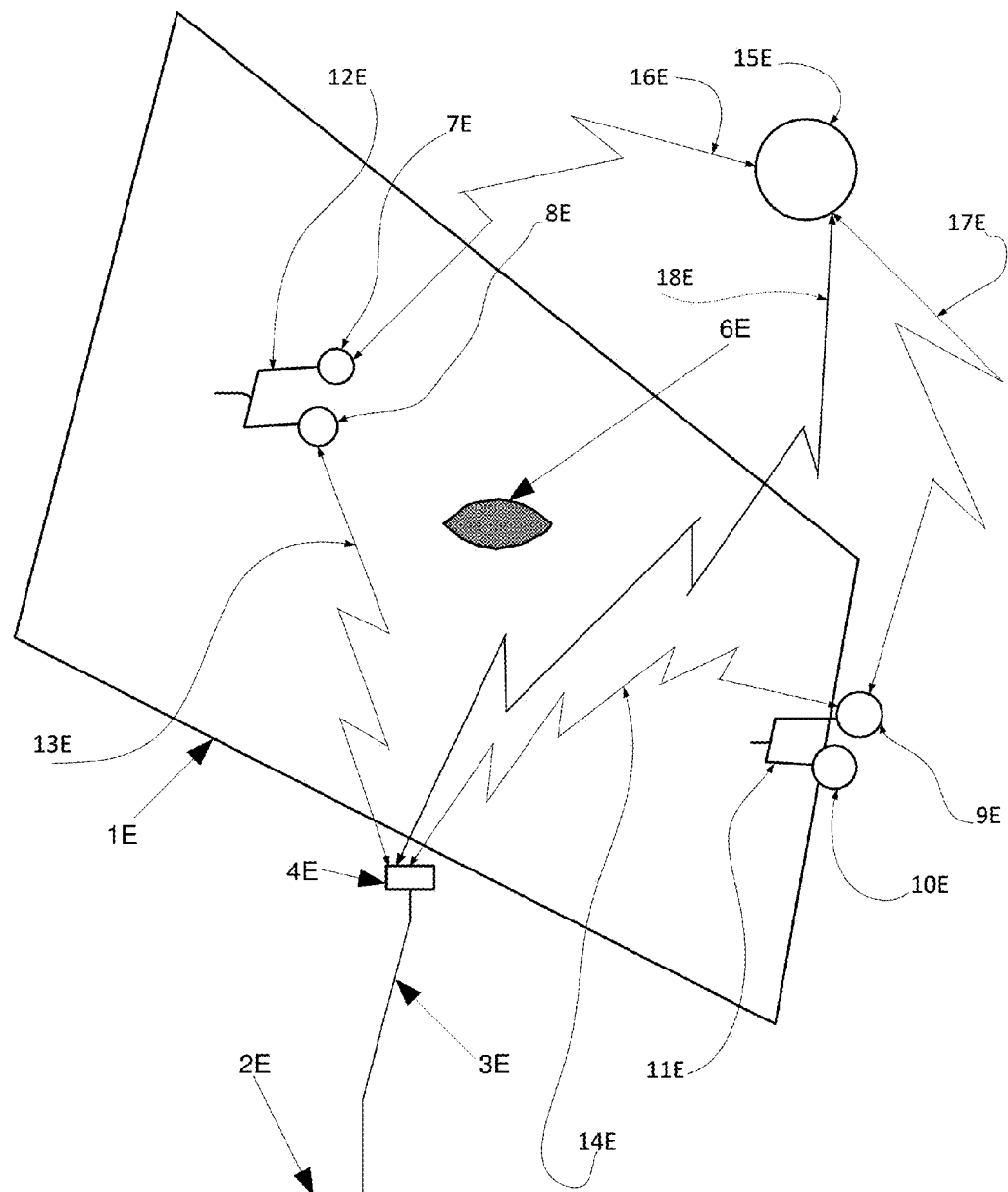
FIG. 6 is a diagram of a typical VR venue equipped with a wireless RF bi-directional communications link to communicate VR multimedia content from VR modules via a single antenna repeater.

The detailed physical elements disclosed in the typical VR venue drawing shown in FIG. 6 are identified as follows: 1E is the VR venue. 2E is the antenna array relay junction. 3E is the bi-directional communications cable.

4E is an antenna repeater array (or antenna array for shorthand) for bi-directional RF communications between 2E and the four VR modules 7E, 8E, 9E and 10E and an authorized operator 15E. 5E (not shown). 6E is a football on the VR venue playing field. 7E is a VR module mounted on the top of the goal post 12E upright. 8E is a VR module mounted on the top of the goal post 12E upright. 9E is a VR module mounted on the top of the goal post 11E upright. 10E is a VR module mounted on the top of the goal post 11E upright. 11E is a football goal post. 12E is a football goal post. 13E is a bi-directional RF communication link between 4E and 7E and 8E. 14E is a bi-directional RF communication link between 4E and 9E and 10E. 15E is a authorized operator. 16E is a bi-directional RF communication link between 15E and 7E and 8E. 17E is a bi-directional RF communication link between 15E and 9E and 10E. 18E is a bi-directional RF communication link between an authorized operator 15E and antenna repeater array 4E.

FIG. 6 is a diagram of a typical VR venue equipped with a wireless RF bi-directional communications link to communicate VR multimedia content from VR modules via a single antenna repeater.

FIG. 6 shows a typical football field VR venue equipped with a wireless bi-directional RF communications link to televise VR media content VR sessions from four VR modules, which are inside the VR venue and mounted on the tops of the uprights of the football goals, and a antenna array relay junction 2E. The VR audience receives the VR media content via the antenna array relay junction 2E.

Referring to the preferred embodiments specified in FIG. 6, a typical VR venue equipped to televise VR multimedia content from VR modules inside a VR venue to a VR audience is disclosed.

Typical VR modules like those shown in FIG. 1 and FIG. 2 and FIG. 9B and FIG. 8 are disclosed elsewhere in the description of the present invention.

FIG. 6 shows a typical VR venue 1E with the VR venue equipped for televising pictures and sound from four VR modules employing single-point non-diversity reception techniques.

The disclosed preferred embodiment uses only a single antenna point 4E. This becomes practical in VR venues that are located in areas where a good signal to noise ratio can be achieved, due to reduced and/or non-existent radio frequency interference from other sources within the vicinity, while attempting to receive real-time televised images and sounds from VR modules like 7E, 8E. 9E and 10E.

The antenna array 4E is equipped with electronics that facilitates high-speed real-time bi-directional communication, with the VR module 7E, 8E, 9E and 10E using the 802.11(xx0 protocol operating within the unlicensed 2.4 GHz or 5.8 GHz spectrum, and the antenna array relay junction 2E via Ethernet or fiber optic cabling 3E. The communication link between the antenna array 4E and the VR modules 7E, 8E, 9E and 10E is wireless, whereas the communication link between the antenna array and the VR audience is diverse.

A VR audience receives the high quality real-time pictures and sound captured by the VR modules 7E, 8E, 9E and 10E during a VR session using a single antenna repeater array 4E placed at a strategic point. This point may be located near the ground level or at a substantial height above the VR venue ground level depending on the radio frequency architecture and/or noise floor and interference characteristics of the particular VR venue.

Cable 3E consists of a separate category six UTP unshielded twisted pair cable assembly. Due to the large area of a typical VR venue the length of 3E can be large between the antenna array 4E and the antenna array relay junction 2E. Category six cables are used since they are capable of handling the required bandwidth with minimal losses to the signal path and can carry power. Other types of cabling can also be used including multi-function fiber optic cable assemblies, provided such cabling can handle the required signal bandwidth and can carry power. The antenna array relay junction 2E is the stepping off point for transmission of the VR media content captured by the four VR modules to the VR viewing audience.

The cabling system has only a single segment 3E and is used to convey both bi-directional data as well as power to the antenna array 4E. Because only a single segment is used, implementation of the complete hardware setup is easy to place into operation. The reduced complexity is a useful advantage to personnel setting up this equipment at VR venues like for example sporting events or training sessions.

Installation of 3E within the VR venue structure can be accomplished in several ways depending on the VR venue's architecture. For example, a run of electrical conduit containing 3E can be used.

It is also possible that an existing wired or optical data network that may already be present within the VR venue be used in lieu of 3E provided the existing network is capable of handling the required bandwidth and power.

The electronics within the antenna repeater array 4E conveys to the electronic hardware located at the authorized operator 15E information including received signal strength indication and status data along with the specific payload data packet which consists primarily of the image and audio data captured previously by the VR modules 7E, 8E, 9E and 10E.

The electronic hardware located at the authorized operator 15E executes an algorithm that in real-time continuously monitors and compares the received signal strength indication and status data information from the antenna array 4E with an algorithm and determines dynamically the radio frequency, gain, polarization and error correction that should be applied by the antenna repeater array electronics to receive the best overall specific payload data packet from the VR modules 7E, 8E, 9E and 10E.

By proper real-time selection of the radio frequency, gain and polarization the electronics hardware at remote base station 2E can ensure that the images and sounds captured by the VR modules 7E, 8E, 9E and 10E will be of high quality and will have sufficient stability to allow additional decoding and post processing of the payload data packet by the other electronics hardware and software located at the antenna repeater array.

Single point non diversity reception refers to a wireless communication technique whereby a single physical repeater antenna array location like 4E within a VR venue is used to convey the radio frequency signals traveling to and from each of the VR modules to the VR audience via the antenna array relay junction 2E. The quality and reliability of the signals received at the single physical repeater antenna array location 4E when using this technique relies heavily on the assumption that a decent signal to noise ratio is attainable even while the VR module is in moved throughout such a VR venue, i.e. during a VR session.

FIG. 7

The detailed physical elements disclosed in the typical VR venue drawing shown in FIG. 7 are identified as follows: 1F is the VR venue. 2F is the region outside and adjoining the VR venue. 3F is the boundary beyond the VR venue. 4F is an instrumentation package(s) inside VR module 5F. 5F is a VR module. 6F is the bidirectional wireless radio wave communication link between VR module 5F and the antenna array relay junction 8F. 7F is the bidirectional fiber optics cable/copper cable communication and power link between VR module 5F and the antenna array relay junction 8F. 8F is the antenna array relay junction. 9F is the bidirectional fiber optics cable/copper cable communication link between the antenna array relay junction 8F and the VR audience 10F. 10F is the VR audience using VR display apparatus. 11F is the bidirectional wireless radio wave communication link between the antenna array relay junction 8F and VR audience 10F. 12F is the bidirectional wireless radio wave communication link between VR module 14F and the antenna array relay junction 8F. 13F is an instrumentation package(s) inside VR module 14F. 14F is a VR module. 15F is the bidirectional fiber optics cable/copper cable communication and power link between the VR module 14F and the antenna array relay junction 8F. 16F is a bi-directional fiber optics cable/copper cable carrying the internet to the antenna array relay junction 8F. 17F is the authorized operator's laptop computer. 18F is a bi-directional fiber optics cable/copper cable carrying the internet to the antenna array relay junction 8F. 19F is an internet connection between 17F and the internet connection 18F. 20F is the interpupillary distance between the cameras in VR module 14F and VR module 5F. 21F is the bidirectional fiber optics cable/copper cable communication and power link between the VR module 5F and the authorized operator 17F. 22F is the bi-directional wireless radio wave communication link between the authorized operator 17F and the VR module 5F.

FIG. 7 is a top view of a typical VR venue 1F that has been configured and equipped with two VR modules 5F and 14F, for both televising from inside the VR venue, and for streaming from inside the VR venue, using bi-directional wireless radio wave communication links and/or bi-directional fiber optics cable and bi-directional high speed copper network communications cable links.

FIG. 7 shows two VR modules for capturing pictures and sounds from inside a VR venue and communicating the VR multimedia content to VR display apparatus via the internet and antenna relay junction 8F. Examples of the VR modules are those shown in FIG. 1A, FIG. 1B, FIG. 1C and FIG. 2A, FIG. 2B, FIG. 2C and FIG. 9A, FIG. 9B and FIG. 8A and FIG. 8B and FIG. 8C of the present invention.

The present invention contemplates that the instrumentation packages 4F and 13F within the VR modules 5F and 14F be instrumented with a transceiver and antennas capable of transmitting radio signals encoded with the picture and sound information to an antenna array relay junction 8F. The present invention contemplates that VR modules 5F and 14F are instrumented with cameras and microphones enabling them to acquire pictures and sounds of the VR venue. Electronics within the instrumentation packages 4F and 13F televises the pictures and sounds to an antenna array relay junction 8F.

In a preferred embodiment, where the VR modules are positioned in stationery locations inside the VR venue, the authorized operator remotely electronically adjusts the phase of the antennas in each VR module to concentrate their transmissions on the antenna array relay junction 8F. This increases the signal to noise ratio for the transmissions.

The instrumentation packages 4F and 13F are used to instrument the VR modules 5F and 14F to televise the VR venue. FIG. 7 is a top view of a typical VR venue 1F that has been configured and equipped for use with two VR modules 5F and 14F for capturing VR multimedia content and using bi-directional wireless radio wave communication links 6F and 12F, and/or bi-directional fiber optics cable and bi-directional high speed copper network communications cable links 7F and 15F. The two VR modules 5F and 14F are positioned at either end of VR venue 1F. The VR modules 5F and 14F can be manufactured in a variety of shapes and different sizes.

The two VR modules 5F and 14F are equipped for bi-directional wireless radio wave 3-D stereo television and/or bi-directional fiber optics cable/copper cable 3-D stereo television operation to be used to drive the VR display apparatus, employing single point non-diversity communication techniques and/or multi point diversity communication techniques. The two VR modules 5F and 14F are equipped to be enabled, commanded and controlled by administrative data conveyed simultaneously and bi-directionally from/to an authorized operator utilizing both bi-directional wireless radio wave and bi-directional fiber optics cable/copper cable communication links.

The VR modules bi-directionally transmit and receive control signals between the VR modules and the antenna array relay junction in the VR venue, and transmit TV signals from the VR modules to the antenna array relay junction in the in the VR venue. The VR modules can do this wirelessly and/or by employing a bi-directional fiber optics/copper cable communications network if it is available in the VR venue. If electrical power is available in the VR venue, it too is cabled and routed up from the ground into the VR modules. If a bi-directional fiber optics/copper cable communications network is available in the VR venue, its cabling is also routed up from the ground through to the VR modules using the VR module's fiber optics/copper cable connector.

In a preferred embodiment, a fiber optics cable/copper cable bi-directional communications link is buried underneath the ground of the VR venue. In addition to being a bi-directional communications link, the copper cable carries electrical power as well. The VR modules are constructed with fiber optics/copper cable connectors which connect to the fiber optics cable/copper cable bi-directional communications and power link mating cable connectors that come up from the ground beneath the VR modules.

In another preferred embodiment, the internet cable 16F is connected directly to the antenna array relay junction 8F. The internet is then wirelessly connected to the VR modules 5F and 14F by RF transmission 12F and 6F between the antenna array relay junction 8F and the VR modules 14F and 5F. The internet 16F is also routed by the antenna array relay junction 8F to the VR modules 14F and 5F by underground cables 15F and 7F. This embodiment has an advantage in that it gives the VR modules 14F and 5F two additional ways to stream on the internet besides communicating wirelessly with the internet using a cell tower. This is useful especially when the cell tower provides low signal strength to the VR modules 14F and 5F. This embodiment has an additional advantage of providing greater bandwidth. 17F is the authorized operator's laptop computer. 18F is a bi-directional fiber optics cable/copper cable carrying the internet to the antenna array relay junction 8F. 19F is an internet connection between 17F and 18F.

The WIFI Communications block shown as item 9F in FIG. 11A permits wireless access and control of administrative functions and operating parameters by a laptop PC operated by an authorized operator remote to the VR modules independent of the instrumentation package's Cellular streaming capabilities. An authorized operator at the VR venue for example, can activate the camera system prior to a VR session using the authorized operator's laptop PC logged into the WIFI communications block and subsequently deactivate it after the VR session has finished.

Access to the instrumentation packages via WIFI, or by any other means i.e. radio or cable or the internet, is purposely limited to authorized personnel only through the use of a private encryption software key. The control and administration of other features of the instrumentation packages are available to personnel such as Battery Life remaining, Camera Selection and Picture Format, Microphone gain, Audio format selection, etc. Wireless connection to a local WIFI Relay server is possible using the same WIFI Communications block to convey captured pictures and sound to wireless VR viewing audience's VR display apparatus at the VR venue at the discretion of authorized field personnel independent of instrumentation package's Cellular streaming.

FIG. 8A and FIG. 8B and FIG. 8C

The detailed physical elements disclosed in the VR module drawings shown in FIG. 8A and FIG. 8B and FIG. 8C are identified as follows: 1G is the y-axis of camera 43G. 2G is the y-axis of symmetry of the VR module. 3G is the y-axis of camera 44G. 4G is the side of the VR module. 5G is a lower induction coil used to charge the battery pack inside the instrumentation package. 6G is a lower induction coil used to charge the battery pack inside the instrumentation package. 7G is a plane-parallel-flat optical window. 8G is the top of the VR module. 9G is the front side of the VR module. 10G is the side of the VR module. 11G is the central hub of the instrumentation package containing the battery pack. 12G is the buffer plate. 13G is the bottom of the VR module. 14G is the bellows segment of the instrumentation package. 15G is the x-axis of symmetry of the VR module. 16G is the bottom of the instrumentation package. 17G is the side of the instrumentation package. 18G is the top of the instrumentation package. 19G is the top of the VR module. 20G is the plane-parallel-flat optical window. 21G is the front side of the VR module. 22G is the right side of the VR module. 23G is the upper protective cover plate. 24G is the lower protective cover plate. 25G is a wireless radio antenna. 26G is a wireless radio antenna. 27G is a wireless radio antenna. 28G is a wireless radio antenna, 29G is the z-axis of the camera whose optical window is 20G. 30G is the z-axis of the instrumentation package and the VR module. 31G is the z-axis of the camera whose optical window is 7G. 32G is a fiber optics/copper cable connector in the bottom of the instrumentation package. 33G is a lower induction coil. 34G is a lower induction coil. 35G is an optical window. 36G is an optical window. 37G is the z-axis of the camera whose optical window is 35G. 38G is the z-axis of the camera whose optical window is 36G. 39G is the bellows section of the instrumentation package belonging to optical window 36G. 40G is the bellows section of the instrumentation package belonging to optical window 35G. 41G is a camera. 42G is a camera. 43G is a camera. 44G is a camera. 45G is a camera lens. 46G is a camera lens. 47G is a camera lens. 48G is a camera lens. 49G is a microphone. 50G is a microphone. 51G is a gas valve. 52G is an access lid heat sink. 53G is a microphone. 54G is the microphone cable. 55G is the microphone connector. 56G is the rechargeable battery pack. 57G is a microphone. 58G is a microphone. 59G is a microphone. 60G is a microphone. 61G is a microphone. 62G is a microphone.

FIG. 8A is a top view of a four camera single sided VR module.

FIG. 8B is a front view of the four camera single sided VR module.

FIG. 8C is a side view of the four camera single sided VR module.

This preferred embodiment is distinguished from the previously disclosed preferred embodiments in that this preferred embodiment has TV cameras peering out from only one of the planar sides of the VR module. This embodiment is only capable of covering a field of view of 180 degrees. The advantage of this embodiment is that the cost to manufacture it is less that the previously disclosed two sided embodiments.

Referring to the preferred embodiment disclosed in FIG. 8A and FIG. 8B and FIG. 8C, a VR module equipped with four wireless radio wave 3-D stereo television cameras employing single point, multi point and/or multi point diversity reception techniques is specified. The VR module is equipped to be enabled, commanded and controlled by administrative data conveyed simultaneously from the authorized operator utilizing wireless radio communication. The VR module uses the instrumentation package shown in FIG. 21A and FIG. 21B. The instrumentation package shown in FIG. 21A and FIG. 21B uses four of the instrumentation package elements shown in FIG. 12.

A conventional VR module is traditionally a black colored disk three inches in diameter by one inch thick. The VR module is three inches in diameter and one inch thick. The VR module contains one instrumentation package 11G inside it. The VR module material 19G is vulcanized hard black rubber. The VR module is used inside a VR venue.

The instrumentation package 11G is disclosed in FIG. 21A and FIG. 21B. The four identical instrumentation package elements which constitute a major part of the instrumentation package 11G are disclosed in FIG. 12.

Referring to drawings FIG. 8A and FIG. 8B and FIG. 8C, in a preferred embodiment, the present invention contemplates a VR venue, which when used on any VR venue can wirelessly and autonomously televise VR venue under the command and control of the authorized operator.

The VR module employs a four camera instrumentation package substantially identical to the instrumentation package shown in FIG. 21A and FIG. 21B. Four instrumentation package elements are primary parts of the instrumentation package. The instrumentation package uses the identical instrumentation package elements disclosed in FIG. 12.

As with the previous embodiments, the present invention provides the VR viewing audience with VR multimedia content for 3-D stereo pictures and 3-D sound.

It is understood that as the state of the art in TV camera technology advances, that there will be other better TV cameras that use other than CCD and CMOS technology. The present invention will work equally well with them as they become available. Therefore, the present invention uses CCD and CMOS TV cameras as an example of TV cameras that may be used simply because they are the best that today's technology offers, and is not confined only to their sole use in the future.

Referring to the disclosed VR module shown in FIG. 8A and FIG. 8B and FIG. 8C, the VR module has one instrumentation package 11G mounted inside the VR module. Details of instrumentation package 11G are specified in FIG. 21A and FIG. 21B.

The instrumentation package 11G carries four CCD sensor arrayed cameras 41G, 42G, 43G, and 44G. The instrumentation package 11G carries three microphones 49G, 50G, and 53G. The four cameras 41G, 42G, 43G, and 44G in the instrumentation package 11G are arranged into two pairs 41G, 42G and 43G, 44G. The imagery from each camera in the pair is combined by the processors in the VR module to be broadcast as 3-D video to the VR viewing audience. Each camera pair effectively becomes a 3-D stereo camera pair. The first 3-D stereo camera pair is comprised of cameras 41G and 42G. The second 3-D stereo camera pair is comprised of cameras 43G and 44G. The pairs of cameras 41G, 42G and 43G, 44G act independently of one another to simultaneously produce two 3-D stereo TV pictures of the game. Each of the cameras 41G and 42G that form the first 3-D stereo camera pair 41G, 42G are separated by an interpupillary distance. Each of the cameras 43G and 44G that form the second 3-D stereo camera pair 43G, 44G are separated by an interpupillary distance.

The linear distance separation of the optical axes of the two camera lenses that make up the stereo camera pairs is an important function of the buffer plate. For the buffer plate, the distance measured between the optical axes of the lenses is defined as the interpupilarly distance between the camera lenses.

The diameter of the VR module is kept small to enable its use in confined VR venues where space is at a premium. Typically a VR module is no more than three inches. There are circumstances where the diameter is made less, and some where it is made more than three inches. This dimension puts a practical limitation on the maximum interpupillary distance between the cameras that make up a 3-D stereo camera pair. For todays state of the art SD/HD cameras with body diameters of 0.7 inches for example, and assuming a generous clearance of 0.25 inches between the walls of the VR module and the camera bodies, this leaves 1.8 inches for interpupillary distance, or 45.72 mm. Therefore, the axial separation between each 3-D stereo pair of camera lenses can vary up to 46 mm in this example. Therefore in this example, the separation between 29G and 31G can vary up to 46 mm, and the separation between 37G and 38G can vary up to 46 mm also. It is understood that different interpupillary distances produce different 3-D effects. For example, larger interpupillary distance will produce more striking 3-D effects. In the future, as SD/HD cameras get smaller in diameter we may be able to raise the interpupillary distance to 46 to 57 mm.

The 3-D stereo camera pair 41G and 42G in the instrumentation package 11G that forms the first 3-D stereo camera pair has optical windows 35G and 36G respectively. The 3-D stereo camera pair 43G and 44G in the instrumentation package 11G that forms the second 3-D stereo camera pair has optical windows 20G and 7G respectively. The two cameras 41G and 42G in the instrumentation package 11G that form the first 3-D stereo camera pair have optical axes 37G and 38G. The two cameras 43G and 44G in the instrumentation package 11G that form the second 3-D stereo camera pair have optical axes 29G and 31G. The interpupillary distance for both of these 3-D stereo camera pairs is set to be identical.

The lines of sight of the first and of the second 3-D stereo camera pairs are both looking straight upward from the top 8G of the VR module along their respective optical axes. Their lines of sight are all parallel to one another. The SD/HD letter box picture formats of cameras 41G and 42G are aligned together. The SD/HD letter box picture formats of cameras 43G and 44G are aligned together also. Video information from all four cameras is processed and transmitted simultaneously from the VR module.

The SD/HD letter box picture formats of cameras 41G and 42G and 43G and 44G are aligned together so that any two of the four cameras can be configured to be a 3-D stereo camera pair in the VR module's processing software. Gyroscope data from the VR module accompanies the video data from its cameras wherein they are processed together to stabilize the video and audio of the VR venue transmitted from the VR module to the VR display apparatus.

The gyroscope data is processed by the VR module's software to yield the spin rate, spin sense and direction of forward motion of the VR module. The spin rate, spin sense and direction of forward motion is then used by the processor to remove the spin from the imagery through derotation processing which stabilizes the imagery in the SD/HD letterbox picture format and holds it upright for broadcast to VR viewing audiences.

The VR module has two protective cover plates 23G and 24G embedded and molded into it. One protective cover plate 23G is on the top and one 24G is on the bottom of the VR module. The outer body of the top protective cover plate 23G is made spherically dome shaped. The entire body of the bottom protective cover plate 24G is made flat and has rounded edges like the edges on the top protective cover plate 23G.

The materials chosen for the protective cover plates 23G and 24G in the present preferred embodiment are polycarbonates, ABS or fiber reinforced plastics. Although a variety of other materials would function equally as well. Polycarbonates, ABS or fiber reinforced plastics have an advantage in that they are lightweight and stiff, enabling their thickness to remain thin while still delivering the significant stiffness needed to perform their mechanical shielding function in the limited space they can occupy within the VR module. They have an additional advantage in that they are transparent to the transmitted and received radio waves which need to move to and from the antennas 25G, 26G, 27G and 28G inside the VR module without absorption or reflection.

The instrumentation package 11G is sandwiched between the top and bottom protective cover plates 23G and 24G. The purpose of these protective cover plates 23G and 24G is to act as mechanical shields to protect the instrumentation package assembly 11G from being damaged during the game. During the normal course of the game, the top 8G of the VR module will be hit and crushed by the players and by their equipment. For example, persons may step on the VR module or slide into it, or hit it. They may even drop their knees on it. The two protective cover plates 23G and 24G protect the instrumentation package 11G within the VR module from physical damage due to these hits.

The space between the top 8G, bottom 13G and sides of the VR module and the protective cover plates 23G and 24G is filled with vulcanized hard rubber or synthetic rubber encapsulating material 19G. Synthetic rubber is an example of an encapsulating material that is used besides vulcanized hard rubber to mold the disk. When cured, this encapsulating material 19G acts to absorb shock and vibration to the VR module. The material 19G encapsulates the upper and lower protective cover plates 23G and 24G and maintains their positions inside the VR module. The space between the protective cover plates 23G and 24G and the instrumentation package 11G is also filled with the same encapsulating material. When cured, this encapsulating material 19G acts to absorb shock and vibration to the instrumentation package 11G. The material 19G encapsulates the instrument package 11G inside the VR module and thereby maintains its position centered with 30G coaxial with the mechanical z-axis of the disk inside the molded VR module.

The top protective cover plate 23G is made flat in its innermost region close to the optical windows 35G, 36G and 20G, 7G. The purpose of making it flat in its innermost region is to provide maximum protection for the optical windows 35G, 36G and 20G, 7G whose surfaces are at the very top 8G of the VR module. The flat shape enables the protective cover plate 23G to surround the optical windows 35G, 36G and 20G, 7G at the top 8G of the VR module where the optical windows 5G, 36G and 20G, 7G are most likely to be exposed to the greatest threat of damage due to hits to the top of the VR module. The upper protective cover plate 23G is buried in encapsulating material at the center top of the VR module around the optical windows 35G, 36G and 20G, 7G by approximately 1/32 inch or more below the top 8G. The dome shape enables the upper protective cover plate 23G to come very close to the top center of the VR module where persons will have only grazing contact with its curved surface if they crash into the VR module, thereby eliminating the threat of injury to persons if they hit the top of the VR module. Furthermore, the spherical shape of the protective cover plate 23G causes its edge to be rounded downward away from the top 8G and places it approximately 1/2 inch or more below the top surface 8G of the VR module.

The lower protective cover plate 24G is entirely flat and is buried in encapsulating material 19G approximately 1/4 inch or more above the bottom surface of the VR module. The body of the lower protective cover plate 24G is made flat because it is buried inside the VR module and there is no danger of persons coming into violent contact with it. The flat shape is easier to make and less expensive to manufacture. Its thickness is also made in the range of approximately 1/8 to 1/4 inches. The thickness of the lower protective cover plate 24G is not physically restrained because of its location, as is the case with the upper protective cover plate 23G.

In all cases, the rounded edges of the protective cover plates 23G and 24G come within no less than 1/4 inch or more from all sides of the VR module.

In another preferred embodiment where we need to reduce the manufacturing cost of the VR module, we exclude the protective cover plate, buffer plate assembly, molded encapsulating material, gas valve and gastight access lid from the construction of the VR module. These VR modules can be used in VR venues where there is no hostile environment.

Alignment of all four cameras of the VR module is achieved using the following representative procedure. The first camera pair 43G and 44G is aligned together in rotation about their respective z-axes within the instrumentation package 11G so that they simultaneously yield wirelessly transmitted upright 3-D stereo images to the authorized operator which appear between the center and the bottom of the picture frame, and have their letterbox picture frames aligned together. The second camera pair 41G and 42G is aligned together in rotation about their respective z-axes within the instrumentation package 11G so that they simultaneously yield wirelessly transmitted upright 3-D stereo images of the hockey net which appear between the center and the bottom of the picture frame, and have their letterbox picture frames aligned together with those of cameras 43G and 44G so that they are all superimposed on one another.

3-D stereo camera pair 43G and 44G will enable the VR viewing audience to see what the VR module sees.

Microphones 49G, 50G and 53G will deliver sound to the VR viewing audience. The sound signals are broadcast or streamed to the VR viewing audience from the VR module.

The sound signals received from each of the microphones by the VR viewing audience have been processed in the VR module using special software to produce the format needed by the VR display apparatus to produce 3-D surround sound.

The televised images viewed by the VR audience are maintained upright in the HD letterbox picture frame despite any rotational motions of the VR module, by transmitting pitch, yaw and roll data from the gyroscopes along with the televised image data from the cameras in the instrumentation package 11G to the VR module which processes the imagery and sound and gyroscope data in its hardware and software and derotates the imagery and sound and holds it upright and stable for the VR audience. Pitch, yaw and roll gyroscopes and encoders are part of the supporting electronics in the instrumentation package inside the VR module.

In a preferred embodiment where standard SD/HD letterbox CCD chips are used in the cameras, since the shape of the CCD and CMOS sensor array of pixel elements is a letterbox, this causes the common area of pixels of the physically spinning letterbox to be a square covering only 9/16 or 56% of the field of view of the whole letterbox. Therefore, in a preferred embodiment using standard camera chips we loose 44% of the field of view and are reduced essentially to a square picture format. We can recover the field of view by using physically larger sized standard chips and shorter focal length camera lenses.

In another preferred embodiment, circular arrayed HD CCD and CMOS TV camera sensor chips are used in the four cameras 41G, 42G, 43G and 44G rather than ordinary prior art CCD and CMOS sensor chips. These circular arrays of HD CCD and CMOS TV camera sensors have an advantage over ordinary HD CCD and CMOS sensor chips because they permit transmission of the entire circular sensor array to the VR module for processing, even though the VR module is spinning. The pixel elements of ordinary prior art CCD and CMOS sensor chips cover only the area of the letterbox, thereby causing a loss of field of view when the VR module spins. Use of the circular arrayed HD CCD TV camera sensor chips eliminates this problem of field of view loss when the VR module spins. Using software, the SD/HD letterbox picture frame format is made to spin in sync with the spin of the VR module in the processor to derotate and stabilize the imagery and lock it in its upright position relative to the direction of forward motion of the VR module without loss of any of the field of view. For example, as the VR module spins i.e. on an ice rink about its z-axis 30G, the optical images formed on all four of the circular arrayed HD CCD or CMOS TV camera sensor chips by the camera lenses 45G, 46G, 47G and 48G, fully fill the circular arrayed sensor's surfaces. Imagery from the entire circular arrayed sensor surface is scanned because all the pixel elements on the sensor are active simultaneously. As the VR module spins on the ice, so does the optical images on the circular arrayed sensor's surfaces of all four chips. The circular arrayed sensors are large enough to cover and track the full SD/HD letterbox picture frame format of the images whatever their rotation angle may be. Image data from all the pixel elements on the face of the circular arrayed sensor is wirelessly transmitted to the VR module's CPU for processing. At the VR module, the spinning virtual electronic SD/HD letterbox frame within the software processor collects the signals from only those pixel elements within the rectangular letterbox borders for transmission to the VR viewing audience. The yaw gyroscopes detect the z-axis 30G spin of the instrumentation package within the spinning VR module and encodes the spin data as well as the pitch and yaw data. The spin (yaw) data along with pitch and yaw data, and the image data from the circular arrayed camera sensors are processed the VR module. The VR module processes the encoded spin data with the image data and delivers a spin stable upright HD letterbox picture to the VR viewing audience. An advantage of this preferred embodiment is that it completely eliminates the need for the mechanical actuators and bearings associated with each of the instrumentation packages. This reduces the weight and the volume requirements of the instrumentation package inside the VR module.

In another preferred embodiment, we can accomplish the same performance as above by using standard square chips, where the dimension of each side of the square is equal to the diameter of the circular arrayed sensor, and we only use the pixel elements inscribed in the circular region of the chip.

It should be noted at this point, that in general any combination of any two of the four cameras can be electronically commanded and controlled by the authorized operator to act as 3-D stereo camera pairs. For example 41G and 42G, 41G and 43G, 41G and 44G, 42G and 43G, 42G and 44G, 43G and 44G.

Each of the microphones 49G, 50G, 58G, 60G listens for sounds from their respective positions on the VR module. The condenser microphones enable the VR viewing audience to hear real-time contacts, impacts and shocks to the VR module by conduction of sound waves in the VR module. Microphones 49G, 50G, 58G, 60G enable the VR audience to hear sounds that result from air or any physical contacts or vibrations to the VR module; like for example, the crash of a person sliding into the VR module; or like for example the VR module sliding on the ice; or like for example the crash of a VR module.

Microphones 53G, 57G, 60G, 61G, 62G protrude through holes in the top of the VR module. They are recessed below the surface of the VR module to prevent them from being damaged. They are molded in place by encapsulation material 19G. Microphone 53G is mounted through a hole in the upper protective cover plate. Microphones 53G, 57G, 60G, 61G, 62G are connected by cables to electrical connector 55G. 55G is connected to the electronics in the instrumentation package 18G. Microphones 53G, 57G, 60G, 61G, 62G enables the VR audience to hear sounds that occur in the VR venue like extemporaneous remarks from persons. In certain VR venues the authorized operator may disable these sounds. The authorized operator may disable these sounds remotely by transmitting a microphone disabling signal to the VR module. Microphone 53G enables the VR audience to hear the whoosh of air as it wizes past the VR module. The audio signals from the microphones are processed in the VR module and then transmitted via antennas 25G, 26G, 27G, 28G to the VR display apparatus where they are processed and formatted into 3-D surround sound.

Simultaneously live 3-D TV pictures are taken by the TV cameras 41G, 42G, 43G and 44G of their respective field of views of the live action in the VR venue. Cameras 41G, 42G, 43G and 44G will enable the VR audience to see close-ups from the VR module's perspective. This will be an action packed event never before witnessed by a VR audience.

The four CCD and CMOS sensor arrayed TV cameras 41G, 42G, 43G, and 44G are chosen to be identical to one another. The four TV camera lenses 45G, 46G, 47G and 48G are chosen to be identical to one another. The interpupillary distance between 41G and 42G is identical to the interpupillary distance between 43G and 44G. The field of view of each of the lenses is an extremely wide angle approaching one hundred and eighty degrees. Except for the small parallax between the four images due to the interpupillary distances between the four camera lenses 45G, 46G, 47G and 48G, the images of the VR venue as seen by the four TV cameras as projected onto their four HD circular arrayed CCD sensor arrays, are identical to one another. The cameras and their lenses are arranged symmetrically around the z-axis 30G of the VR module.

In another preferred embodiment, by using two VR modules the 3-D effects can be increased by increasing the dimension of the interpupillary distance which can be extended by choosing two cameras, one inside each VR module, as members of a 3-D stereo camera pair. In this embodiment, the picture frames of each camera are made virtually congruent by rotating the cameras using the mechanical actuator so that the picture frames of the cameras perfectly overlay onto one another and are aligned to one another.

As an example of how the VR module does its image processing, if the VR module is initially located at rest at the center of the VR venue at x-y-z coordinates P(0, 0, 0), with the VR module arranged so that cameras 44G and 43G are aligned along x-axis of the VR venue, and its cameras 41G and 42G are aligned along the y-axis of the VR venue, then the VR viewing audience will see the VR venue N(d, 0, 0) appear upright near the bottom central edge of the HD letterbox picture frame screen format. The initial 3-D image of the VR venue N(d, 0, 0) that the VR viewing audience sees is generated by the images from cameras 41G and 42G because these cameras, which comprise a 3-D stereo camera pair, offer the greatest parallax for objects like the VR venue N(d, 0, 0) which lie along the x-axis. Initially, the stereo camera pair formed by cameras 43G and 44G offer minimum parallax for images of the VR venue.

If the VR module is moving so it accelerates to velocity V along the x-axis of the VR venue toward N(d, 0, 0), and if the VR module has a clockwise spin (or roll) about its z-axis 50G, then as the VR module travels closer to N(d, 0, 0), the VR viewing audience will see the VR venue N(d, 0, 0) be imaged upright above the bottom central edge of the HD letterbox picture frame screen format and see it appear to be growing larger and closer to the center of the letterbox picture frame in 3-D. The pitch, roll and yaw gyroscope data from each of the cameras is simultaneously processed where the spin rate, spin sense, and the forward velocity direction of each of the four cameras is calculated by the processing software. The software in the VR module processes the data it receives from the instrumentation package and aligns the HD letterbox picture frame screen formats of the four cameras so that they are stable relative to the direction of N(d, 0, 0). The software in the VR module processes the data it receives from the instrumentation package, and derotates the spinning imagery that all four TV cameras see, and removes the spin from the imagery of all four cameras to stabilize it and make it upright in the HD letterbox picture frame screen format that the VR viewing audience sees. As the VR module spins, during each and every time interval, the processors alternately select the imagery from the one of the two spinning 3-D stereo camera pairs with the most parallax, in order to maximize the 3-D effect and keep it uniform during any one time interval as the two 3-D stereo camera pairs spin. If this were not done, the VR viewing audience would see the 3-D effects change and fade and then alternately reoccur as the VR module spins and the 3-D stereo camera pairs change angular places relative to N(d, 0, 0).

The VR module receives imagery from all four cameras simultaneously. The VR module's software automatically processes the incoming data stream and sets up the order in time when the processors alternately select which 3-D stereo camera pair's imagery is to be televised to the VR viewing audience as the VR module spins. Except for processing software, the VR module software used in conjunction with the VR module is substantially identical to that specified in and disclosed elsewhere in the present invention. Block diagrams of the electronics circuitry signal and data flows are specified as well.

The 3-D stereo effects of the VR venue N(d, 0, 0) imagery, as seen by the VR audience as the VR module moves forward, are maximized when the parallax in the images between the respective cameras comprising a 3-D stereo camera pair which are televising are maximized. At the point in the VR module's spin where the full interpupillary distance between the cameras comprising the 3-D stereo camera pair perpendicular to the forward direction of the VR module, the 3-D effect of the VR venue image is at a maximum as seen by the VR audience. The parallax in the images between the two respective cameras comprising a 3-D stereo camera pair is maximized when a line drawn between the two cameras comprising the 3-D stereo camera pair is perpendicular to a line drawn from the center of the VR module to the net N(d, 0, 0) which is the direction of the VR module forward motion. Since the two stereo camera pairs are imbedded in the VR module, when the VR module spins, the line drawn between the two cameras will spin also. This changes the angle between the line and the direction of forward motion of the VR module, thereby continuously changing the parallax and the 3-D effects of the net's image. In order to minimize this modulation of the 3-D effect that the VR audience sees as the VR module spins, the processors will alternately select and switch the 3-D stereo camera pair to broadcast to the VR viewers every ⅛ of a turn (or forty-five degree change in rotation angle) of the VR module. The processors easily calculate the time to make the switch based on the data stream from the roll (spin) gyros in the VR module from which they derive the spin rate, spin sense and forward motion direction of the VR module.

In another preferred embodiment, the same four cameras 41G, 42G, 43G, and 44G specified in the previous preferred embodiment are used, but instead of arranging the cameras into the two 3-D stereo camera pairs described previously as the first and second 3-D stereo camera pairs, where 41G and 42G constituted the first 3-D stereo camera pair, and where 43G and 44G constituted the second 3-D stereo camera pair, the cameras 41G, 42G, 43G, and 44G are grouped into four additional unique 3-D stereo camera pairs. The four additional 3-D stereo camera pairs are cameras 41G and 43G; cameras 43G and 42G, cameras 42G and 44G; cameras 44G and 41G. We will call 41G and 43G the third 3-D stereo camera pair. We will call 43G and 42G the fourth 3-D stereo camera pair. We will call 42G and 44G the fifth 3-D stereo camera pair. We will call 44G and 41G the sixth 3-D stereo camera pair.

In order to use the 3-D composite pictures from any one of these four additional 3-D stereo camera pairs, the scan directions of the letterbox picture frame formats must be electronically rotated about the optical axes of the cameras to align their letterbox formats together before televising the VR pictures. Although electronic rotation of the scan direction of the letterbox can be achieved using standard CCD and CMOS sensor chips, the circular arrayed CCD sensor chips are particularly suitable for this application because the letterbox can be rotated without any loss of the field of view of the camera. The authorized operator will verify that the letterbox formats of the pictures from the two cameras that make up each 3-D stereo camera pair are aligned. The letterbox formats must be aligned so that the resultant composite 3-D picture made up of the pictures from the two 3-D stereo cameras will overlay and register with proper parallax to produce the required 3-D sensation in the VR display apparatus of the VR viewing audience.

The additional four 3-D stereo pairs of cameras act electronically and independently to simultaneously produce four additional 3-D stereo TV pictures of the VR venue. They use the same electronics as before, and the same lenses as before as in the previous preferred embodiment.

In the previous preferred embodiment, each of the cameras 41G and 42G that formed the first 3-D stereo camera pair 41G, 42G are separated by as much as a 46 millimeter interpupillary distance. Each of the cameras 43G and 44G that formed the second 3-D stereo camera pair 43G, 44G are separated by 46 millimeters.

It can be seen from simple geometry that the interpupillary distance for the third, fourth, fifth and sixth 3-D stereo camera pairs is equal to one half the square root of two times the interpupillary distance for either the first or second 3-D stereo camera pairs. For example, if the interpupillary distance for the first 3-D stereo camera pair is 46 millimeters, then the interpupillary distance for the third 3-D stereo camera pair would be 0.707 times 46 millimeters or 32.5 millimeters.

75 millimeters is the maximum interpupillary distance of the average human's eyes. It is understood that other alternative interpupillary distances may be used to produce other alternative 3-D effects. For example, larger interpupillary distance will produce more striking 3-D effects.

The 3-D stereo camera pair 41G and 43G in the instrumentation package 11G that forms the third 3-D stereo camera pair, has optical windows 35G and 20G respectively.

The 3-D stereo camera pair 43G and 42G in the instrumentation package 11G that forms the fourth 3-D stereo camera pair has optical windows 20G and 36G respectively.

The 3-D stereo camera pair 42G and 44G in the instrumentation package 11G that forms the fifth 3-D stereo camera pair, has optical windows 36G and 7G respectively.

The 3-D stereo camera pair 44G and 41G in the instrumentation package 11G that forms the sixth 3-D stereo camera pair has optical windows 7G and 35G respectively.

The two cameras 41G and 43G in the instrumentation package 11G that form the third 3-D stereo camera pair have optical axes 37G and 29G respectively.

The two cameras 43G and 42G in the instrumentation package 11G that form the fourth 3-D stereo camera pair have optical axes 29G and 38G respectively.

The two cameras 42G and 44G in the instrumentation package 11G that form the fifth 3-D stereo camera pair have optical axes 38G and 31G respectively.

The two cameras 44G and 41G in the instrumentation package 11G that form the sixth 3-D stereo camera pair have optical axes 31G and 37G respectively.

Electronically, mechanically, and optically all of these six 3-D stereo camera pairs operate simultaneously. An advantage occurs when an optical window of one of the cameras is obscured by dirt; the remaining cameras can be paired remotely by the authorized operator to continue to produce 3-D imagery for the VR viewers.

The lines of sight of the first, second, third, fourth, fifth and sixth 3-D stereo camera pairs are all looking straight upward from the top 8G of the VR module along their respective optical axes which are all parallel to one another. Their lines of sight are all parallel to one another. The four holes in the top 8G of the VR module are made just large enough to prevent vignetting of the cameras field of view.

In an alternate preferred embodiment where in certain VR venues stereo 3-D is not required or deemed useful from the VR module, a stereo 3-D camera pair that typically has two identical lenses, for example 47G and 48G, may be replaced with two dissimilar lenses having different lens settings, focal lengths and fields of view for example. Under these same circumstances, the identical cameras, for example 43G and 44G of the 3-D stereo camera pair may also be replaced with two dissimilar cameras. For example, the two 3-D stereo camera pairs that face the net from the top of the VR module may be considered to be non-essential by the authorized operator. Instead, the authorized operator may elect to set four dissimilar focal lengths into the zoom lenses facing the net. One lens, 41G for example, may be set to a long focal length for close-up facial expressions of persons in the VR venue, where another lens 42G may be set to a short focal length for wider shots of the persons moving into position.

It should be noted at this point, that in general any combination of any two of the four cameras can be electronically commanded and controlled by the authorized operator to act as 3-D stereo camera pairs, for example 41G and 42G, 41G and 43G, 41G and 44G, 42G and 43G, 42G and 44G, 43G and 44G.

In general, for all the preferred embodiments disclosed in the present invention, the VR module uses the instrumentation package shown in FIG. 21A and FIG. 21B and FIG. 21C. The instrumentation package shown in FIG. 21A and FIG. 21B and FIG. 21C uses four of the instrumentation package elements shown in FIG. 12. The instrumentation package elements shown in FIG. 12 use gyroscopic transducers which are specified in the electronics block diagram FIG. 13.

A detailed example of the operation of the gyroscopic transducers follows. Referring to FIG. 13, a self contained three-dimensional gyroscopic transducer 32G is shown. This transducer consists of three separate individual low power semiconductor based encoders. Each of these three encoders is configured at the time of manufacture to respond to a pre-determined action of motion specific to the direction of rotation, forward or backward motion and rise or fall conditions of the VR module in real-time. The VR module's pitch, roll and yaw are encoded. Yaw is associated with the spin of the VR module about its vertical z-axis.

Each encoder provides a pulse coded binary data output that varies in accordance with the relative direction and rate of movement of the VR module. For example, the VR module may suddenly accelerate in a horizontal direction. The amplitude of this acceleration is perceived by the horizontal motion encoder and its resultant pulse coded data output is fed to an interrupt request port of microprocessor 7G. The connection between 32G and 7G is such that each of the encoders will accurately convey information about the multiple possibilities of physical motions of the VR module, as previously described above, for processing in the VR module. At the time of boot-up, microprocessor 7G is instructed by the firmware contents contained within read only memory 6G to continually execute a routine check of the data presented to its interrupt ports at a sampling rate sufficiently high enough so as to accurately convey the resultant pulse coded data output that represents the direction of rotation, forward or backward motion and rise or fall conditions of the VR module in real-time.

When the VR module is first initialized prior to use from an idle position, normally by a command sent over the administrative data link from the authorized operator, microprocessor 7G according to its firmware instructions contained within read only memory 6G initializes the gyroscopic encoders in a zero motion state so that the authorized operator's computer is able to synchronize with the VR module.

During a VR session, the VR module's computer simultaneously receives the image data streams using the previously mentioned special software, and continuously calculates and applies to the received image data stream temporarily stored in memory the correct amount of counter adjustment necessary to hold the images in an upright stable unscrambled position when viewed by the VR audience on their VR display apparatus. The authorized operator also has the ability to manually issue commands that affect the amount of correction applied to the final image stream. Such commands are very useful in conjunction with other special effects that may be useful during a VR session.

The administrative data link is a bi-directional communications path over which control commands, as well as status data is exchanged between the VR module and the authorized operator. These commands and/or status data consist of data packets or streams that are independent in function of those that are used to convey image and/or sound information to the VR viewing audience, share the same communications transport mechanism overall.

This communications transport mechanism is formed whenever the microprocessor within the VR module communicates with the authorized operator over the particular mode of communications connectivity that the VR venue has been equipped for i.e. fiber optics, copper cable or wireless radio.

This microprocessor is connected via an I/O port to the network transceiver within the VR module and periodically monitors this port for activity.

When a data stream arrives at this port from an authorized operator, the microprocessor executes a series of instructions contained in ROM in such a way that it will respond and act only on those commands that are correctly identified based on a unique identification integer code present in the signal that immediately precedes the control data stream contents. If the stream is identified as valid, the microprocessor will execute the received command as determined by the firmware stored in ROM, and transmit a status data acknowledgement to the authorized operator.

Status data received by the authorized operator's transceiver is handled in a manner similar to that of the VR module as previously described.

When the authorized operator's transceiver intercepts an appropriately coded transmission over the particular mode of communications connectivity that the VR venue has been equipped for i.e. fiber optics, copper cable or wireless radio, it will respond and act on it in the manner determined by the communications handling provisions of the special software running on the associated computer at the authorized operator.

Figure 12:
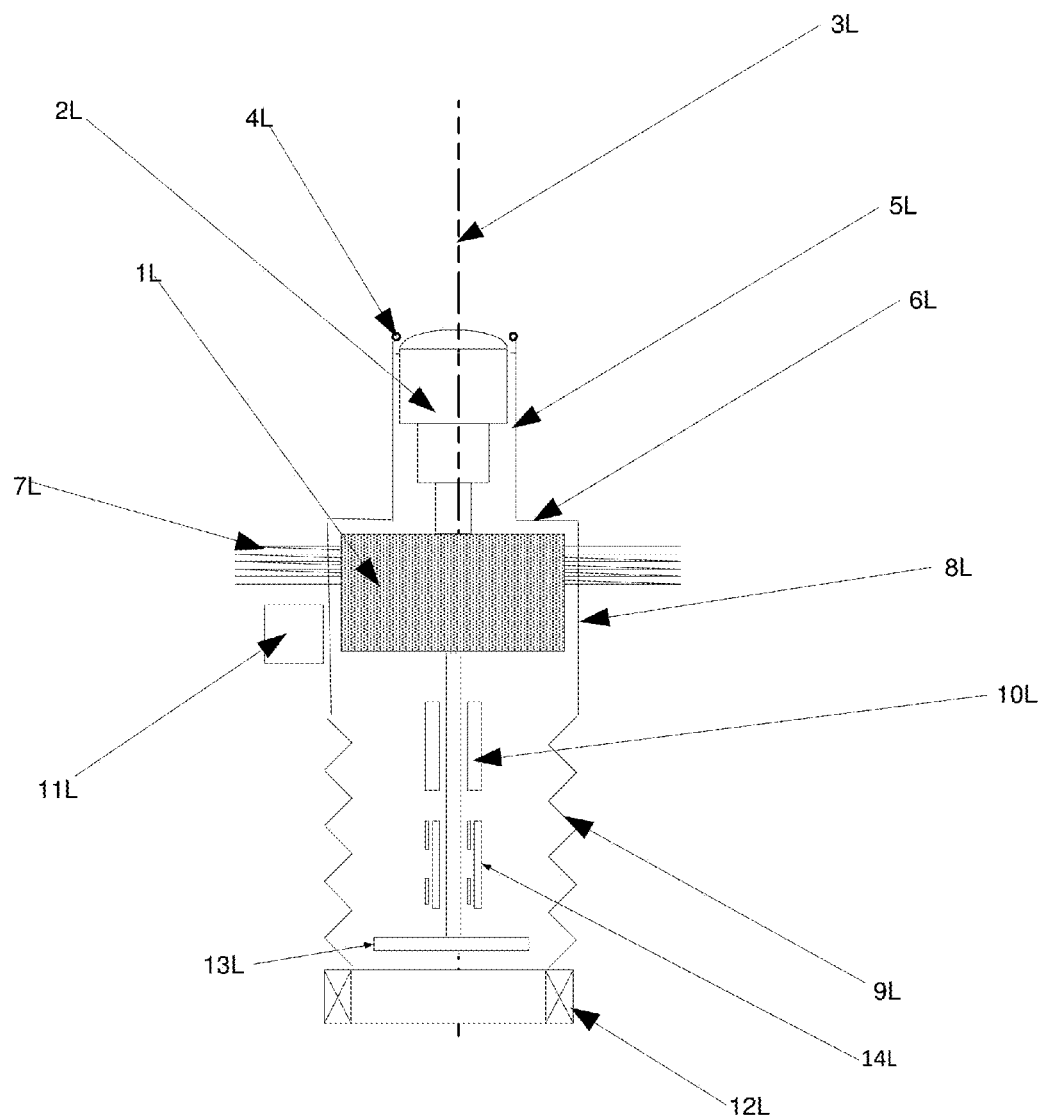
FIG. 12 is a side view of an instrumentation package element.
Figure 19A:
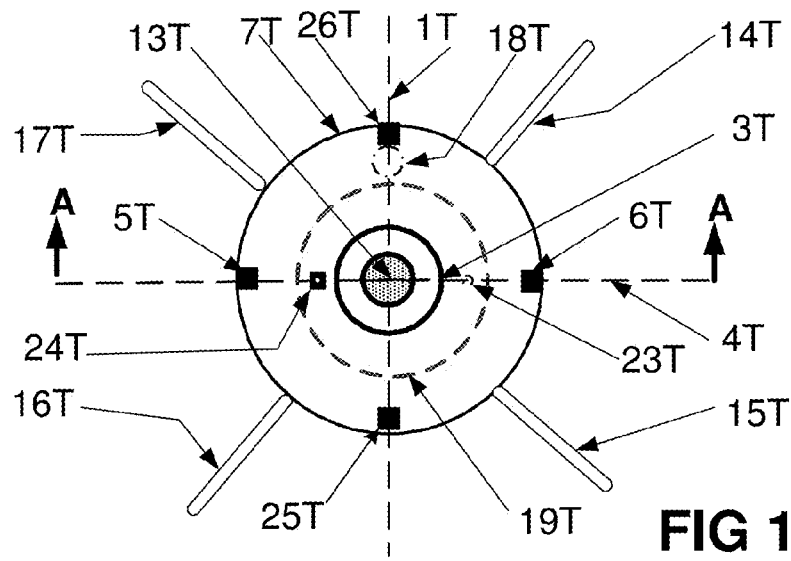
FIG. 19A is the top view of the electronics layout of a one-camera wireless instrumentation package.
Figure 19B:
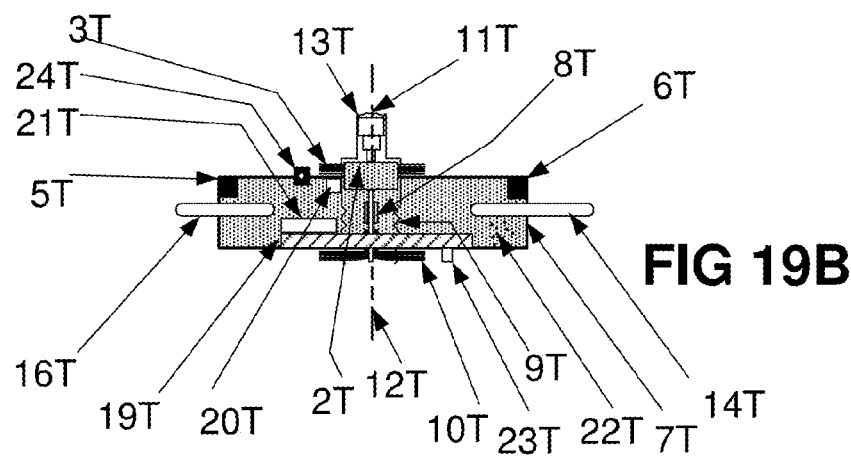
FIG. 19B is a side view of the electronics layout a one-camera wireless instrumentation package.
Figure 19C:
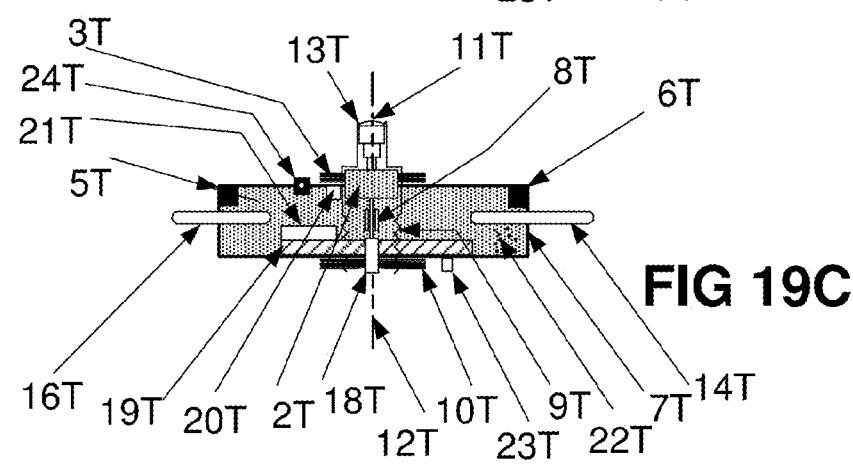
FIG. 19C is a side view of the electronics layout of a one-camera instrumentation package configured with wireless, fiber optics and bi-directional high speed copper cable network communications links.

In another preferred embodiment, a less costly VR module using only one TV camera is constructed. This one camera embodiment is far less complex than the previous four camera preferred embodiment. Because of the obvious nature and simplicity of this one camera embodiment, a separate drawing is not shown. The instrumentation package element shown in FIG. 12 is the identically same unit used in the four camera embodiment. The one camera embodiment uses the instrumentation package shown in drawings FIG. 19A and FIG. 19B and FIG. 19C. The one camera embodiment does not produce 3-D. The instrumentation package shown in FIG. 19A and FIG. 19B and FIG. 19C is mounted, and aligned into the VR module in the same manner as the previous preferred embodiment that uses four cameras. The z-axis of the instrumentation package is aligned and made coincident with the z-axis 30G of the VR module which is normal to the top center of the VR module, so that the single camera sees out the top of the VR module.

The image stabilization is done by the VR module in the same way as before also. As the VR module spins about its z-axis, so does the camera and its CCD sensor array. As the CCD sensor array spins about the z-axis of the VR module, the imagery formed on the sensor seems to spin relative to the CCD sensor. The VR module wirelessly communicates with the authorized operator in the identical manner as before. The spinning pixel data and the gyroscope data are communicated to the VR module's processor as before. The VR module uses the same processing software as before to de-rotate and stabilize the imagery and make it upright relative to the direction of forward motion of the VR module.

The authorized operator software selects the mode of communication between the VR module and the authorized operator. The authorized operator uses the communication modes that are installed in the VR venue with which to command and control his choice and communicate it to the VR module inside the VR venue.

The authorized operator selects items from a software menu of control commands that go to the network transceiver at the authorized operator that are subsequently transmitted to the VR module for the purpose of adjusting various system initializations, operating parameters, radio frequency, polling system status data such as battery condition, and initiating remote mechanical adjustments such as camera focus, optical zoom, iris and movement to the cameras' field of view, etc over the selected bi-directional communications link i.e. wireless radio connectivity being used within the particular VR venue.

These commands, when intercepted by the network transceiver within the VR module, are applied to its microprocessor, which then in turn upon executing the instructions stored within the contents of its firmware applies a pulse coded control signal via the power and control interconnect interface inside the instrumentation package to the corresponding electronics i.e. the mechanical actuators that provides optical focus and/or zoom adjustment of the cameras and microphone gain and selection, etc as desired by the authorized operator and/or special software running on the computer at the authorized operator. The power and control interconnect interface consists of the electrical control wiring to and from the electronic components of the VR module that are being controlled.

Figure 9A:
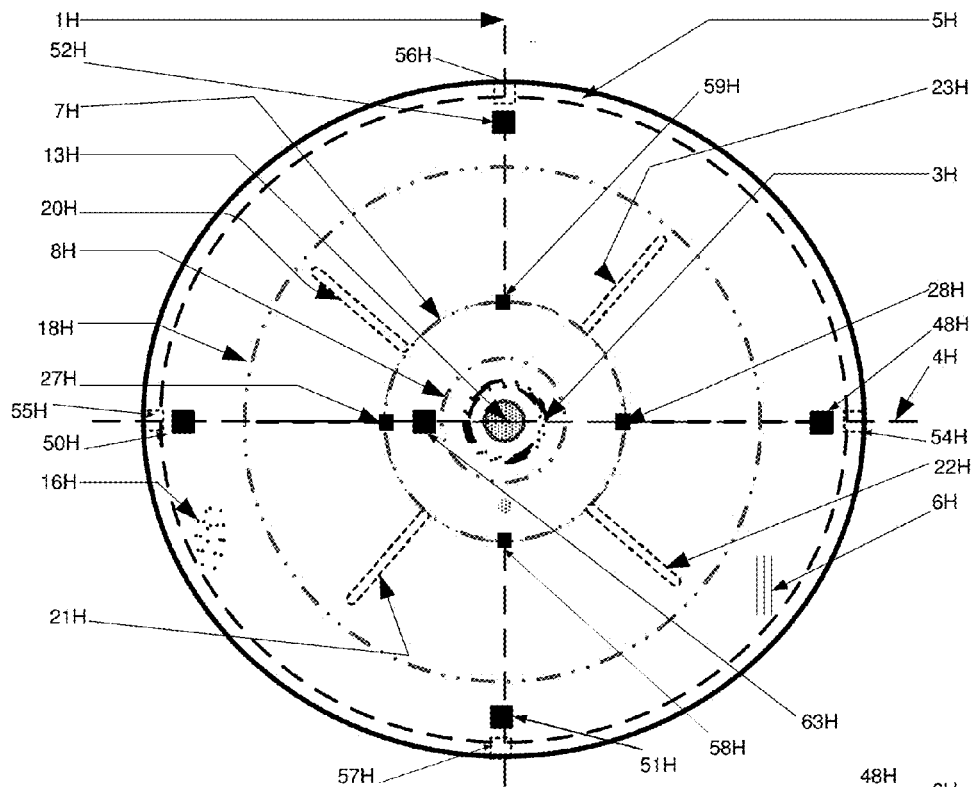
FIG. 9A is a top view of a two sided two-camera VR module.
Figure 9B:
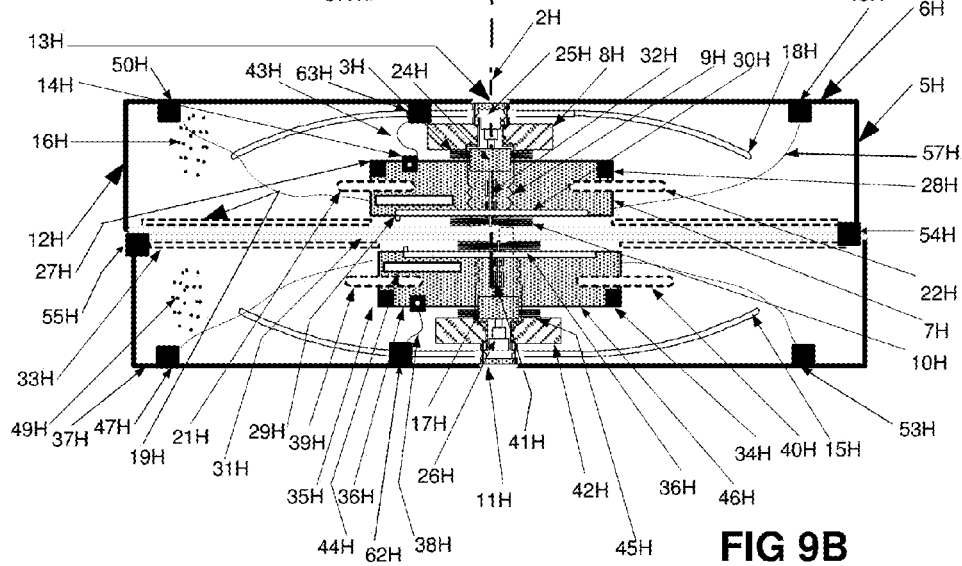
FIG. 9B is a front view of the two sided two-camera VR module.

FIG. 9A and FIG. 9B

The detailed physical elements disclosed in the VR module drawings shown in FIG. 9A and FIG. 9B are identified as follows: 1H is the y-axis of cameras 24H and 17H. 2H is the z-axis of the VR module. 3H is the upper induction coil used to charge the battery pack inside the VR module 7H. 4H is the x-axis of the VR module. 5H is the side of the VR module. 6H is the planar surface of the VR module. 7H is a VR module. 8H is a buffer plate assembly. 9H is a corrugated bellows section of a VR module. 10H is an induction coil used to charge the battery pack inside the VR module 7H. 11H is a plane-parallel-flat optical window. 12H is the side of the VR module. 13H is a plane-parallel-flat optical window. 14H is a microphone connector which is cabled to microphone 48H located on the planar surface 6H. 15H is a protective cover plate. 16H is the molded material of the VR module. 17H is a camera. 18H is the rounded edge of the protective cover plate. 19H is a flat disk-like protective cover plate. 20H is a wireless radio antenna. 21H is a wireless radio antenna. 22H is a wireless radio antenna. 23H is a wireless radio antenna. 24H is a camera. 25H is a camera lens. 26H is a camera lens. 27H is a microphone. 28H is a microphone. 29H is a gas valve. 30H is a gastight access lid heat sink on the bottom of VR module 7H. 31H is a battery pack that supplies electricity to the VR module 7H. 32H is the electronics in the VR module. 33H is a flat disk-like protective cover plate. 34H is a microphone. 35H is a microphone. 36H is a microphone connector which is cabled to a microphone 47H located on the planar surface 37H. 37H is a planar surface of the VR module. 38H is a cable from 36H to the microphone 47H located on planar surface 37H. 39H is a wireless radio antenna. 40H is a wireless radio antenna. 41H is the electronics in the VR module. 42H is a buffer plate assembly. 43H is a cable from 14H to the microphone 48H located on planar surface 6H. 44H is a battery pack that supplies electricity to the VR module. 46H. 45H is an induction coil used to charge the battery pack inside the VR module 46H. 46H is a VR module. 47H is a microphone which is flush with planar surface 37H. 48H is a microphone which is flush with planar surface 6H. 49H is the molded encapsulating material of the VR module. 50H is a microphone. 51H is a microphone. 52H is a microphone. 53H is a microphone. 54H is a microphone (not shown). 55H is a microphone (not shown). 56H is a microphone. 57H is a microphone. 58H is a microphone. 59H is a microphone. 60H is not shown but is directly below and opposite 51H. 61H is not shown but is directly below and opposite 52H. 62H is a microphone. 63H is a microphone. 64H is a microphone that is not shown but is directly below and opposite 58H. 65H is a microphone that is not shown but is directly below and opposite 59H.

FIG. 9A is a top view of a two sided two-camera VR module.

FIG. 9B is a front view of the two sided two-camera VR module.

Referring to the preferred embodiment disclosed in FIG. 9A and FIG. 9B, an VR module equipped with two television cameras employing wireless single point, multi point and/or multi point diversity reception techniques is specified. One of the cameras looks out perpendicularly from one planar surface of the VR module, while the other camera looks out perpendicularly from the other opposite planar surface of the VR module. The cameras look out in opposite directions from one another and are coaxial. The VR module is comprised of two identical halves which are mirror images of one another. TV camera 24H which is part of VR module. 7H peers out thru planar surface 6H of the VR module. TV camera 17H which is part of VR module 46H peers out thru planar surface 37H of the VR module. VR module's 7H and 46H are disclosed in FIG. 19A and FIG. 19B and FIG. 19C.

The present invention contemplates that the VR module be instrumented with a transceiver and antenna capable of transmitting radio signals encoded with the picture and sound information gathered from the VR module to a remote base station via an antenna array relay junction. The present invention contemplates that the VR module, are instrumented with cameras and microphones enabling them to acquire pictures and sounds of the VR venue where it is located. Electronics within the VR module communicates pictures and sounds of the VR venue to VR viewing display apparatus.

The preferred embodiment disclosed in the present invention in FIG. 9A and FIG. 9B has an advantage over the VR module shown in FIG. 8A and FIG. 8B and FIG. 8C. The VR module disclosed in the preferred embodiment in the present invention in FIG. 9A and FIG. 9B has cameras and microphones peering out from both of the VR module's two planar surfaces enabling video and sound to be communicated from both sides of the VR module. Obviously, video of the VR venue can only be transmitted from the camera peering through the planar surface of the VR module which is facing upward from the floor. The camera peering through the planar surface of the VR module that is facing downward on the floor is blinded and cannot see the VR venue. The embodiment shown in FIG. 9A and FIG. 9B is advantageous because it always has least one camera peering upward from the floor.

The embodiment shown in FIG. 9A and FIG. 9B is also advantageous over the VR module shown in FIG. 8A and FIG. 8B and FIG. 8C because it provides for three additional microphone channels to be processed by the VR viewing apparatus into surround sound for the VR viewing audience.

The embodiment shown in FIG. 9A and FIG. 9B is also advantageous over the embodiment shown in FIG. 1A and FIG. 1B and FIG. 1C of the present invention because it's cost to manufacture is considerably lower owing to the fact that it uses six fewer cameras, lenses and electronics. Even though this embodiment offers fewer VR multimedia features than that shown in FIG. 1A and FIG. 1B and FIG. 1C, it is more affordable for use in low income VR venues that have tight budgets. In another preferred embodiment where there are tight VR venue budgets, manufacturing cost in FIG. 9A and FIG. 9B is reduced by eliminating the protective cover plates, buffer plate assemblies, molded encapsulating material, gas valves and gastight access lids, especially in non-hostile VR venues. In another similar preferred embodiment referring to FIG. 1A and FIG. 1B and FIG. 1C where there are tight VR venue budgets, manufacturing cost is reduced by eliminating the protective cover plates, buffer plate assemblies, molded encapsulating material, gas valves and gastight access lids, especially in non-hostile VR venues.

Furthermore, the embodiment shown in FIG. 9A and FIG. 9B is also advantageous over the embodiment shown in FIG. 1A and FIG. 1B and FIG. 1C of the present invention because the embodiment shown in FIG. 9A and FIG. 9B can be made smaller in diameter, and therefore can fit into VR venues where space is tight. The embodiment shown in FIG. 9A and FIG. 9B can be made smaller in diameter because it has fewer cameras and electronics than FIG. 1A and FIG. 1B and FIG. 1C. Consequently, the embodiment shown in FIG. 9A and FIG. 9B is less obtrusive to the VR venues and easier to mount.

As in the case of the preferred embodiment shown in FIG. 1A and FIG. 1B and FIG. 1C, the VR module shown in FIG. 9A and FIG. 9B is equipped to be enabled, commanded and controlled in the same way by administrative data conveyed simultaneously and bi-directionally from/to an authorized operator.

The VR module shown in FIG. 9A and FIG. 9B contains two identical electronics 7H and 46H inside it. Each VR module has one TV camera looking out from its respective planar surfaces. As before, the small apertures of the optical windows protect the cameras and their lenses. Except for its smaller size and fewer cameras, the construction, functions and texture of the VR module shown in FIG. 9A and FIG. 9B is made similar to the preferred embodiment shown in FIG. 1A and FIG. 1B and FIG. 1C.

As before, it is understood that as the state of the art in TV camera technology advances, that there will be other better TV cameras that use other than CCD and CMOS technology. The present invention will work equally well with them as they become available. Therefore, the present invention uses CCD and CMOS TV cameras as an example of SD/HD TV cameras that may be used simply because they are the best that today's technology offers, and is not confined only to their sole use in the future.

The VR module has two identical electronics 7H and 46H mounted inside the VR module. Details of electronics 7H and 46H are disclosed in FIG. 19A and FIG. 19B and FIG. 19C and FIG. 13 and FIG. 14. The electronics are the same electronics disclosed in FIG. 1A and FIG. 1B and FIG. 1C. The two planar surfaces of the VR module are identical, having the same size, shape, color and texture. In another preferred embodiment, it is useful to have two different colors on the planar surfaces of the VR module. The different colors are made to match the different background colors of the VR venue(s) where they are disposed.

There are nine microphones 50H, 51H, 52H, 48H, 27H, 28H, 58H, 59H, 63H belonging to the top section of the VR module. All nine are electrically connected by cables inside the VR module 7H. Microphones 50H, 51H, 52H, 48H, 63H protrude through holes in the top planar surface 6H and are recessed below the planar surface 6H and hear sounds above and around 6H.

There are nine microphones 47H, 53H, 34H, 35H, 60H, 61H, 62H, 64H, 65H belonging to the bottom section of the VR module. All nine are electrically connected by cables inside the VR module 46H. Microphones 47H, 53H, 54H, 55H, 62H protrude through holes in the bottom planar surface 37H and are recessed below the planar surface 37H and hear sounds above and around 37H. 60H is not shown but is directly below and opposite 51H. 61H is not shown but is directly below and opposite 52H. 64H is not shown but is directly below and opposite 58H. 65H is not shown but is directly below and opposite 59H.

Microphones 27H, 28H, 58H, 59H are internal to the VR module and are parts of VR module 7H, and hear sounds created by any contacts with the VR module by conduction of sound waves through the VR module.

Microphones 34H, 35H, 64H, 65H are internal to the VR module and are parts of VR module 46H and hear sounds created by any contacts with the VR module by conduction of sound waves through the VR module.

Sounds detected by all these microphones have separate simultaneous channels to the VR module where they are processed into a surround sound format for the VR audience to hear.

Microphones 54H, 55H, 56H and 57H are mounted and phased at ninety degree intervals flush and midway down around the cylindrical side 5H around 2H and wired by cable to the VR module.

The VR module 76H carries two microphones 75H and 87H. Microphones 75H and 87H are internal to the VR module and part of VR module 76H and hear sounds created by any contact with the VR module and by conduction of sound. Four additional microphones 67H, 95H, 96H, and 97H are recessed below the bottom surface 13H of the VR module and phased at ninety degree intervals around 30H and wired by cable (i.e. 68H) inside the VR module 76H and hear sounds above 13H.

The VR module has a total of sixteen microphones. These microphones provide the audio inputs to the VR module 18H and 76H which communicate these audio channels internally for processing, after which they are transmitted via antennas 27H, 28H, 25H, 26H, 71H, 88H, etc. to the VR viewer display apparatus which processes the data to create surround sound for by the VR viewing audience.

Figure 10:
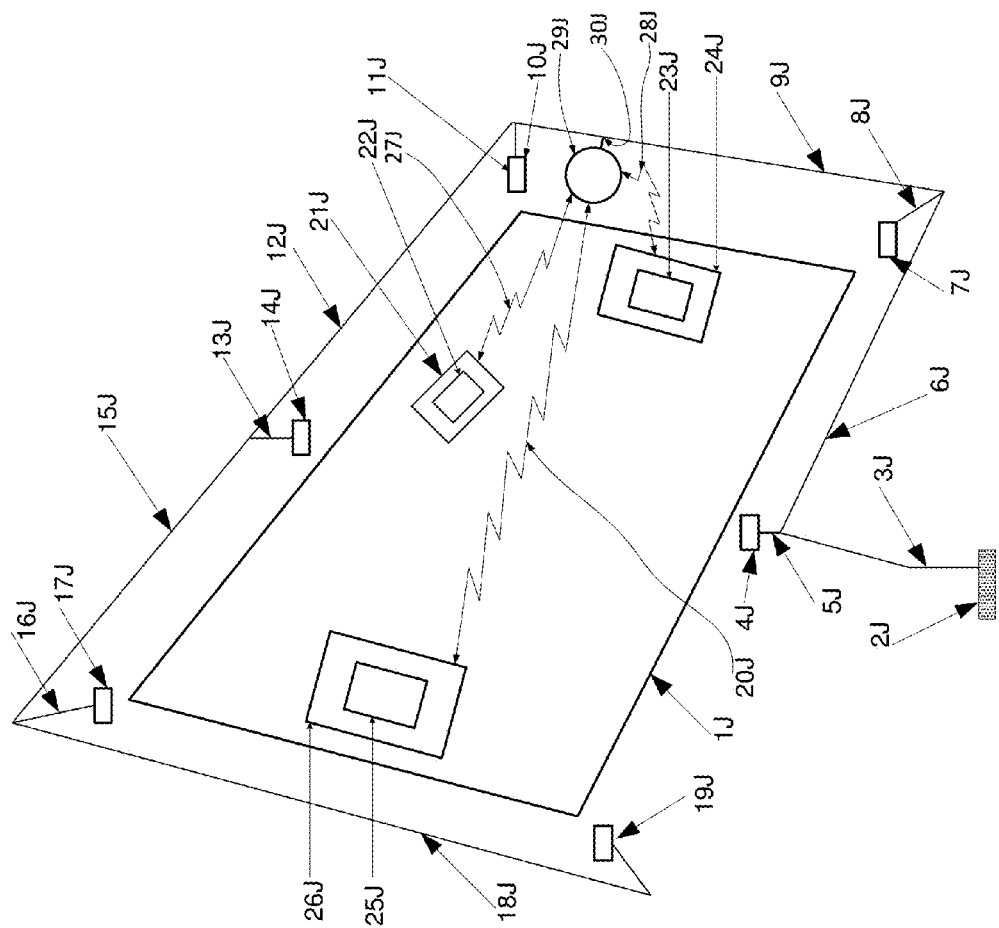
FIG. 10 is a diagram of a typical VR venue equipped with a wireless RF bi-directional communications link to communicate the VR multimedia content from three VR modules.

The lines of sight of the two cameras are both looking straight outward from 6H and 37H of the VR module along their respective optical axis 2H. Their lines of sight are parallel and coaxial with one another. The SD/HD letter box picture frame formats of cameras 24H and 17H are aligned together. The captured video and audio information from the two cameras is transmitted simultaneously from the VR module to the VR viewer display apparatus where it is further processed. As before in FIG. 1A and FIG. 1B and FIG. 1C, the VR module stabilizes the captured video and audio in the direction of forward motion of the VR module and transmits the data to the VR viewer display apparatus. FIG. 10

The detailed physical elements disclosed in the VR venue drawing shown in FIG. 10 are identified as follows: 1J is the VR venue. 2J is the antenna relay junction. 3J is the bi-directional communications cable to the first antenna location. 4J is the first antenna location. 5J is the bi-directional communications cable junction of the first antenna location. 6J is the bi-directional communications cable to second antenna location. 7J is the second antenna location. 8J is the bi-directional communications cable junction of the second antenna location. 9J is the bi-directional communications cable to the third antenna location. 10J is the bi-directional communications cable junction of the third antenna location. 11J is the third antenna location. 12J is the bi-directional communications cable to the fourth antenna location. 13J is the bi-directional communications cable junction of the fourth antenna location. 14J is the fourth antenna location. 15J is the bi-directional communications cable to the fifth antenna location. 16J is the bi-directional communications cable junction of the fifth antenna location. 17J is the fifth antenna location. 18J is the bi-directional communications cable to the sixth antenna location. 19J is the sixth antenna location. 20J is the bi-directional RF communications link between 26J and 29J. 21J is the VR module. 22J is the instrumentation package. 23J is the instrumentation package. 24J is a VR module. 25J is the instrumentation package 26J is a VR module. 27J is the bi-directional RF communications link between 21J and 29J. 28J is the bi-directional RF communications link between 24J and 29J is the authorized operator. 30J is the connection from the authorized operator 29J and the bi-directional communications cable.

FIG. 10 is a diagram of a typical VR venue equipped with a wireless RF bi-directional communications link to communicate the VR multimedia content from three VR modules.

FIG. 10 shows three VR modules for capturing pictures and sounds from inside a VR venue and communicating the VR multimedia content to VR display apparatus via multipoint diversity reception techniques. Examples of the VR modules are those shown in FIG. 1A, FIG. 1B, FIG. 1C and FIG. 2A, FIG. 2B, FIG. 2C and FIG. 9A, FIG. 9B and FIG. 8A and FIG. 8B and FIG. 8C of the present invention.

Some VR venues are located in areas where only a poor signal to noise ratio can be achieved due to radio frequency interference from other sources within the vicinity while attempting to receive real-time images and sounds from a VR module 21J using systems that employ only a single antenna point.

Six antenna arrays 4J, 7J, 11J, 14J, 17J and 19J are each equipped with electronics that facilitate high-speed real-time bi-directional communication, with the VR module 21J using the 802.11(xx0 protocol operating within the unlicensed 2.4 ghz or 5.8 ghz spectrum, and the VR display apparatus 2J via Ethernet or fiber optic cabling. The communication link between the antenna arrays and the VR module is wireless.

The VR display apparatus 2J receives the high quality real-time pictures and sound captured by the VR module 21J during game play using multiple antenna arrays placed at strategic points. These points may be located near the ground level or at a substantial height above the field of play depending on the radio frequency architecture and/or noise floor and interference characteristics of the particular stadium/arena.

In this preferred embodiment, a set of bi-directional communications cables 3J, 6J, 9J, 12J, 15J and 18J are used to connect each of the six antenna arrays 4J, 7J, 11J, 14J, 17J and 19J to the remote base station 2J via bi-directional communications cable junctions 5J, 8J, 10J, 13J, and 16J.

Each of 3J, 6J, 9J, 12J, 15J and 18J consist of a separate category six UTP unshielded twisted pair cable assembly. Due to the large area of a ice hockey rink throughout which 3J, 6J, 9J, 12J, 15J and 18J must span, category six cables should be used since they are capable of handling the required bandwidth with minimal losses to the signal path. Other types of cabling can also be used including multi-function fiber optic cable assemblies, provided such cabling can handle the required signal bandwidth.

The cabling system segments and related hardware 3J, 5J, 6J, 8J, 9J, 10J, 12J, 13J, 15J, 16J and 18J are also used to convey electric power supplied by electronic hardware within the remote base station 2J to the electronics within each antenna array 4J, 7J, 11J, 14J, 17J and 19J.

Bi-directional communications cable junctions 5J, 8J, 10J, 13J, and 16J are points in the cable installation that facilitate ease of access to 3J, 6J, 9J, 12J, 15J and 18J by personnel in the event servicing or future upgrades of the wired network is required.

Installation of 3J, 5J, 6J, 8J, 9J, 10J, 12J, 13J, 15J, 16J and 18J within the stadium/arena structure can be accomplished in several ways depending on the stadium's/arena's architecture. For example a run of electrical conduit containing 3J, 6J, 9J, 12J, 15J and 18J can be used between each antenna array location and the remote base station 2J.

It is also possible that an existing wired or optical data network, already present within the stadium, be used in lieu of 3J, 5J, 6J, 8J, 9J, 10J, 12J, 13J, 15J, 16J and 18J, provided such existing network is capable of handling the required bandwidth and power.

The electronics within each antenna array 4J, 7J, 11J, 14J, 17J and 19J, convey to the electronic hardware located at the remote base station 2J, received signal strength indication and status data information along with the specific payload data packet which consists primarily of the image and audio data captured previously by the VR module 21J.

The electronic hardware located at the authorized operator executes an algorithm that in real-time continuously monitors and compares the received signal strength indication and status data information from each of the corresponding antenna arrays 4J, 7J, 11J, 14J, 17J and 19J and determines dynamically which antenna array to use to receive the best overall specific payload data packet from the VR module 21J.

Additionally, the electronic hardware located at the authorized operator executes an algorithm that in real-time continuously monitors, compares and determines dynamically the radio frequency, gain, polarization and error correction that should be applied by the antenna array's electronics to receive the best overall specific payload data packet from the VR module 21J.

By proper real-time selection of the radio frequency, gain and polarization the electronics hardware at the VR module can ensure that the images and sounds captured by the VR module 21J will be of high quality and will have sufficient stability to allow additional decoding and post processing of the payload data packet by the electronics hardware and software located at the VR module.

By proper real-time selection of the correct antenna arrays, the electronics hardware at the VR module can ensure that the images and sounds captured by the VR module 21J will be of high quality and will have sufficient stability to allow additional decoding and post processing of the payload data packet by the electronics hardware and software located at the VR module.

Single point non diversity reception refers to a wireless communication technique whereby a single physical repeater antenna array location within a VR venue is used to convey the radio frequency signals traveling to and from the VR module.

The quality and reliability of the signals transmitted by the VR module when using this technique relies heavily on the assumption that a decent signal to noise ratio is attainable even while the VR module 21J is moved in the VR venue. 22J and 23J are positioned at fixed locations during the game.

Multipoint diversity reception refers to a wireless communication technique whereby a network of multiple physical repeater antenna arrays are located within a VR venue and are used to convey the radio frequency signals traveling to and from the VR module. The signals intercepted at each repeater location are individually compared by the network transceiver at the VR module and the strongest signal with the best signal to noise ratio is automatically selected for application to the other electronics at the VR module. The quality and reliability of the signals received at the VR module when using this technique is far less dependent on the assumption that a decent signal to noise ratio is attainable from what a single repeater antenna array location would achieve even while the sports paraphernalia is in moved throughout such a VR venue.

FIG. 11

The detailed physical elements shown in the system disclosed in FIG. 11 for communicating VR multimedia content from a VR module located inside a VR venue to a VR display apparatus are identified as follows: 1K is the electronics. 2K is the high definition TV cameras. 3K is the microphones. 4K is the video processing hardware. 5K is the audio processing hardware. 6K is the audio and video compression hardware. 7K is the 4G/LTE cellular streaming high-speed terrestrial mobile broadband service hardware. 8K is the cellular and Wifi band antenna hardware. 9K is the Wifi band hardware interface. 10K is the bi-directional internet fiber optics/copper cable feed. 11K are inputs to 12K by a variety of different sensors which measure both physical and chemical states. 12K is digital and analog sensor processing hardware and software.

Figure 11:
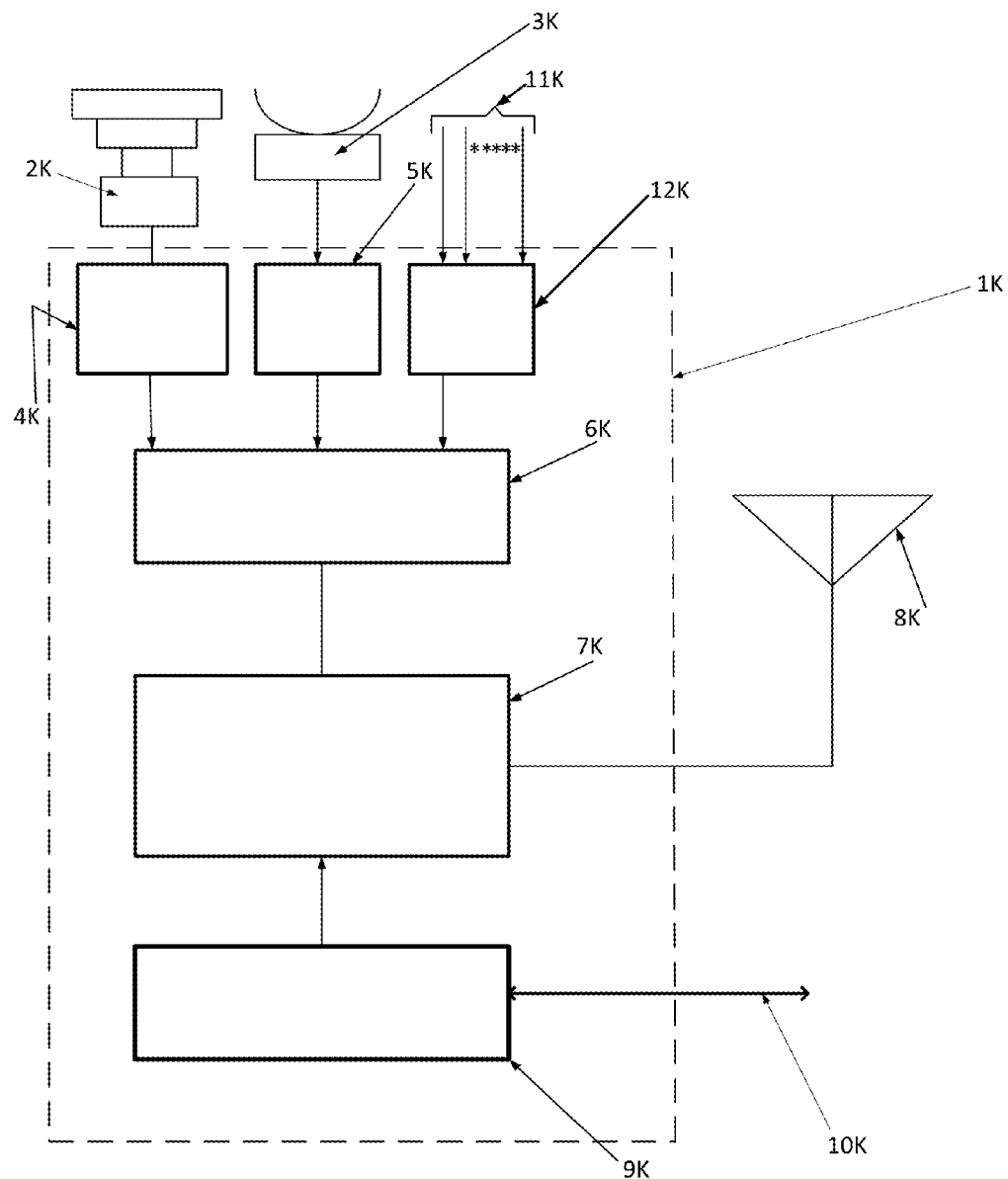
FIG. 11 is the electronics system block diagram for communicating VR multimedia content of a VR venue to the Internet from VR modules disposed at a VR venue.

FIG. 11 is the VR module's electronics system block diagram for communicating VR multimedia content captured by the VR module to VR display apparatus via the Internet.

In a preferred embodiment, FIG. 11 shows the electronics block diagram for the VR module system for streaming the video and audio content captured by the VR module, from inside the VR venue, on to the Internet. 1K is the primary component for communicating from the VR module to the Internet. 1K enables the VR module to communicate and stream on the Internet. 1K collects video and audio from the cameras 2K and microphones 3K aboard the VR module and channels the video and audio to the VR display apparatus via the Internet. The VR display apparatus is networked and interconnected to the Internet.

Electronics 1K channels high definition video cameras 2K and microphone 3K whose captured video and audio is buffered by processing hardware 4K and 5K following with suitable H.264/MPEG compression by compression hardware 6K, which is and subsequently sent to an active broadband connection established by i.e. LTE/4g cellular streaming hardware 7K and an antenna 8K using for example Mobile Broadband Hotspot Hardware Technology.

1K contains video processing hardware 4K, audio processing hardware 5K, audio and video compression hardware 6K, 4G/LTE cellular streaming high-speed terrestrial mobile broadband service hardware 7K, and Wifi band hardware interface 9K.

In some VR venues, the Internet is available to the VR module by a fiber optics/copper cable feed buried beneath the floor or the ground or beneath the ice of a rink of a VR venue. In VR venue where the Internet is available by cable, the cable feed 10K is brought up from the floor/ground/ice and connected to 1K via 9K.

In venues where the Internet is available by a 4G/LTE or better equivalent Mobile Broadband Tower, 1K accesses the Internet wirelessly via its 4G/LTE cellular streaming high-speed terrestrial mobile broadband service hardware 7K which is connected to the cellular and Wifi band antenna hardware 8K. 1K uses a high-speed terrestrial mobile broadband service to connect the camera(s) 2K and microphone(s) 3K to a publicly accessible Internet relay server for the purpose of real-time VR display apparatus viewing by audiences using their portable wireless devices—i.e. WIFI enabled Phones, Laptops, Touch Pads, PDA's, etc.

In a preferred embodiment, there are typically one or more VR modules operating inside a VR venue.

Electronics 1K channels high definition video cameras 2K and microphones 3K whose captured video and audio is buffered by processing hardware 4K and 5K following with suitable H.264/MPEG compression by compression hardware 6K, which is and subsequently sent to an active broadband connection established by LTE/4g cellular streaming hardware 7K and an antenna 8K using for example Mobile Broadband Hotspot Hardware Technology.

1K contains video processing hardware 4K, audio processing hardware 5K, audio and video compression hardware 6K, 4G/LTE cellular streaming high-speed terrestrial mobile broadband service hardware 7K, and Wifi band hardware interface 9K.

1K uses a high-speed terrestrial mobile broadband service to connect the camera(s) 2K and microphone(s) 3K to a publicly accessible internet relay server for the purpose of real-time viewing the game by audiences using their portable wireless devices—i.e. WIFI enabled Phones, Laptops, Touch Pads, PDAs, etc.

In a preferred embodiment, 1K contains the primary electronics for streaming video and audio of VR venues. The TV cameras 2K and microphones 3K are housed in the VR modules. Audio, video processing and compression modules 4K, 5K and 6K respectively are used to buffer, process and compress the captured image and sound information prior to streaming by high-speed terrestrial mobile broadband service unit 7K. The VR modules are equipped with 1K. 1K contains a high-speed terrestrial mobile broadband service unit 7K and an antenna 8K used to connect the camera(s) and microphones to a publicly accessible internet relay server for the purpose of real-time viewing of the game by audiences using their portable wireless devices—i.e. WIFI enabled Phones, Laptops, Touch Pads, PDAs, etc.

1K contains one high definition video camera 2K and one microphone 3K whose captured video and audio, following suitable H.264/MPEG compression by 4K, 5K and 6K respectively, is buffered and subsequently sent to an active broadband connection established using for example Mobile Broadband Hotspot Hardware Technology.

The VR module conveys high definition video and multi-dimensional audio captured by the cameras and microphones mounted within the VR module to a VR viewing audience who may or may not be spectators inside the VR venue but wish to subscribe and view the VR venue remotely on their personal wireless VR display apparatus.

1K communicates wirelessly with a 4G/LTE or better equivalent Mobile Broadband Tower operating on the 1700 and/or 1900 MHz Frequency Band within a three to five bar signal strength radius of the desired VR venue. The same Mobile Broadband Tower that is used to intercept the captured streams from 1K is also used simultaneously to supply the wireless Internet access needed by spectators present at the VR venue whom wish to view the VR venue on their personal VR display apparatus.

In operation, the live captured MPEG streams are made accessible across the public Internet via a relay server which need not be local to the VR venue. This relay server acts as a traffic router and is connected to an Internet backbone with sufficient capacity to successfully convey the wideband data streams needed to render High-definition video and sound to the VR display apparatus over the www. Each person present at the VR venue in possession of a suitable mobile broadband wireless VR display apparatus wishing to view the VR venue, will initially register or subscribe to the service via a URL that is pointed to the relay server IP address. Once registered, however, the VR viewer will have the option of choosing the desired video and/or audio streams available at the given VR venue currently broadcasted. Alternately, in another preferred embodiment, an authorized operator seated in front of a display console located either at the VR venue or at the relay server will have the ability to select which cameras and/or microphones are associated with which streams prior to a broadcast. Commercial content material insertion i.e. sponsor's advertisements and announcements and other insertions are also available at the discretion of the authorized operator.

In a preferred embodiment, the WIFI Communications block shown as item 9K in FIG. 11 permits wireless access and control of administrative functions and operating parameters of the VR modules by an authorized operator's laptop PC independent of the VR module's cellular streaming capabilities. An authorized operator can activate the camera system prior to a VR venue session using a laptop PC logged into the WIFI communications block and subsequently deactivate it after the VR venue session has finished. Access to the VR module via WIFI is purposely limited to authorized personnel only through the use of a private encryption software key. The control and administration of other features of the VR module are available to authorized personnel such as Battery Life remaining, Camera Selection and Picture Format, Microphone gain, Audio format selection, etc. Wireless connection to a local WIFI Relay server is possible using the same WIFI Communications block to convey captured pictures and sound to VR viewing audience's wireless viewing devices at the VR venue at the discretion of authorized personnel independent of VR module's Cellular streaming.

In yet another preferred embodiment, VR audiences can view the physical and chemical states of the VR modules i.e. like weather, the presence of gases, voltages, charge, smells, breath test, alcohol, barometric readings, gases, shocks, vibrations etc. 11K are inputs to 12K from a variety of different sensors which measure both physical and chemical states at the VR module's VR venue. For example, if a VR viewer in the VR audience wants to know the temperature at the VR venue, the VR viewer can go on the Internet and see a real-time temperature reading measured by a digital thermometer inputting its data to the VR module at the VR venue. Data from analog and digital sensors which measure physical and chemical states are inputted to the VR modules. These sensors input their data into 12K which is the digital and analog sensor processing and formatting hardware and software. 12K inputs its processed and formatted data into 6K which is the same audio and video compression hardware used for the cameras and microphones.

FIG. 12

The detailed physical elements disclosed in the instrumentation package element's drawing shown in FIG. 12 are identified as follows: 1L is a camera. 2L is the camera lens. 3L is the optical axis of the camera and camera lens. 4L is the lens seal. 5L is the small diameter cylindrical segment of the instrumentation package element enclosure. 6L is the enclosure shoulder. 7L is the top induction coil for recharging the battery pack in the instrumentation package. 8L is the cylindrical segment of the enclosure. 9L is the corrugated bellows segment of the enclosure. 10L is the electronics. 11L is an electro-mechanical actuating device. 12L is a sealed roller bearing. 13L is the electronic package unit for streaming on the internet. 14L is software and memory for making recordings and storing recordings and retrieving recordings.

FIG. 12 is a side view of an instrumentation package element.

Referring to drawing FIG. 12, in a preferred embodiment, an instrumentation package element is disclosed. The instrumentation package assembly element is a primary component of the instrumentation package which are contained inside the VR module.

The instrumentation package element shown in FIG. 12 is used inside the VR module.

The instrumentation package element contains electronics 10L for televising pictures and sounds wirelessly, as well as all the electronics for televising pictures and sounds using fiber optics/copper cable. An electronics block diagram for FIG. 12 is shown in FIG. 13. The instrumentation package element contains electronics and software 14L for making and storing recordings of captured VR multimedia content.

The instrumentation package element also contains the electronics 13L for streaming the pictures and sounds onto the internet. An electronics block diagram for 13L is shown in FIG. 11.

The present invention contemplates the instrumentation package element to be equipped with a single TV camera, a single TV camera lens, supporting electronics, one induction coil, a mechanical actuating device and one corrugated bellows segment. The TV camera, TV camera lens, supporting electronics, induction coil and mechanical actuating device and corrugated bellows segment are the primary parts of the instrumentation package element.

The instrumentation package, shown in FIG. 19A and FIG. 19B and FIG. 19C has one of these instrumentation package elements. The instrumentation package, shown in FIG. 21A and FIG. 21B and FIG. 21C has four of these instrumentation package elements.

It is understood that the state of the art in TV camera technology is changing rapidly and as it advances there will be other better TV cameras that use other than CCD and CMOS technology. The present invention will work equally well with them as they become available. Therefore, the present invention uses CCD and CMOS TV cameras as an example of TV cameras that may be used at this time simply because they are the best that today's technology offers, and is not confined only to their sole use in the future.

An enlarged side view A-A section of just the instrumentation package element of the instrumentation package that is disclosed in FIG. 19A, FIG. 19B, FIG. 19C is shown in FIG. 12.

The pictures of the VR venue are taken directly by the instrumentation package element camera 1L. The video signals from camera 1L are fed to the electronics 10L within the instrumentation package element.

Figure 14:
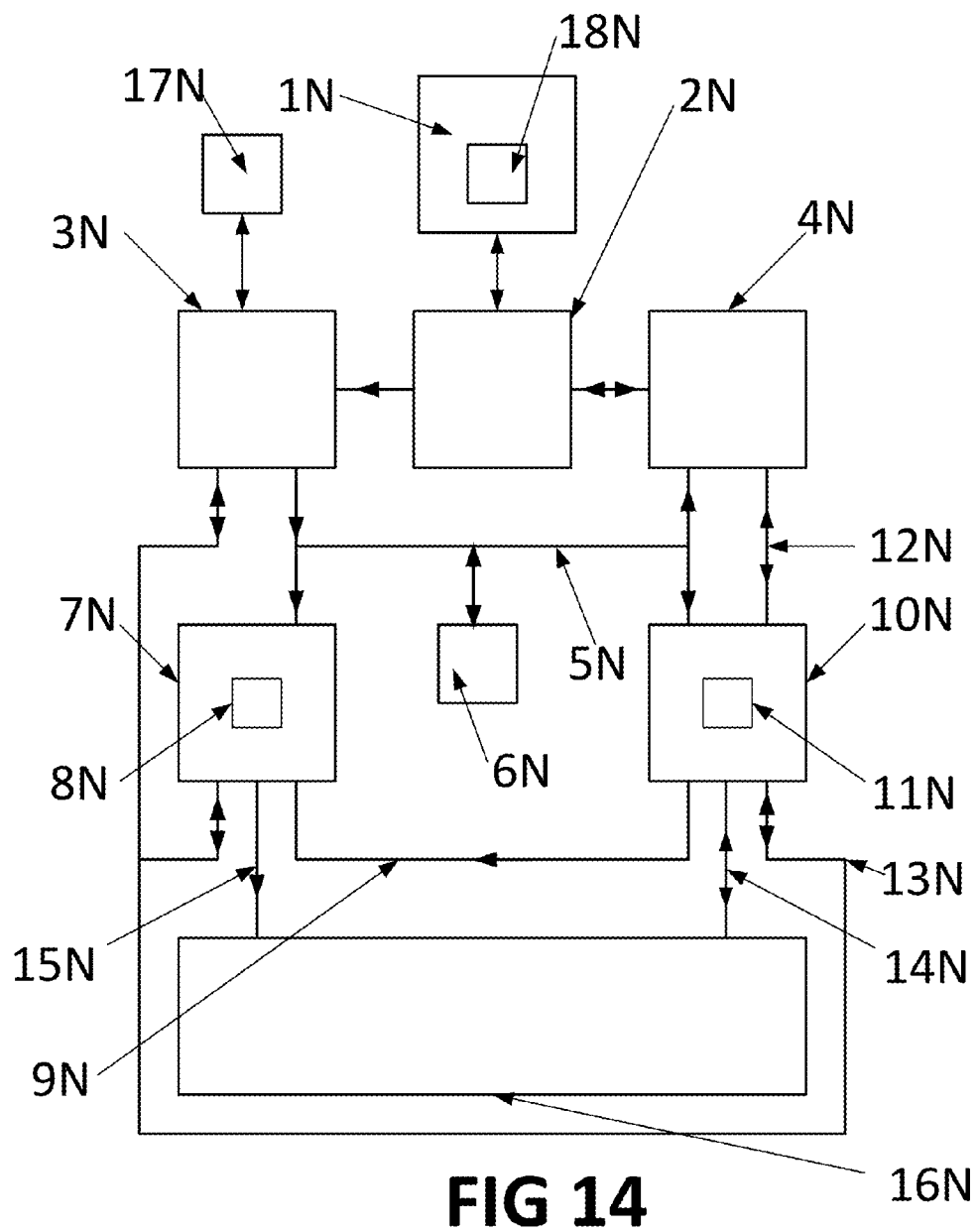
FIG. 14 is a block diagram of the instrumentation package element power supply and battery charging circuits electronics.

The detailed flow of electrical signals and data in the instrumentation package element's electronics 10L is shown in the preferred embodiment given in FIG. 13 and FIG. 14. The electronics 10L derives its electrical power from a battery pack that is external to the instrumentation package element. The battery packs, like the instrumentation package elements, are principal parts of the instrumentation package which contains them both.

FIG. 13 is a block diagram that explains the detailed circuitry, flow of electrical signals and data in the general operation of the instrumentation package element electronics used for televising and streaming pictures and sounds, controlling the electrical and mechanical functions within the instrumentation package element, and charging the battery pack. FIG. 14L is a block diagram showing the signals and data flows in the power supply and battery charging circuits inside the instrumentation package element.

The instrumentation package element is a compressed assemblage of all the optical components camera 1L and camera lens 2L that gather TV pictures, and the electronic 10L components that televise the TV pictures and sound, and the electronic package unit 13L used for streaming the pictures and sound onto the internet.

The electronic components 10L and the electronic package unit 13L receive electrical signals from the microphones that are external to the instrumentation package element but housed within the instrumentation package inside the VR module. The electronic components 10L and the electronic package unit 13L transmit those sound signals along with the TV picture signals to the wireless transmission network or the fiber optics/copper cable transmission network. The electronics 10L also do all the command and control bi-directional handshaking between the VR module and the authorized operator. The electronics 10L also does all the battery pack power control and management. All these functions are done in each of the instrumentation package element's single contiguous enclosure. Details of the electronics package unit 13L are disclosed in FIG. 11.

The electronics package unit 13L enables the VR module to communicate with and stream on the internet. The electronics package unit 13L collects video and audio from the cameras and microphones aboard the VR module, and channels the video and audio to the antenna for wireless transmission to a i.e. Mobile Broadband Tower. 13L also channels the video and audio to hardwire internet cable if it is available. The electronic package unit 13L shown in FIG. 11L contains the primary electronics for making streaming video and audio captured by the VR module.

For example, the TV cameras and microphones housed in the VR modules. Audio, video processing and compression respectively are used to buffer, process and compress the captured image and sound information prior to streaming by a high-speed terrestrial mobile broadband service unit. The VR modules are equipped with electronics package units which contain a high-speed terrestrial mobile broadband service unit and an antenna used to connect the camera(s) and microphones to a publicly accessible internet relay server for the purpose of real-time viewing by VR audiences using their VR display apparatus and portable wireless devices—i.e. WIFI enabled Phones, Laptops, Touch Pads, PDA's, etc. The electronics package unit contains a minimum of one high definition video camera 2L and one microphone 3L whose captured video and audio, following suitable H.264/MPEG compression by 4L, 5L and 6L respectively, is buffered and subsequently sent to an active broadband connection established using for example Mobile Broadband Hotspot Hardware Technology.

The system conveys high definition video and multi-dimensional audio, captured by the microphones mounted within the VR modules, to an audience which may or may not be spectator present at VR venue but wish to subscribe and view the VR venue remotely on their personal wireless VR display apparatus.

The electronics package unit communicates wirelessly with a 4G/LTE or better equivalent Mobile Broadband Tower operating on the 1700 and/or 1900 MHz Frequency Band within a three to five bar signal strength radius of the desired site local to the VR venue. The same Mobile Broadband Tower that is used to intercept the captured streams from the electronics package unit is also used simultaneously to supply the wireless internet access needed by spectators present at the VR venue whom wish to view the VR venue on their personal VR display apparatus. In operation, the live captured MPEG streams are made accessible across the public internet via a relay server which need not be local to the VR venue. This relay server acts as a traffic router and is connected to an internet backbone with sufficient capacity to successfully convey the wideband data streams needed to render High-definition video and sound to the VR viewing audience over the www. I.e. Each person present at a field/rink/court of play in possession of a suitable mobile broadband wireless device i.e. VR display apparatus wishing to view the game in VR, will initially register or subscribe to the service via a URL that is pointed to the relay server IP address. Once registered, however, the VR viewer will have the option of choosing the desired video and/or audio streams available at the given VR venue currently broadcasted.

Alternately, an authorized operator seated in front of a display console located either at the VR venue or the relay server will have the ability to select which VR modules and cameras and/or microphones are associated with which streams prior to broadcast. Commercial content material insertion i.e. sports sponsor's advertisements and announcements and other insertions are also available at the discretion of the authorized operator.

14L is software and memory for making recordings and storing recordings and retrieving recordings by an authorized operator using the laptop computer configured with special software to make the retrieval.

The instrumentation package element enclosure is essentially a short cylinder that is comprised of three sections. The first section is a small diameter cylinder 5L that contains the camera lens 2L. The second section is a larger diameter cylinder 8L that contains the camera 1L. The shoulder section 6L connects 5L and 8L. As technologies improve the miniaturization of the various components, the dimensions of the shoulders and sections are likely to change. The third section is a corrugated bellows segment 9L that contains the electronics 10L. The electronics 10L are mounted on a common multilayer printed circuit board down the center of the instrumentation package element. The third section 9L is connected to a sealed air tight roller bearing 12L. All the section connections are air tight including the roller bearing 12L. When the instrumentation package element is mounted into a mating seat in any one of the instrumentation packages specified in FIG. 19A, FIG. 19B, FIG. 19C and FIG. 21A, FIG. 21B, FIG. 21C, the instrumentation package element is air tight. It is then pressurized with a dry gas like dry nitrogen in order to keep out dirt and moisture. In an alternate preferred embodiment, there is no pressurized dry gas and air tight seats in order to reduce the cost of manufacture.

The instrumentation package element enclosure is made strong to protect its contents from shock and vibration and resist being crushed. Material examples such as polycarbonates, ABS and fiber reinforced plastics are used in its construction.

The camera 1L is a HD TV CCD and CMOS sensor arrayed camera. The camera 1L uses a camera lens 2L which images objects along the camera's optical axis and line of sight 3L onto the camera's CCD or CMOS sensor array. There is a rubber 0-ring seal 4L between the camera lens 2L and the instrumentation package element's enclosure 5L. 5L is the small diameter cylindrical end segment of the instrumentation package element's cylindrical enclosure.

The enclosure has a sealed roller bearing 12L attached to the corrugated bellows segment 9L of the enclosure. The sealed roller bearing 12L permits the entire enclosure to rotate around its axis 3L. The enclosure houses the camera lens 2L, camera 1L, and electronics 10L. The electro-mechanical actuator 11L precisely rotates the camera 1L and its letterbox shaped CCD or CMOS sensor array around its picture frame's center about the optical/mechanical axis 3L of the camera 1L and its lens 2L. The electro-mechanical actuator 11L precisely rotates the entire enclosure containing the camera and its lens around its mechanical axis 3L. Camera 1L and camera lens 2L have optical axis 3L. Therefore, when the electro-mechanical actuator 11L rotates the enclosure, it rotates the camera 1L and its lens 2L together inside the enclosure as a unit around their optical/mechanical axis 3L. The electro-mechanical actuator 11L has a sequence of eight precision detented mechanical stops that are forty-five degrees apart positioned sequentially around the axis 3L.

The electro-mechanical actuator 11L is powered electrically by the electronics 10L to servo on command to any one of the eight detented mechanical stops. The authorized operator controls the electro-mechanical actuator 11L. The authorized operator controls which of the eight detented mechanical stops the electro-mechanical actuator 11L rotates the camera 1L and lens 2L to, and then stops at. An example of the electro-mechanical actuation mechanism 11L, which physically rotates the camera and camera lens together, is a geared micro-motor drive with indexed micro switch stops. An alternate example of an electro-mechanical actuation mechanism is the relay-ratchet. In either case, smooth precise rotation about axis 3L is achieved using the sealed precision roller bearing 12L which is attached to the corrugated bellows 9L end of the instrumentation package element's enclosure.

In a preferred embodiment, where multiple VR modules are deployed inside a VR venue, the authorized operator can rotate each of the cameras in each of the VR modules using the mechanical actuators so that their letterbox picture formats align with one another. This is essential so the letterbox formats of the widely separated cameras match each for 3-D; and when communicating the letterbox picture formats of the widely separated cameras to the VR display apparatus where they are processed together for 3-D.

Four of the eight mechanical stops are primary mechanical stops and are set precisely ninety degrees apart from one another around the optical and mechanical axis 3L. The remaining four mechanical stops are secondary stops and are positioned at forty-five degrees between the primary stops.

The primary mechanical stops are electronically labeled and recorded in memory in counter-clockwise order as the 1st, the 3rd, the 5th and the $7^{th}$ primary stops. The secondary mechanical stops are electronically labeled and recorded in memory in counter-clockwise order as the 2nd, the 4th, the 6th and the 8th secondary stops. The labeling of these mechanical stops assists the software in the VR modules to know precisely how the camera images are rotationally oriented in space relative to reference points in the instrumentation package element, instrumentation package, and the VR module.

The camera 1L is positioned in rotation inside the cylindrical enclosure segment 8L so that the line of its vertical pixels that run through the precise electronic image center of the CCD or CMOS sensor array picture frame will align precisely with the 1st primary mechanical stop.

The sealed precision roller bearing 12L is used to connect and seat the instrumentation package assembly's element into the main central hub of the instrumentation package. The sealed roller bearing 12L is used to seal the joint between the corrugated bellows 9L and the main central hub of the instrumentation package. The sealed bearing 12L holds pressurized dry nitrogen gas inside the instrumentation package element, and prevents dirt and moisture from entering its cavity which might damage its contents. The bearing 12L rotation axis is made coincident with the optical/mechanical axis 3L of camera 1L and camera lens 2L. Elsewhere in the present invention, the instrumentation package element's small diameter cylindrical ends of the enclosure 5L are shown plugged into a buffer plate assembly. Also elsewhere in the present invention, the instrumentation package element's are also shown attached at their corrugated bellows' open end 13L to the hub of their instrumentation package. The small diameter cylindrical end 5L allows the camera lens 2L to peer through the buffer plate when 5L it is plugged into and mounted in the buffer plate.

The top induction coil 7L is wound around the outside of the large diameter cylindrical section 8L of the enclosure close to the enclosure's upper end, to put it in close proximity to the top of the VR module to improve its magnetic coupling efficiency with the battery pack charging unit. Also, the top induction coil 7L is wound around the outside of the large diameter cylindrical section 8L of the enclosure to minimize the heat flow into the enclosure that is generated in its turns while the battery pack is charging. The top induction coil 7L is wired to the electronics 10L inside the enclosure which handles battery charging and power management. The purpose of induction coil 7L is to act as an air core secondary winding to magnetically couple to the time varying lines of flux introduced from the primary winding of the battery pack charging unit which is placed flat on top of the VR module while charging the battery pack.

The electronics 10L is also wired to the lower induction coil (not shown) which is not a part of the instrumentation coil package element. The lower induction coil is mounted on the outside of the access lid heat sink of the instrumentation package and is external to the instrumentation package element. The lower induction coil is also used to charge the battery pack. For example, the lower induction coil is shown in FIG. 19B and FIG. 19C.

In variants of the present preferred embodiment, a variety of different camera lens types, with different lens setting capability, can be used providing they are small in size (so as not to be prominent and conspicuous to the players) and also physically fit within the instrumentation package. The auto iris setting permits the camera lenses to automatically adjust for varying lighting conditions in the VR venue. The auto focus setting permits the camera lenses to adjust focus for varying distances of persons and action subjects in the VR venue.

A variety of different camera lens types, with different lens setting capability, can be used providing they are small in size and weight. The auto iris setting permits the camera lens to automatically adjust for varying lighting conditions on the field. The auto focus setting permits the camera lens to adjust focus for varying distances of players and action subjects on the field.

The functions of the camera lens 2L such as zoom, focus adjustment settings and iris adjustment settings are controlled wirelessly by the authorized operator remotely from the VR module by sending command and control signals to the VR module. The authorized operator can also send command and control signals to the VR module to put these settings on automatic under the control of the camera electronics. The optical and electronic zoom functions of the camera lens 2L are operated by the authorized operator by sending command and control signals to the VR module. The authorized operator can select from a wide variety of HD camera lenses. Wide angle lenses and ultra wide angle lenses are used in many VR venues to give the VR viewing audience the feeling of being there i.e. on the playing field amongst the players. In some VR venues the authorized operator may choose to use camera lenses with more magnification and narrower fields of view to better cover i.e. certain plays. In some VR venues the authorized operator may choose camera lenses with small f-numbers to deal with poorer lighting conditions.

FIG. 13

The detailed physical elements disclosed in the instrumentation package element's signal and data electronics block diagram shown in FIG. 13 are identified as follows: 1M is a high definition camera. 2M is a condenser microphone. 3M is a video MPEG encoder. 4M is an audio operational amplifier. 5M is an audio MPEG encoder. 6M is a random access memory. 7M is a microprocessor. 8M is a power control switch. 9M is a power regulator. 10M is an RF antenna phasing and impedance matching module. 11M is a firmware read only memory. 12M is an MPEG stream encoder. 13M is a network transceiver. 14M is a dc power over fiber line interface. 15M is a dc power from fiber optics/copper port. 16M is a battery recharging and data isolation network. 17M is a 250 kHz tuning capacitor. 18M is a rechargeable battery. 19M is an induction coil interface. 20M is a fiber optics/copper line driver interface. 21M is a main image, sound and RF components. 22M is a control, power supply and battery charging components. 23M is an RF feed line to the antenna assembly of the instrumentation package for televising. 24M is a fiber optic feed line to fiber optic receptacle. 25M is a camera position actuator. 26M is a camera position driver. 27M is an actuator mating plug. 28M is an actuator mating receptacle. 29M is a 250 kHz induction coil. 30M is a condenser microphone. 31M is a condenser microphone. 32M is a condenser microphone. 33M is a condenser microphone. 34M is the camera output plug. 35M is the camera output plug mating receptacle. 36M is the electronic package unit for streaming onto the internet. 37M is an RF feed line to the antenna assembly of the instrumentation package for streaming.

FIG. 13 is the instrumentation package element's signal and data electronics block diagram.

Referring to drawing FIG. 13, in a preferred embodiment, the instrumentation package element's signal and data electronics are disclosed. The instrumentation package element is specified in FIG. 12. The instrumentation package element shown in FIG. 12 is used in the VR module.

Referring to drawing FIG. 13, in a preferred embodiment, the instrumentation package element electronics is disclosed. The instrumentation package element is specified in FIG. 12.

Camera 1M is a Hi-Definition 1080i CCD or CMOS Camera, whose output is a broadcast grade HD-SDI format signal. In this embodiment 1M has a native 16:9 letter-box aspect ratio. The signal of 1M is fed to the input of video MPEG encoder compression hardware 3M. 1M is also equipped with an auto-focus/iris feature set that can be over-ridden by commands from the system CPU 7M in turn issued by the authorized operator software. During a VR session 1M is used to capture the action occurring around either surface of the VR module and convey these captured pictures and sounds via MPEG stream encoder 12M and network transceiver 13M for further processing. Compression hardware 3M is a real time H.264 MPEG compression hardware module. Compression hardware module 3M compresses the signals inputted to them from 1M into MPEG format using the H.264 Protocol and provides an elementary MPEG stream to the input of MPEG stream encoder 12M. Compression is needed to reduce the bandwidth requirements prior to transmission via radio using network transceiver 13M. Compression hardware module 3M, also receives commands from the CPU 7M, which set the compression parameters associated with the H.264 protocol. Alternatively camera 1M may contain part of or all the functions of compression hardware module 3M as part of their own internal circuitry, thus saving some board space during manufacturing, in which case the additional control commands from CPU 7M would be sent directly to cameras 1M in-lieu of compression hardware module 3M.

Remote rotational movement of the camera 1M about its y-axis is achieved by actuator 25M. Actuator 25M in turn receives a set of instructions from microprocessor 7M via actuator driver 26M whenever a positioning command is received by 7M from the authorized operator. 25M operates in the form of a closed-loop servo mechanism and is equipped with an encoder to convey its instantaneous position information to the authorized operator via 7M, thus enabling the authorized operator to know the physical position of the camera 1M relative to its point of mounting within the VR module. 25M is connected to 7M via an actuator mating plug 27M and actuator receptacle 28M.

A set of three condenser microphones, 2M, 30M and 31M are shown in FIG. 13 located inside the VR module. Their purpose is to capture the ambient sounds around the VR module as well as the sound of striking or sliding into the VR module. These microphones serve as the signal source for operational amplifier 4M. 4M is configured as a low noise high gain microphone pre-amplifier. 4M amplifies the signals inputted from the condenser microphones and provides adequate voltage gain and equalization to drive the analog to digital converters inside MPEG Audio Encoder 5M. which further combines the resultant elementary audio data packets into a single stream and applies them to MPEG stream encoder 12M where they are combined with the MPEG stream supplied by 3M prior to transmission to the VR display apparatus by 13M.

13M is a network transceiver. This transceiver is inputted composite encapsulated MPEG Stream image and audio data from 3M and 5M along with system control status data packets from system control microprocessor 7M. Network transceiver 13M then transmits this data, for example, using the 802.11(xx) protocol via the unlicensed i.e. 2.4 or 5.8 GHz radio spectrum via radio using 13M and an antenna located within the instrumentation package of the VR module. 13M also inputs control commands from the authorized operator when they are received by this antenna via the unlicensed 2.4 or 5.8 GHz radio spectrum. These control commands are inputted to 7M. 7M is used to control the flow of system command functions. These command functions are used to adjust the operating parameters of the system based on instructions that it receives from the authorized operator.

Additionally, 13M will also communicate and convey high quality picture and sound information data packets along with the aforementioned system control commands over a fiber optic and/or copper cable connection via fiber optics/copper line driver interface 20M via a fiber optic feed line 24M which is interconnected with a fiber optic receptacle located on the VR module. Use of such a fiber optic connection at the VR module completely eliminates bandwidth and/or interference issues that are sometimes encountered with a solely RF based system. VR venues can also benefit by using fiber optic connectivity since it permits easier future systems upgrades.

System command function instructions can alternately be received by 7M from battery charging and stand-by data separator circuit 16M. This is needed to allow initialization of the instrumentation package inside the VR module. 7M utilizes an operating firmware stored at the time of manufacture on system ROM 11M and executes this firmware upon loading system RAM 6M with its contents. 13M is a network transceiver. 13M is used to provide a wireless RF link operating on the unlicensed i.e. 2.4 or 5.8 GHz radio spectrum between the VR module and the VR viewing audiences, utilizing, for example, the 802.11(xx) Protocol. 13M transmits MPEG stream data packets from 12M and also transmits and receives control commands from system control microprocessor 7M. These control commands specify the exact RF channel frequency, RF channel power output and antenna phasing via an impedance matching and phase shift network 10M when an instrumented baseball base or instrumented home plate equipped with a phased antenna array is being used.

Signals traveling to and from 13M as RF signals are coupled, via an RF feed line 23M and impedance matching network 30M, to the atmosphere by an antenna system located within the VR module. This antenna system, operating within the unlicensed 2.4 or 5.8 GHz radio spectrum, provides an isotropic gain of 3 db or better is used to capture and radiate the RF energy transmitted and/or received between the VR viewing audiences and an VR module so equipped with an instrumentation package.

The instrumentation package utilizing a phased antenna array is shown. A phased array is desirable since it permits a finite adjustment of the transmitted and/or received RF propagation pattern such that an optimum RF path between the remote base station and the instrumented home plate is maintained. This allows interference issues which can occur in some stadiums to be resolved.

The control, power supply and battery charging electronic components within the dotted line boundaries of 22M, receive dc power from 18M whenever 18M is sufficiently charged to place the components of 22 into a steady stand-by state.

The instrumentation package also contains a set of inductive pickup coils 29M that are used to couple electrical energy from outside of the VR module via induction coil interface 19M to the aforementioned battery pack during the recharging of the battery pack via battery charging and stand-by data separator circuit 22M. The aforementioned inductive pickup coil is tuned by a capacitor 17M so as to resonate at a frequency near 250 kHz. 22M contains a switching circuit 8 that receives control commands from system control microprocessor 7M.

The VR module disclosed in FIG. 8A and FIG. 8B and FIG. 8C uses the instrumentation package shown in FIG. 21A and FIG. 21B and FIG. 21C. The instrumentation package shown in FIG. 21A and FIG. 21B and FIG. 21C uses four of the instrumentation package elements shown in FIG. 12. The instrumentation package elements shown in FIG. 12 use gyroscopic transducers which are specified in the present electronics block diagram FIG. 13.

A detailed example of the operation of the gyroscopic transducers follows as applied to a VR module. Referring to FIG. 13M, a self contained three-dimensional gyroscopic transducer 32M is shown. This transducer consists of three separate individual low power semiconductor based encoders. Each of these three encoders is configured at the time of manufacture to respond to a pre-determined action of motion specific to the direction of rotation, forward or backward motion and rise or fall conditions of the VR module in real-time. The VR module's pitch, roll and yaw are encoded. Yaw is associated with the spin of the VR module about its vertical z-axis.

Each encoder provides a pulse coded binary data output that varies in accordance with the relative direction and rate of movement of the VR module. For example, during a typical VR session the VR module may suddenly accelerate in a horizontal direction. The amplitude of this acceleration is perceived by the horizontal motion encoder and its resultant pulse coded data output is fed to an interrupt request port of microprocessor 7M. The connection between 32M and 7M is such that each of the encoders will accurately convey information about the multiple possibilities of physical motions of the VR module during a typical VR session, as previously described above, to 7M for further transmission to the authorized operator via the administrative data link established by components 7M, 10M, 13M and 23M respectively. At the time of boot-up, microprocessor 7M is instructed by the firmware contents contained within read only memory 6M to continually execute a routine check of the data presented to its interrupt ports at a sampling rate sufficiently high enough so as to accurately convey the resultant pulse coded data output that represents the direction of rotation, forward or backward motion and rise or fall conditions of the VR module in real-time to the computer at the authorized operator for use by special software.

The administrative data link referenced above is a bi-directional communications path over which control commands, as well as status data between the VR module and the authorized operator are conveyed. These commands and/or status data consist of data packets or streams that are independent in function of those that are used to convey image and/or sound information to the VR audiences but share the same communications transport mechanism overall This communications transport mechanism is formed whenever the microprocessor within the VR module communicates over the particular mode of communications connectivity that the VR venue has been equipped for i.e. fiber optics, copper cable or wireless radio.

This microprocessor is connected via an I/O port to the network transceiver within the VR module and periodically monitors this port for activity.

When a data stream arrives at this port from the authorized operator, the microprocessor executes a series of instructions contained in ROM in such a way that it will respond and act only on those commands that are correctly identified based on a unique identification integer code present in the signal that immediately precedes the control data stream contents. If the stream is identified as valid, the microprocessor will execute the received command as determined by the firmware stored in ROM and transmit a status data acknowledgement to the authorized operator.

Status data received by the authorized operator transceiver is handled in a manner similar to that of the VR module as previously described.

When the VR module intercepts an appropriately coded transmission over the particular mode of communications connectivity that the VR venue has been equipped for i.e. fiber optics, copper cable or wireless radio, it will respond and act on it in the manner determined by the communications handling provisions of the special software running on its associated computer.

For example, when the VR module is first initialized prior to use from an idle position, normally by a command sent over the administrative data link from the authorized operator, microprocessor 7M according to its firmware instructions contained within read only memory 6M initializes the gyroscopic encoders in a zero motion state so that the authorized operator computer is able to synchronize the previously mentioned special software.

During a typical VR session this computer simultaneously receives the image data streams and automatically, using the previously mentioned special software, continuously calculates and applies to the received image data stream temporarily stored in memory the correct amount of counter adjustment necessary to hold the images in an upright stable unscrambled position when viewed by the VR audience on a hi definition VR display apparatus. The authorized operator operating his computer also has the ability to manually issue commands that affect the amount of correction applied to the final image stream. Such commands are very useful in conjunction with other special effects often used during a VR session.

The authorized operator software selects either the wireless mode of communication, and/or the fiber optics/copper cable mode of communication between each of the VR modules and the VR display apparatus. The authorized operator can use whichever equipment (antenna array relay junction or fiber optics cable/copper cable) is installed in the VR venue with which to command and control his choice and communicate it to the VR modules inside the VR venue.

The authorized operator selects items from a software menu of control commands that go to the network transceiver at the VR modules for the purpose of adjusting various system initializations, operating parameters, radio frequency, polling system status data such as battery condition, and initiating remote mechanical adjustments such as camera focus, optical zoom, iris and movement to the cameras' field of view, etc over the selected bi-directional communications link i.e. wireless radio, fiber optics or copper cable connectivity being used within the particular VR venue.

These commands, when intercepted by the network transceiver 13M within the VR module's are applied to its microprocessor 7M, which then in turn upon executing the instructions stored within the contents of its firmware 6M applies a pulse coded control signal via the power and control interconnect interface 21M inside the instrumentation package to the corresponding electronics i.e. the mechanical actuators that provides optical focus and/or zoom adjustment of the cameras and microphone gain and selection, etc as desired by the authorized operator and/or special software running on the authorized operator's computer. The power and control interconnect interface 21M as shown in FIG. 19E, which is represented by dotted lines, consists of the electrical control wiring to and from the electronic components of the VR modules that are being controlled.

FIG. 14

The detailed physical elements disclosed in the instrumentation package element power supply and battery charging circuits electronics drawing shown in FIG. 14 are identified as follows: 1N is an induction coil interface. 2N is an impedance matching data and power isolation network. 3N is a battery charging circuit. 4N is a 250 kHz data modem. 5N is a dc power bus. 6N is a rechargeable lithium ion battery pack. 7N is a power supply regulator circuit. 8N power control switch. 9N is a power control data bus. 10N is a microprocessor. 11N is a read only memory. 12N is a communications data bus. 13N is a status information data bus. 14N is a system control data bus. 15N switched dc power bus. 16N switched components block. 17N is a dc power receptacle within fiber optic jack assembly. 18N is a 250 kHz induction coil.

FIG. 14 is a block diagram of the instrumentation package element power supply and battery charging circuits electronics.

Referring to drawing FIG. 14, in a preferred embodiment, the instrumentation package element power supply and battery charging circuits electronics are disclosed.

FIG. 14 shows a light-weight air core induction coil 1N located onboard the instrumentation package. 1N is wound of only a few turns of a relatively small gauge magnet wire with sufficient capacity to handle the required current to recharge the batteries also onboard the instrumentation package with minimal temperature rise.

Impedance matching diverter 2N is connected to 1N forming a parallel resonant tank circuit tuned to approximately 250 kHz. When the instrumentation package is placed near a recharging station such that coil 1N is subject to the intense magnetic flux created by the coil within the recharging station, 2N will supply magnetically coupled electrical power from the recharging station via 1N and 2N to battery charging circuit 3N. In addition, 2N also conveys a packet of administrative and control data signals between the recharging station, via 1N and 2N, and Data transceiver 4N. Furthermore, 2N includes a high-stability fail-safe protection circuit which prevents 4N from being catastrophically destroyed by the high voltage present across 1N that is necessary during a typical recharging cycle. Circuits 1N, 2N and 3N are so arranged that whenever the VR module containing the instrumentation package is not placed or is improperly placed on the recharging station or is being used in a VR session, the circuits comprised of 1N, 2N and 3N do not present an electrical load on 7N. This feature set also ensures the longest possible life of the battery during idle periods of no-use by not permitting unnecessary loading of 7N by 1N, 2N and 3N.

In the event that the voltage level appearing at battery bus line 5N has fallen below the charging set-point threshold of 3N, charging of rechargeable battery 6N will begin to commence automatically as charging current is applied to 6N via 3N and 5N whilst the instrumentation package is placed near to an active recharging station.

As the back voltage detected by 3N appearing at 6N rises abruptly above a set-point threshold of 3N, charging current is automatically reduced to prevent over-charging of the batteries, this also protects the remainder of the system 16N from damage due to over heating while its batteries are charging.

Throughout a recharging cycle, main power supply 7N, microprocessor 10N and 4N also receive dc power from 3N via 5N so as to avoid any unnecessary battery consumption until charging is complete.

Whenever dc power is supplied to 7N via 5N, power to the remaining hardware 16N will remain in an off-state until a turn-on command is received by main power supply switch 8N from 10N via main power control data bus line 9N. This will in turn cause 8N to energize Switched Power Bus 14N and begin supplying regulated DC power to the rest of the instrumentation package 16N. 8N will continue to supply such power until 8N receives a shutdown command from 10N via 9N or a failure of 6N occurs. As long as 8N is keeping 14N active 10N may issue commands to 16N via bi-directional Instrumentation Package Control Data Bus Line 15N. 15N is also used to collect status information about 16N including modes of failures which may occur throughout the use of the instrumentation package. These failures in turn cause software parameters of 10N stored within 11N to be executed by 10N and communicate these fault indications back to the base station. Such indications are intended to alert personnel of the fault condition which might otherwise result in an embarrassment to personnel i.e.: an aging battery in need of recharging.

Each instrumentation package is equipped with a unique identification code and operating firmware embedded in the read only memory 11N areas of 10N. As soon as power to 10N via 5N becomes available initialization of 10N is commenced loading this id code and operating firmware into 10N via 11N. Once this initialization of 10N is complete, synchronization of 4N with the recharging station's onboard data transceiver begins, via data transceiver bus line 12N, thereby establishing an administrative and control data link between 10N and the recharging station's human interface panel via 1N, 2N, 3N, 4N and 12N respectively.

The overall rate and length of time at which 3N will continue to supply charging current and hence recharge the batteries within the instrumentation package is dependent on the specific rating and initial condition of the battery, and the entries made in the user adjustable settings menu of the recharging station's human interface panel based on the operating parameters contained in 11N transferred to the microprocessor onboard the recharging station during synchronization of 4N as previously described.

As soon as a typical charging cycle is commenced, continuous fail-safe monitoring data of the charging current and voltage supplied by 3N is sent to 10N via Power control data bus line 13N. If at any time a problem develops during a charging cycle that could result in catastrophic destruction of the instrumentation package, batteries and/or the recharging station, a total system shutdown sequence is initiated and personnel advisory warning displayed on the recharging station's human interface panel, thereby removing power and safeguarding the hardware as described.

While an instrumentation package is properly placed in the recharging station a series of self diagnostic and power consumption tests may be performed on 16N. The results of which are forwarded to the human interface panel of the recharging station via 1N, 2N, 4N, 10N and 11N respectively and are useful to personnel in evaluating the instrumentation package overall condition prior to its use in a game.

Since a finite number of VR modules equipped with instrumentation packages may be inside the VR venue at any one time, a means of cataloging and archiving the charge, recharge, usage, power consumption and diagnostic testing cycles associated with each is provided by 10N via 11N. This information is available to personnel via the human interface panel on the recharging station upon command from personnel and furthermore may be stored by a Personal Computer connected to the data logging port of the recharging station charging the base or plate(s) concerned. As previously described, each VR module's instrumentation package contains a unique identification number; therefore the book-keeping for each is independent respectively.

After 6N has assumed a full and complete charge, the instrumentation package is placed into a powered-off state and except for a very small stand-by current through 4N and 10N, battery consumption is minimized until future use is desired.

Prior to using the instrumentation package in a VR session, 8N must be activated in order to supply dc power to 16N. Upon receiving a power-on command from 10N via 9N and 10N will take 8N out of the power-off state thus allowing 7N to supply dc power to 16N.

Invocation of the power-on command by 10N may be accomplished by either of two methods: Firstly, if the instrumentation package concerned is properly placed on a recharging station, its human interface panel may be used to invoke a power-on command sequence to 10N via 1N, 2N, 4N and 12N respectively. Secondly, the hand-held remote control device may be placed near to an instrumentation package to invoke this command to 10N via 1N, 2N, 4N and 12N if desired.

Activation of 8N by either method places the entire instrumentation package into a fully powered-on state and may then be synchronized, tested and subsequently utilized in a VR module.

While the instrumentation package is in a fully powered on state and not placed in the recharging station i.e. it is being used in a VR session, administrative data, Identification code and control signals along with photographic image and sound accompaniment will be transmitted and available to the authorized operator.

If throughout a game, a low battery condition, power supply or any other technical fault develops, 7N via 13N will cause 10N to transmit an appropriate warning message to the base station's human interface display via the 802.11(x) transceiver in 16N.

False signaling and invocation of the instrumentation package by other nearby potential sources of interference is avoided by the decoding algorithm stored in 11N and used by 10N when communicating critical information over either of the two distinct administrative and control data link techniques utilized by the VR module camera instrumentation package. Until 6N falls to a low level set-point threshold within 7N. The instrumentation package will remain in a fully powered-on state unless 7N is de-activated via 8N after a shutdown sequence is issued by a power-off command from 10N. To preserve the life of 6N, upon completion of its use, i.e. at the end of a game, the instrumentation package should be placed into a powered-off state by causing 10N to issue a power-off signal to 7N via 8N and 9N.

This may be accomplished in one of several methods: Firstly using the human interface hardware, display and software at the base station, personnel may transmit and invoke a power-off command to 10N via the 802.11(x) administrative and control data link of 16N via 13N. Secondly, the field personnel of a typical game may wish to conclude the operation of the instrumentation package by placing the handheld remote control near the instrumentation package and depressing the power-off key on the human interface panel of said remote control invoking a power-off command to 10N via 1N, 2N, 3N, 4N and 12N respectively.

Finally, authorized personnel may place certain VR module into the cradle of the recharging station. As described previously, whenever a VR module is properly placed into the cradle of an active recharging station the instrumentation packages are automatically put into a powered-off state unless otherwise instructed by personnel using the human interface panel of the recharging station concerned whenever 4N is synchronized with the recharging station via 1N, 2N and 3N.

Confirmation in any of the methods just described that the instrumentation package has indeed been placed into a powered-off state is assured to personnel by both visual and audible indication from the human interface concerned when 10N via 1N, 2N, 3N, 4N and 12N acknowledges receipt and execution of the power-off invocation.

FIG. 15A and FIG. 15B

The detailed physical elements disclosed in the VR set-up camera system drawings shown in FIG. 15A and FIG. 15B are disclosed as follows: 1P is a high definition 3-D stereo camera. 2P is a high definition 3-D stereo camera. 3P is a 3-D stereo lens pair. 4P is a 3-D stereo lens pair. 5P is a motorized mount. 6P is a laptop computer. 7P is a special software package. 8P is an adjustable shelf mount for 6P. 9P is a tripod mount. 10P is a USB 3.0 high-speed hub. 11P is a USB 3.0 high-speed hub. 12P is a optical mechanical centerline of the cameras. 13P (not shown). 14P is a robotic mobile platform that is used to navigate and transport the VR set-up camera system to pre-selected points inside the VR venue. 14P uses GPS to navigate to pre-determined points inside the VR venue based on inputs from 6P. An authorized operator may also steer 14P to other additional non-predetermined points inside the VR venue as the need arises. 15P is a dual microphone consisting of a microphone for capturing conducted sounds and a microphone for capturing airborne sounds. The dual microphones are co-located on the front of camera 3-D stereo camera 2P. 16P is a dual microphone consisting of a microphone for capturing conducted sounds and a microphone for capturing airborne sounds. The dual microphones are co-located on the front of camera 3-D stereo camera 1P. 17P is a physical and chemical sensor used to measure weather, the presence of gases, voltages, charge, smells, breath test, alcohol, barometric readings, shocks, vibrations etc. at the VR set-up camera system's site inside the VR venue. The physical and chemical sensor is exposed to the elements on 2P.

FIG. 15A is a diagram of the right side of the VR set-up camera system.

FIG. 15B is a diagram of the left side of the VR set-up camera system.

Referring to drawings FIG. 15A and FIG. 15B, in a preferred embodiment, the VR set-up camera system is used to gather 3-D VR images and sound from inside the VR venue. The 3-D VR images and sound needed by the VR audience to create a database of VR multimedia content that is subsequently utilized by the VR viewing audience' generic VR display apparatus.

The VR set-up camera is equipped with dual high definition 3-D stereo cameras and compression hardware and four multidimensional sound microphones. The VR set-up camera is configured so that VR images and multidimensional sound i.e. VR multimedia content, from opposite directions 180 degrees apart maybe captured simultaneously. The VR set-up camera is used to capture VR images and multidimensional sound which it records and stores in the laptop computer memory 7P. The recorded VR multimedia content is stored in the memory of the laptop computer 7P. 1P & 2P are mounted on the top of 5P. 5P is a motorized camera mount that provides 1P & 2P with azimuth & elevation motions. 6P is a laptop computer. 6P is loaded with 7P. 7P is a software package that when initialized by the VR set-up camera's authorized operator is used to determine and control the position of 1P & 2P via commands to 5P and in turn capture and store the VR images and multidimensional sound needed by the generic VR display apparatus as previously described.

During operation, 1P & 2P receives commands from 6P. These commands determine various operational parameters of 1P & 2P such as image format and resolution, aspect ratio, focus, bulb, shutter and iris settings as well as whether or not to apply additional optical features i.e. 3-D zoom lenses, rectilinear distortionless lenses.

VR images outputted by 1P are subsequently captured and stored by 5P under the control of 6P respectively. Audio multimedia content is stored in the same Way.

A human interface to 6P can be made by the VR set-up camera authorized operator via the keyboard and mouse of 5P. Various operating functions of 6P once initialized by the VR set-up camera authorized operator may be executed by remote control or automatically. This permits the VR set-up camera authorized operator to position himself/herself out of the field of view when using the VR set-up camera system. Typically during operation, 5P will be secured to 7P such that the VR set-up camera authorized operator may access and views the laptop screen easily while the system acquires the VR images automatically. 7P is an adjustable shelf attached to the rear legs of 8P. 8P is a collapsible three-legged tripod. 8P can be used in such a way as to allow 1P to capture images at or near ground level. 9P is a rechargeable battery like a lithium-ion battery pack. 9P supply's electrical power to 1P & 2P via 10P & 11P. 9P may also serve as a backup power source for 5P via 12P. 9P is recharged whenever necessary by 13P. 10P, 11P and 12P are multi-pin power cables. 13P is a small switching type power supply used to convert utility mains power to that utilized by 9P while being recharged.

The VR setup camera basically surveys the VR venue and takes pictures from inside of the VR venue at different pre-determined pitch and yaw angles of the VR setup camera from a variety of pre-selected coordinate points inside of the VR venue. The VR setup camera is stationed both at ground level on inside the VR venue and six feet above the floor level. The pictures taken by the VR setup camera are pre-processed in an upright condition to meet the protocol and input data requirements for the generic VR display apparatus to receive.

The scanning and scaling is automatically done by the software in the VR setup camera.

In a preferred embodiment, the VR setup camera is mounted on a robotic mobile platform 14P. The robotic mobile platform 14P automatically moves inside the VR venue and transports the VR setup camera automatically to pre-selected points inside the VR venue. The VR setup camera performs its pre-determined functions to capture VR multimedia content at each of these points.

In another preferred embodiment, the authorized operator can intervene and interrupt during the operation of the robotic mobile platform 14P and re-direct the robotic mobile platform 14P to alternate points inside the VR venue. The authorized operator can also intervene and interrupt during the operation of the VR setup camera and change the menu and sequence of its operations as well.

These embodiments are extremely useful because they allow the format of the video multimedia content to be adjusted by the authorized operator to match the input data requirements and protocols of each of the different VR display apparatus on the market. The adjustability gives these embodiments the flexibility to be able to work with a wide variety of VR display apparatus on the market today as well as VR display apparatus in the future.

The resultant bit maps that are captured are subsequently loaded into the VR display apparatus by transmission from the VR setup camera to the VR display apparatus using i.e. a wireless link or by memory card. The VR setup camera will take all the pictures that the system needs to establish a data base for the VR imagery needed by the VR display apparatus. The data from the VR setup camera equipment can be used in real time or at a future time.

In a preferred embodiment, there is a bit map created for each VR venue on a removable flash memory card. A bit map for every VR venue is stored on a flash memory cards. An authorized operator comes to the VR venue prior to a VR session with the VR setup camera equipment, and sets up the VR setup camera in the VR venue on the tripod and robotic platform 14P. The robotic platform 14P transports the VR setup camera to the pre-designated points in the VR venue by following the menus set forth in the associated software loaded into the operator's laptop computer. The VR setup camera is plugged into the laptop computer, which contains the scanning software the VR setup camera needs to acquire and store the VR venue bit maps needed eventually by the VR display apparatus' computer to create a VR venue database. In a preferred embodiment, the VR venue bit maps stored in the laptop computer are subsequently loaded into the VR display apparatus' computer by transmission from the laptop computer to the VR display apparatus' computer using a wireless link, or by recording the bit maps in the laptop computer on flash memory cards, which can be removed from the laptop computer and plugged into the VR display apparatus' computer. If fiber optics and/or copper cable communication links are available between the VR setup camera and the VR viewing audiences' VR display apparatus, they will be used as well.

Figure 15:
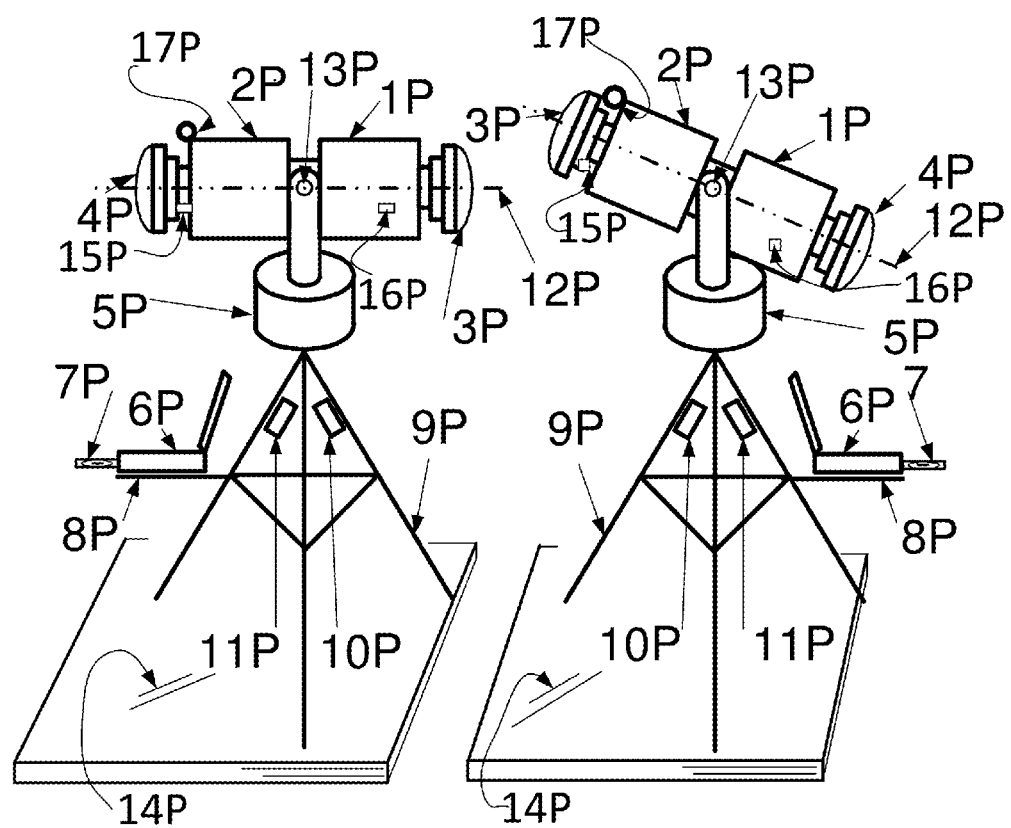
FIG. 15A is a right side mechanical diagram of the VR set-up camera system.
FIG. 15B is a left side mechanical diagram of the VR set-up camera system.
Figure 16:
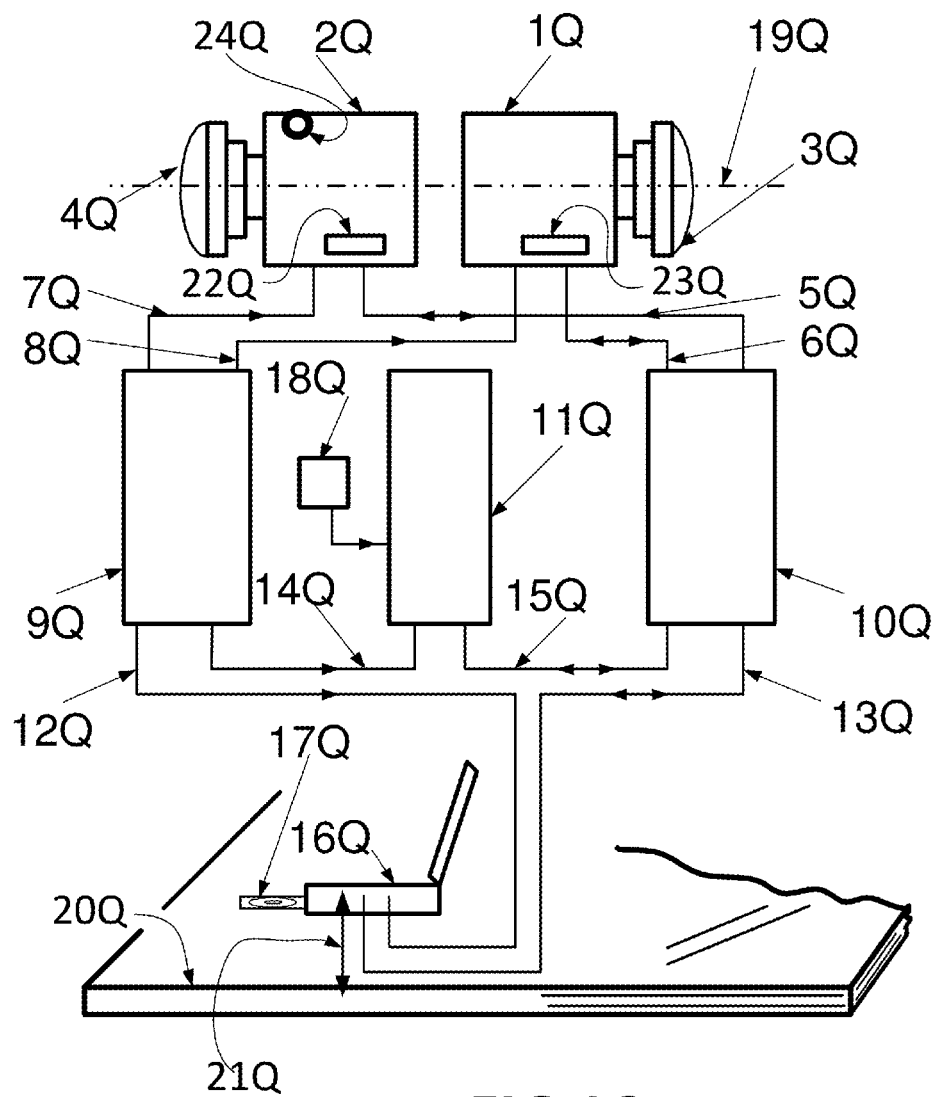
FIG. 16 is a block diagram showing the signal and data flow circuits in the VR set-up camera system shown in FIG. 15.

When the authorized operator initiates a scan command, the tripod mounted VR set-up camera system shown in FIG. 15A and FIG. 15B, and FIG. 16 automatically levels itself and using GPS initializes the cameras in all pitch, roll and yaw angles. From this data base, all of the required vertical upright references required data bases may be determined. It only has to do it only one time for that VR venue. After that, it can supply all the other data the system requires to automatically stabilize a picture in pitch, yaw and roll of the VR set-up camera even in cases where the VR venue has a variable arbitrary topography. The system overlays the sequential images taken from a point in the VR venue so that they mesh smoothly together to form a smooth continuous 360 degree sphere of imagery, thereby requiring very little VR display apparatus' preparation to use the captured image multimedia.

FIG. 16

The detailed physical elements disclosed in the signal and data flow circuits in the tripod mounted VR set-up camera system drawing shown in FIG. 27 are identified as follows: 1Q is a high definition 3-D stereo camera. 2Q is a high definition 3-D stereo camera. 3Q is a 3-D stereo lens pair. 4Q is a 3-D stereo lens pair. 5Q is a high speed USB cable. 6Q is a high speed USB cable. 7Q is a camera dc power cable. 8Q is a camera dc power cable. 9Q is a dc power supply hub. 10Q is a high speed USB hub. 11Q is a rechargeable battery pack. 12Q is a laptop computer dc power cable. 13Q is a high speed laptop computer USB cable. 14Q is a dc power cable. 15Q is a dc power cable USB hub. 16Q is a laptop computer. 17Q is a special system software package. 18Q is a small switching power supply. 19Q is the optical mechanical centerline of the cameras. 20Q is a robotic mobile platform that is used to navigate and transport the VR set-up camera system to pre-selected points inside the VR venue. The authorized operator may also steer 20Q to other points inside the VR venue as the need arises. 21Q is the cable connection between the laptop computer and the robotic mobile platform 20Q.

22Q is a dual microphone consisting of a microphone for capturing conducted sounds and a microphone for capturing airborne sounds. The microphones are co-located on the front of 3-D stereo camera 2Q. 23Q is a dual microphone consisting of a microphone for capturing conducted sounds and a microphone for capturing airborne sounds. The microphones are co-located on the front of 3-D stereo camera 1Q. The signals from microphones 22Q and 23Q are inputted to the laptop computer 16Q for processing via is a high speed USB hub 10Q. 24Q is a physical and chemical sensor used to measure i.e. the presence of gases, voltages, charge, smells, breath test, alcohol, barometric readings, shocks, vibrations the weather conditions, etc. at the VR set-up camera system site inside the VR venue. The physical and chemical sensor is exposed to the elements on 2Q.

FIG. 16 is a block diagram showing the signal and data flow circuits in the VR set-up camera system shown in FIG. 15A and FIG. 15B.

Referring to FIG. 16, in a preferred embodiment, the signal and data flows circuits that comprise the VR set-up camera system shown in FIGS. 15 A and B, are disclosed. High-speed USB cables 5Q and 6Q are used to interconnect 1Q and 2Q with high-speed USB hub 10Q. In order to enable automated positioning of 1Q and 2Q under the control of 17Q, a motorized tripod mount 11Q is connected via high-speed USB cable 15Q to 10Q.

A laptop computer 16Q is connected to 10Q via high-speed USB cable 13Q. During operation, 10Q behaves as a junction box for 16Q. Since most laptop computers posses a maximum of two USB ports, 10Q is needed. When the system is in operation, 17Q may issue control commands to 1Q, 2Q and 11Q. These control commands from 17Q are conveyed between 16Q, 1Q, 2Q and 11Q using 5Q, 6Q, 10Q, 13Q and 15Q respectively. 3-D images captured by 1Q and 2Q are transferred to 16Q via 5Q, 6Q, and 13Q for further processing, storage and future retrieval.

The VR set-up camera system is equipped with a i.e. high-capacity metal-hydride rechargeable battery pack 9Q. During operation, 9Q supplies electrical power to 1Q, 2Q, 10Q, and 11Q. Back-up power for 16Q is also provided by 9Q. Multi-pin dc power cables 7Q, 8Q, 12Q and 14Q are used to connect 9Q to 1Q, 2Q, 10Q and 16Q respectively. 9Q is recharged whenever necessary by small switching power supply 18Q. 18Q is used to convert utility mains power to that utilized by 9Q while being recharged.

The robotic mobile platform 20Q has a servo control system that drives the platform to transport the VR set-up camera from point to point under the command of the laptop computer 16Q. 21Q is the cable connection between the laptop computer and the robotic mobile platform 20Q. The cable carries control commands from the laptop computer 16Q to the servo control system in 20Q directing 20Q how, when and where to go during a VR session. The cable 21Q also carries power to the robotic mobile platform 20Q via the laptop computer 16Q. Cable 21Q carries status feedback signals to the laptop computer 16Q from the servo control system in 20Q to close the feedback loop.

FIG. 17A and FIG. 17B

The detailed physical elements disclosed in the hand-held remote control unit drawings shown in FIG. 17A and FIG. 17B are identified as follows: 1R is a hand-held remote control unit for the VR module. 2R is a 250 kHz induction coil. 3R is a multi function toggle switch. 4R is a LED/visual indicator. 5R is a handle. 6R is a rechargeable battery pack. 7R is a horizontal centerline of the hand-held remote control.

FIG. 17A shows a side view a hand-held remote control unit.

FIG. 17B shows a top view of a hand-held remote control unit.

Referring to drawings FIG. 17A and FIG. 17B, in a preferred embodiment, a hand-held remote control unit used to enable and disable the VR module, is disclosed. 1R is a hand-held remote control unit used to enable and disable the VR module. 2R is a 250 kHz induction coil used to magnetically couple the administrative/control data signals to and from the VR module. The administrative/control data signals consist of control commands and status information that enable the field personnel like authorized operators and other authorized personnel to manipulate the various functions inside the VR module i.e. camera operating parameters, and obtain status information on the condition of the VR module i.e. battery life. The administrative/control data signals are also used to enable and disable the operation of the VR module, and to designate the desired wireless radio frequency. In a preferred embodiment, the administrative data link is accessible using either the 250 kHz coupling or the wireless capability of the VR module. 3R is a multi function toggle switch used to activate and deactivate the VR module. 4R is a LED/visual indicator used to indicate the status of the VR module, and the status of the battery inside 1R. 5R is a handle used to be held by field personnel to hold the hand held remote control unit physically against the VR module. 6R is a rechargeable battery pack located inside the hand held remote control unit. 7R is a horizontal centerline of the hand-held remote control which lines up with the centerline of the VR module when the hand held remote control unit is placed physically against the VR module. 1R is interconnected to the authorized operator's laptop computer.

The administrative data link referenced in FIG. 17A and FIG. 17B is a bi-directional communications path over which control commands, as well as status data between the VR module and authorized operators are conveyed. These commands and/or status data consist of data packets or streams that are independent in function of those that are used to convey image and/or sound information to the VR display apparatus but share the same communications transport mechanism overall.

This communications transport mechanism is formed whenever the microprocessor within the VR module communicates with the VR display apparatus over the particular mode of communications connectivity that the VR module has been equipped for i.e. fiber optics, copper cable or wireless radio.

This VR module's microprocessor is connected via an I/O port to the network transceiver within the VR module and periodically monitors this port for activity.

In a preferred embodiment, when a data stream arrives at this port from an authorized operator, the VR module's microprocessor executes a series of instructions contained in ROM in such a way that it will respond and act only on those commands that are correctly identified based on a unique identification integer code present in the signal that immediately precedes the control data stream contents. If the stream is identified as valid, the microprocessor will execute the received command as determined by the firmware stored in ROM and transmit a status data acknowledgement to the authorized operator.

Status data received by the authorized operator's transceiver is handled in a manner similar to that of the VR module as previously described.

When the VR module's transceiver intercepts an appropriately coded transmission over the particular mode of communications connectivity that the VR module has been equipped for i.e. fiber optics, copper cable or wireless radio, it will respond and act on it in the manner determined by the communications handling provisions of the special software.

FIG. 18

Figure 18:
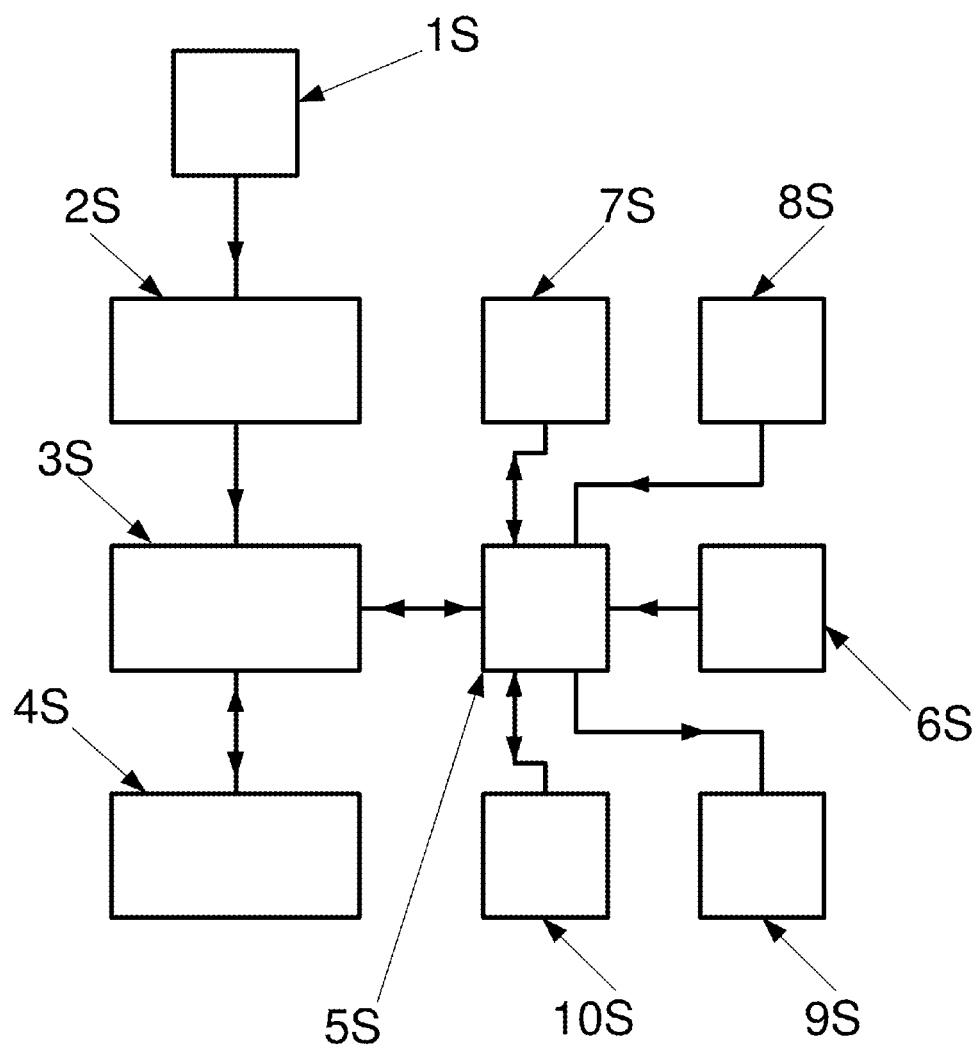
FIG. 18 is a block diagram showing the signal and data flow circuits inside the hand-held remote control unit in FIG. 17A and FIG. 17B.

The detailed physical elements disclosed in the hand-held remote control unit signal and data flow circuits drawing in FIG. 18 are identified as follows: 1S is a small switching power supply. 2S is a lithium-ion battery pack. 3S is a frequency converter. 4S is an induction coil. 5S is a microprocessor. 6S is a multi function toggle switch. 7S is a ROM-read only memory. 8S is a light emitting diode visual indicator. 9S is an audio transducer. 10S is a RAM random access memory.

FIG. 18 is a block diagram showing the signal and data flow circuits inside the hand-held remote control unit in FIG. 17A and FIG. 17B.

Referring to drawing FIG. 18, in a preferred embodiment, the signal and data flow circuits inside the hand-held remote control unit in FIG. 17A and FIG. 17B, are disclosed. A small switching power supply 1S is shown. 1S is used to recharge the lithium-ion battery pack 2S of the hand-held remote electronics package. This allows the hand-held remote to be used more conveniently and free of utility mains whilst activating or deactivating a VR module.

When 2S is sufficiently charged, low voltage dc power to operate frequency converter 3S and microprocessor 5S is available. By momentarily depressing multi-position toggle switch 6S, 5S will initiate a boot-up sequence and load a firmware image stored at the time of manufacture on ROM 7S into RAM 10S. If at the same time, whilst 6S is being depressed, induction coil 4S is placed in a position with sufficiently close contact to either side of the VR module, then 5S will transmit an encoded signal command at a frequency near 250 kHz via 3S and 4S respectively to query the electronic identification number that is stored within the firmware ROM of the VR module. This step is necessary to eliminate the problems associated with unwanted interference from neighboring sources of radio frequencies that might otherwise occur resulting in the false activation or deactivation of said VR module.

Once 5S has successfully queried and received the VR module's electronic identification number as mentioned previously, status light emitting diode display 8S is illuminated briefly following a short confirmation tone sounded by audio transducer 9S via a command from 5S. At such time activation or deactivation of the VR module may be performed by again momentarily depressing 6S to the desired function whilst continuing to hold 4S in close contact with the desired end of said VR module and awaiting confirmation of the operation by a visual indication from 8S. If no further operation is performed or 4S is moved a significant distance away from the sides of the VR module for a time-out period previously loaded into 10S, 5S will subsequently enter the self-shutdown sequence loaded in 10S placing the hand-held remote into a powered off state thus preserving the lifespan of 2S.

In the event that an attempt to activate or deactivate said VR module is made while the VR module or the battery onboard said package is in a damaged, weakened or sub-discharged state, upon receiving such status data from the VR module 5S will alert authorized personnel to this important condition by visual and audible indications from 8S and 9S respectively. This step will prevent field personnel from inadvertently using a VR module in need of attention by service personnel.

FIG. 19A and FIG. 19B and FIG. 19C

The detailed physical elements disclosed in the instrumentation package drawings shown in FIG. 19A and FIG. 19B and FIG. 19C are identified as follows: 1T is the y-axis of symmetry of the instrumentation package. 2T is a camera. 3T is the top induction coil for charging the battery. 4T is the x-axis of symmetry of the instrumentation package. 5T is a microphone. 6T is a microphone. 7T is the instrumentation package. 8T is the electronics. 9T is an instrumentation package assembly element showing a corrugated bellows segment. 10T is the bottom induction coil for charging the battery. 11T is the camera lens. 12T is the z-axis of symmetry of the instrumentation package. 13T is the camera lens seal. 14T is a radio antenna. 15T is a radio antenna. 16T is a radio antenna. 17T is a radio antenna. 18T is the fiber optics and copper cable connector. 19T is the bottom lid heat sink of the instrumentation package. 20T is the camera and camera lens electro-mechanical actuating device. 21T is the battery. 22T is dry nitrogen gas. 23T is the gas valve. 24T is the microphone electrical connector. 25T is a microphone. 26T is a microphone.

FIG. 19A is the top view of the electronics layout of a one-camera wireless instrumentation package.

FIG. 19B is a side view of the electronics layout a one-camera wireless instrumentation package.

FIG. 19C is a side view of the electronics layout of a one-camera instrumentation package configured with wireless, fiber optics and bi-directional high speed copper cable network communications links.

Referring to drawings FIG. 19A and FIG. 19B and FIG. 19C, in two preferred embodiments, two different instrumentation packages, are disclosed. The present invention contemplates each instrumentation package to be equipped with a single TV camera, a TV camera lens, and four microphones, supporting electronics, battery pack, two induction coils, a mechanical actuating device and four antennas. An electrical connector allows the audio from additional microphones to be inputted to the instrumentation package.

The single TV camera, single TV camera lens, supporting electronics, induction coil, are the parts of the instrumentation package disclosed in FIG. 19A and FIG. 19B and FIG. 19C.

The instrumentation package is used to instrument the VR module shown in FIG. 9A and FIG. 9B and FIG. 9C.

The preferred embodiment shown in FIG. 19B uses wireless RF radio transmission to televise pictures and sounds. The preferred embodiment shown in FIG. 5 uses both wireless, fiber optics and bi-directional high speed copper network communications cable transmission to televise pictures and sounds from the VR module. The only difference between the two embodiments is that FIG. 19B has wireless capability only, whereas FIG. 19C has both wireless, fiber optics and bi-directional high speed copper network communications cable capabilities. The one that has wireless capability only is cheaper to produce than the one that has wireless, fiber optics and bi-directional high speed copper network communications cable capabilities thereby giving it a cost advantage for venues with lower budgets, like for example some colleges and high schools. The one with wireless, fiber optics and bi-directional high speed copper network communications cable capabilities has better bandwidth and lower noise.

It is contemplated in the present invention in FIG. 19B that the instrumentation package is an autonomous module designed as a sealed unit for being mounted inside a VR module, and making the VR module capable of wirelessly televising from its cameras and microphones, to VR display apparatus.

A VR venue with a VR module for wirelessly televising VR multimedia content is shown in FIG. 7. A VR venue with a VR module for televising VR multimedia content via fiber optics cable and/or copper cable buried beneath the ground is shown in FIG. 4A and FIG. 4B.

The preferred embodiment shown in FIG. 19B uses wireless radio wave transmission of the televised pictures and sounds. The preferred embodiment shown in FIG. 19C uses fiber optics and/or copper cable transmission. It also has the capability of televising pictures and sounds by wireless transmission.

The instrumentation package has one instrumentation package element. The instrumentation package element is disclosed in FIG. 12. The TV camera, TV camera lens, supporting electronics, and induction coil and mechanical actuating device are the primary parts of the instrumentation package element.

It is understood that as the state of the art in TV camera technology advances, that there will be other better TV cameras that use other than CCD and CMOS technology. The present invention will work equally well with them as they become available. Therefore, the present invention uses CCD and CMOS TV cameras as an example of TV cameras that may be used simply because they are the best that today's technology offers, and is not confined only to their sole use in the future.

Referring to the instrumentation package shown in FIG. 19A and FIG. 19B and FIG. 19C, FIG. 19A is a top view of the instrumentation package, FIG. 19B is an A-A section view of the instrumentation package, FIG. 19C is an A-A section view of the alternative instrumentation package preferred embodiment showing the fiber optics cable and copper cable connector 18T. The instrumentation package element 9T is disclosed in FIG. 12.

The instrumentation package 7T contains all the electronics for wirelessly televising pictures and sounds. The picture and sounds are taken directly by the instrumentation package camera 2T and microphones 5T and 6T. Both preferred embodiments shown in FIG. 20B and FIG. 20C communicate the pictures and sounds from the VR module in the VR venue to VR display apparatus.

The instrumentation package electronics showing the detailed flow of electrical signals and data in the instrumentation package is shown in the preferred embodiment given in FIG. 13.

The instrumentation package 7T is a compressed assemblage of all the optical and electronic components that gather and transmit TV pictures and sounds into a single enclosure. The main body of the instrumentation package 7T is essentially a short cylinder about ½ inch high that resembles a can of tuna fish. It is made strong to resist being crushed. Material examples such as polycarbonates, ABS and fiber reinforced plastics are used in its construction. The x-axis of symmetry of the instrumentation package 7T is 4T. The y-axis of symmetry of the instrumentation package 7T is 1T. The center of the instrumentation package 7T is located at the intersection of the x-axis and the y-axis. The z-axis 12T of the main body of the instrumentation package 7T is mutually orthogonal to 4T and 1T.

The instrumentation package 7T contains cameras 2T, camera lens 11T, supporting electronics 8T, induction coils 3T and 10T, battery pack 19T, radio antennas 14T, 15T, 16T and 17T, microphones 5T and 6T, and bottom lid 19T.

The part of the instrumentation package 7T that contains the camera 2T, camera lens 11T, and supporting electronics 8T, induction coil 3T is the instrumentation package element specified and shown enlarged in FIG. 12.

Camera 2T, camera lens 11T, supporting electronics 8T, induction coil 3T shown in FIG. 6 are identical to camera 2T, camera lens 11T, supporting electronics 8T, induction coil 3T shown in FIG. 19C.

The supporting electronics 8T shown in FIG. 19B are different from the supporting electronics shown in FIG. 19C. The supporting electronics shown in FIG. 19C have an additional capability beyond that specified for the supporting electronics shown in FIG. 19B. The supporting electronics in FIG. 19B can only televise wirelessly to the VR display module. The supporting electronics shown in FIG. 19C can televise pictures and sounds via a fiber optics cable link and by copper cable to the VR display module, as well as televise wirelessly to the VR display module.

The picture and sounds are taken directly by the camera 2T and microphones 5T and 6T inside the instrumentation package 7T. The instrumentation package 7T is mounted within the VR module that is in the VR venue. The instrumentation package may wirelessly or by fiber optics or by copper cable communicate and televise the pictures and sounds from inside the VR module to a VR display module.

The instrumentation package 7T contains all the electronics 8T for wirelessly televising pictures and sounds. The camera 2T, camera lens 11T, and electronics 8T are joined to the main body of the instrumentation package by a corrugated bellows segment.

In FIG. 19B, the instrumentation package 7T contains all the electronics 8T for wirelessly televising pictures and sounds. The electronics 8T is identical to the electronics 27T in FIG. 19B.

In FIG. 5, the instrumentation package 7T contains all the electronics 8T for televising pictures and sounds using a fiber optics cable link and/or copper cable link, in addition to televising pictures and sounds wirelessly like in FIG. 19B.

In a preferred embodiment where we have disclosed a VR venue with a fiber optics cable link and/or copper cable link buried beneath the ground, and in particular beneath the VR module, and where the fiber optics cable link and/or copper cable link communicates to the VR display apparatus, and where the electronics in FIG. 19C includes the capability to televise VR multimedia content from inside the VR venue to the VR display apparatus via the fiber optics/copper cable link by connecting to the fiber optics/copper cable link using the fiber optics/copper cable connector 18T. The instrumentation package 7T in the preferred embodiment shown in FIG. 19C uses a fiber optics cable/copper cable connector 18T with which to connect to a fiber optics/copper cable link buried beneath the ground and beneath the VR venue.

The diameter of the instrumentation package is kept to a minimum in order to minimize its footprint inside the VR venue. The dimension of the outside diameter of the instrumentation package is governed largely by the physical diagonal dimension of the largest components within the instrumentation package, like the SD/HD camera's CCD and CMOS sensor array and the battery package.

The instrumentation package is mounted inside the VR module using a buffer plate that acts as a mechanical bearing for the instrumentation package. The buffer plate supports the upper end of the instrumentation package.

The instrumentation package 7T contains one miniature SD/HD TV camera 2T and two condenser microphones 5T and 6T and supporting electronics. The camera, microphones 5T and 6T and supporting electronics are housed together within the enclosure cavity of the instrumentation package 7T. The condenser microphones 5T and 6T are attached to the top interior wall of the instrumentation package. The microphones 5T and 6T hear any sounds produced by physical contact of the VR module with any external thing, including for example air currents felt on the VR module during the baseball's flight in the air over the VR module.

Microphone electrical connector 24T is mounted on the instrumentation package. 24T mates with an electrical connector which is wired by a cable to microphones mounted on the top surface of the VR module. These microphones protrude through the top of the VR module. These microphones listen for sounds of the game that occur on the VR venue above the top of the VR module and above the ground; and also for sounds of the game that occur on the VR venue above the top of the VR module. The microphone cables from each of these microphones carry electrical sound signals from the microphones to the microphone's electrical connectors which are plugged into mating electrical connector 24T on the instrumentation package shown in the referenced drawings.

The instrumentation package 7T is a sealed unit.

In a preferred embodiment, the diameter of the instrumentation package 7T is kept to a minimum in order to minimize the space taken up inside the VR module. The dimension of the outside diameter of the instrumentation package is governed largely by the physical diagonal dimensions of its largest components like the quad antennas 14T, 15T, 16T and 17T and the battery pack 21T. In another preferred embodiment, the diameter of the instrumentation package 7T is kept large to reduce development cost and the cost of manufacture.

The line of sight of camera 2T is mutually perpendicular to the top of the instrumentation package 7T. Camera 2T looks out perpendicularly from the top of the instrumentation package 7T.

The optical axis of the camera 2T is aligned perpendicular to the top of the instrumentation package 7T. Therefore its line of sight is perpendicular to the top of the instrumentation package 7T.

The optical axis of camera 2T within the instrumentation package 7T is aligned to be coaxial with the instrumentation package 7T mechanical z-axis 12T. The camera 2T is positioned at the top of the instrumentation package and looks out through the camera lens 11T which is positioned above it.

The camera lens 11T is positioned at the very top of the instrumentation package 7T, with the camera 2T directly beneath it. The camera essentially looks out of the top of the instrumentation package 7T.

The camera lens 11T provides imagery to camera 2T. The camera lens 11T images the objects it sees onto camera 2T. The optical and mechanical axis of camera 2T and camera lens 11T is 12T.

In a preferred embodiment, the camera lens 11T has an o-ring seal 13T. The purpose of the seal 13T is to hold and prevent leakage of the pressurized dry nitrogen gas from the cavity of the instrumentation package. The seal prevents dirt and moisture from entering the cavity and damaging and interfering with the performance of its contents. The seal 13T is made from rubber. The seal 13T is located between the front of the camera lens 11T and the camera lens cylindrical mounting. In another preferred embodiment, 13T and the dry nitrogen gas are dispensed with in order to reduce the cost of manufacture.

In variants of the present preferred embodiment, a variety of different camera lens types with different lens setting capability can be used and physically fit within the instrumentation package. The auto iris setting permits the camera lens to automatically adjust for varying lighting conditions on the field. The auto focus setting permits the camera lens to adjust focus for varying distances i.e. of the players and action subjects on a playing field.

The functions of the camera lens 13T such as focus adjustment settings and iris adjustment settings are controlled wirelessly by the authorized operator by sending command and control signals to the instrumentation package inside the VR module. The authorized operator can also send command and control signals to the instrumentation package to put these settings on automatic under the control of the camera electronics. The optical and electronic zoom functions of the camera lens 13T are operated by the authorized operator by sending command and control signals to the instrumentation package. The authorized operator can select from a wide variety of HD camera lenses. Wide angle lenses and ultra wide angle lenses are used in many venues to give the VR viewing audience the feeling of being there in the VR venue during a VR session. In some venues the authorized operator may choose to use camera lenses with more magnification and narrower fields of view to better cover certain action. In some VR venues the authorized operator may choose camera lenses with small f-numbers to deal with poorer lighting conditions.

When the VR module is used in sports, the distance of a player to the VR module may be decreasing or may be increasing. The camera 2T can be independently and simultaneously commanded and controlled to auto focus on their respective players. The microphones 5T and 6T will capture all the sounds of the action. While a player is running, his or her pictures and sounds are being transmitted by the instrumentation package 7T inside the VR module.

A block diagram showing the detailed flow of electrical signals and data in the instrumentation package's electronic circuits is shown in the preferred embodiment given in FIG. 13 and FIG. 14. The instrumentation package network transceiver is part of the electronics in 8T. The network transceiver wirelessly transmits real-time pictures and sounds from the camera 2T and microphones 5T and 6T via quad antenna array elements 14T, 15T, 16T and 17T, also known as intentional radiators, to a network interconnected with the VR audience's VR display apparatus. The quad antenna array elements 14T, 15T, 16T and 17T are mounted radially between the two circular circuit boards that comprise 8T.

As is shown in the alternative preferred embodiment in FIG. 19C, a fiber optics/copper cable connector 18T is employed to connect to a fiber optics cable link buried in the ground beneath the VR module, to televise the pictures and sounds from the VR venue to the VR audience's VR display apparatus which is networked and connected to the fiber optics cable link at its other end. Should fiber optics/copper cable buried in the ground not exist at a VR venue, the VR venue may be televised wirelessly using radio signals and antennas 14T, 15T, 16T and 17T using the preferred embodiment shown in FIG. 19B. It is clear that the preferred embodiment shown in FIG. 19C is superior in this regard because it is capable of televising by both methods i.e. either wirelessly or by a fiber optics/copper cable link. The preferred embodiment shown in FIG. 19C is more expensive to manufacture than the preferred embodiment shown in FIG. 19B because its electronics 8T must provide for the additional fiber optics and/or copper cable related electronic functions.

In an alternate preferred embodiment, the quad antenna array elements 14T, 15T, 16T and 17T are replaced with a helix antenna (not shown) with similar dimensions wound on the inside diameter of the instrumentation package 7T.

The battery's charging coils 3T and 10T are wound on the outside at both the top and bottom of the instrumentation package 7T and act electrically as a transformer's secondary winding. The coils are wound on the outside of the instrumentation package 7T to keep any heat they may produce away from the contents of the instrumentation package 7T while the battery pack is being charged. The number of turns in each charging coil 3T and 10T is made large enough to inductively couple a sufficient number of magnetic lines of flux from the primary coil of the external battery charging unit so as to charge the battery pack in a reasonably short time before a VR session. When an external charging unit is placed on top of the VR module, the charging coils 3T and 10T receive electrical energy inductively coupled from the primary coils of the external charging unit.

Induction coil 3T is located on the top of the instrumentation package 7T. Induction coil 10T is located on the bottom of the instrumentation package 7T. Induction coil 26T is located on the top of the instrumentation package 7T. Induction coil 19T is located on the bottom of the instrumentation package 7T. The purpose of the induction coils 3T, 10T and 19T, 26T is to inductively couple electrical energy into the instrumentation package 7T to charge the battery pack 21T. The induction coils 3T and 10T are located on the exterior of the enclosure so as to minimize their heat transfer into the instrumentation package 7T enclosure cavity that would raise the temperature of the electronics within the enclosure cavity. The induction coils 3T and 10T are electrically connected through the enclosure walls to the electronics inside the enclosure cavity.

When the instrumentation package 7T is mounted inside the VR module, an external electrical induction coil which is part of a battery pack charging unit is used to magnetically inductively couple electrical power into induction coils 3T and 10T through the VR module and into the instrumentation package 7T for the purpose of charging the battery pack 21T. A block diagram showing the electrical battery charging circuit involving the induction coils 3T and 10T and the battery pack 21T are shown in FIG. 23. A source of electrical power from the charging unit, which is external to the instrumentation package 7T, is inductively coupled into these induction coils 3T and 10T by laying the external induction coil of the charging unit flat on the top of the host sports paraphernalia coaxially above coils 3T and 10T. The induction coils 3T and 10T feed this power to the battery pack 21T in order to charge it.

The main body of the instrumentation package 7T houses the battery pack which supplies electrical power to each of the elements within the instrumentation package that requires electrical power.

The instrumentation package battery pack 21T is inductively wirelessly charged before games on an as needed basis, by an external primary winding placed on the top of the VR module. Charging of the battery pack 21T is accomplished wirelessly by inductive coupling. The instrumentation package inductive pickup coils 3T and 10T act as the secondary windings on an air core transformer with an external primary winding as their power source. Inductively coupled time varying magnetic flux is furnished to 3T and 10T by the external primary winding placed on the top of the VR module.

The instrumentation package battery pack 21T is wirelessly charged before VR sessions on an as needed basis. The battery pack charging unit is placed on the top of the VR module when it is charging the battery pack 21T. Charging of the battery pack 21T is accomplished wirelessly by inductive coupling. The VR module's two inductive pickup coils 3T and 10T act as the secondary windings on an air core transformer. Time varying magnetic flux is furnished to 3T and 10T by the primary windings of the battery charging unit.

The battery's 19T charging coils 27T and 28T are wound on the outside of the instrumentation package 7T and act electrically as a transformer's secondary winding. The coils are wound on the outside of the instrumentation package 7T to keep any heat they may produce away from the contents of the instrumentation package 7T while the battery 19T is being charged. The number of turns in each charging coil is made large enough to inductively couple a sufficient number of magnetic lines of flux from the external primary coil so as to charge the battery in a reasonably short time before games. When the external primary coil is placed on top of the instrumentation package the charging coils 3T and 10T receive electrical energy inductively coupled from the primary coils.

The instrumentation package network transceiver electronics 8T wirelessly transmits real-time pictures and sounds from the instrumentation package camera and microphones via quad antenna array elements 14T, 15T, 16T and 17T also known as intentional radiators, to the VR display apparatus. The quad antenna array elements 14T, 15T, 16T and 17T are mounted in a horizontal plane 90 degrees apart from one another and extend outward through the cylindrical wall of the main body of the instrumentation package 7T.

As is shown in the alternative preferred embodiment in FIG. 19C, a fiber optics/copper cable connector 18T is employed to connect to a fiber optics/copper cable link buried in the ground beneath the VR module, to televise the pictures and sounds of the VR venue. The fiber optics/copper cable is brought up from the ground beneath the VR module and connected to the VR module via the fiber optics/copper cable connector 18T. Should fiber optics/copper cable buried in the ground not exist in a VR venue, the VR venue may be televised wirelessly using radio signals and antennas 14T, 15T, 16T and 17T using the preferred embodiment shown in FIG. 19B. It is clear that the preferred embodiment shown in FIG. 19C is superior in this regard because it is capable of televising by both methods i.e. either wirelessly or by a fiber optics/copper cable link. The preferred embodiment shown in FIG. 19C is more expensive to manufacture than the preferred embodiment shown in FIG. 19B because its electronics 8T must provide for the additional fiber optics/copper related electronic functions.

In an alternate preferred embodiment, the quad antenna array 14T, 15T, 16T and 17T can be replaced with a helix antenna (not shown) with similar dimensions wound on the inside diameter of the instrumentation package 7T down the length of its cylindrical wall.

An antenna array relay junction shown in FIG. 5 is deployed in the VR venue and receives radio signals from the quad antenna array 14T, 15T, 16T and 17T. Antenna array elements 14T, 15T, 16T and 17T are in quadrature to radiate radio signals to the antenna array relay junction with sufficient gain so as to overcome RF noise, and provide a large enough gain bandwidth product to accommodate real-time SD/HD picture quality requirements. The instrumentation package network transceiver electronics 8T also provides a wireless means for the instrumentation package in the VR module to receive command and control radio signals from the authorized operator.

In a preferred embodiment, a corrugated bellows segment 9T acts to mechanically connect the camera lens 11T, camera 2T and electronics 8T to the main body of the instrumentation package. The corrugated bellows segment 9T is mechanically flexible. This flexibility allows the optical axis of the camera 2T and its lens 11T to be mechanically tilted relative to the z-axis 12T of the main body of the instrumentation package 7T and pre-set in place if so desired at the time the instrumentation package 7T is mounted inside the VR module.

The corrugated bellows section 9T of the instrumentation package is flexible and allows the section containing the camera 2T and its camera lens 11T to be bent in order to tilt the line of sight of the camera 2T and its lens 11T relative to the top of the instrumentation package if so desired by the authorized operator. Additionally, the corrugated section 9T allows the instrumentation package 7T to act as a spring and absorb shocks and compress or expand its length without damaging the contents of the instrumentation package. When circumstances arise where the VR module tends to be crushed, the instrumentation package 7T, it will compress or expand.

The instrumentation package 7T has a flexible corrugated bellows section 9T. The corrugated bellows section 9T of the instrumentation package 7T allows for the part of the instrumentation package 7T containing camera 2T and its lens 11T to flex and bend, stretch and compress when it is impacted. This enables the instrumentation package 7T to resist shock and vibration. Additionally, the corrugated bellows section 9T allows the instrumentation package 7T to act as a spring and compress or expand its length without damaging the contents of the instrumentation package 7T. When circumstances arise where the VR module tends to be crushed, the instrumentation package 7T will compress or expand instead of breaking.

The instrumentation package has antenna array elements 14T, 15T, 16T and 17T. Antenna array elements 14T, 15T, 16T and 17T are in quadrature to radiate radio signals to a receiving source and receive signals with sufficient gain so as to overcome RF noise and provide for a large enough gain bandwidth product to accommodate real-time SD/HD picture quality requirements. The instrumentation package network transceiver electronics which is part of 8T also provides a wireless means for the VR module to receive command and control radio signals from the authorized operator.

The two condenser microphones 5T and 6T enable the viewing audience to hear real-time contacts, impacts and shocks to the VR module. Simultaneously live SD/HD TV pictures are taken by the TV camera 2T of its field of view of the live action on the VR venue 7T. Condenser microphones have good fidelity for their small size, weight and power consumption. In the future higher quality small sized microphones are likely to become available as the state of the art improves. It is anticipated that we will use these microphones as they become available. In a preferred embodiment, the instrumentation package 7T is filled with a dry pressurized gas 22T like nitrogen to prevent the entry of moisture or dirt into its cavity. The o-ring seal 24T between the bottom lid 19T and the enclosure prevents the dry gas from leaking out of the enclosure. Dry nitrogen gas 22T is inserted into the instrumentation package 7T through gas valve 23T. A desiccant is also disposed inside the cavity to collect moisture and prevent any moisture build-up.

The instrumentation package 7T has a removable lid 19T on its bottom to allow access to the contents inside the cavity of the instrumentation package 7T. The lid 19T allows access to the battery pack 21T for servicing. The removable lid 19T also allows access to camera 2T, camera lens 11T, electronics 8T, quad antennas 14T, 15T, 16T and 17T, and mechanical actuating device 19T for servicing. The lower inductive coil 10T is attached to the bottom outside of the lid 19T. The fiber optics/copper cable connector 18T is attached through the bottom of lid 19T. The lid 19T has a gas valve 23T mounted on it to allow dry nitrogen gas 22T to be injected into the cavity to pressurize the enclosure of the instrumentation package after the lid 19T is closed. The purpose of the dry nitrogen gas is to protect the contents of the instrumentation package from moisture. There is an o-ring seal around lid 19T to prevent the pressurized dry nitrogen gas from escaping from the cavity of the instrumentation package 7T enclosure.

The instrumentation package element described in FIG. 12 is assembled into the instrumentation package 7T by loading the corrugated bellows enclosure segment 9T with the sealed roller bearing 12T into a mating machined seat in the hub 7T. Assembling the instrumentation package element into the instrumentation package 7T in this manner assures that the optical/mechanical axis of the instrumentation package element is coincident with the mechanical axis 12T. The angular position of the 1st primary mechanical stop is now adjusted to be aligned with the y-axis 1T angular direction on the hub 7T. In particular, the 1st primary mechanical stop is set at twelve o'clock in FIG. 19A and then locked in place on the hub 7T. The previous alignment procedure assures that camera 2T will now produce precisely centered upright images of any objects that lie along the y-axis 1T in the twelve o'clock direction relative to the hub 7T of the instrumentation package. The fiber optic/copper s cable connector 18T is offset at a distance of about ¾ of the hub radius from the center of hub 7T at twelve o'clock along the hub's y-axis and is accessible from the bottom of the instrumentation package. The fiber optics/copper cable connector 18T lies along side the instrumentation package which it is electrically connected to. Prior to the time when the instrumentation package 7T is encapsulated inside the mold of the VR module, the mechanical/optical axis 17T of the instrumentation package is carefully positioned in the mold, and then aligned normal to the top of the mold. The instrumentation package 7T is then precisely aligned in rotation in the mold about its mechanical/optical axis 17T so that its 1st primary stop is aligned with the y-axis's twelve o'clock direction of the VR module. The previous alignment procedure assures that the four primary stops of the electro-mechanical actuator inside the instrumentation package are aligned to the VR module, side 14T and side 5T of the VR module respectively, and that the camera 2T will now produce precisely centered upright images of any objects that lie along the y-axis 1T in the twelve o'clock direction relative to the VR module. When the VR module is placed horizontally on the VR venue, it is then carefully positioned so its y-axis is aligned with the centerline of the VR venue.

Now, whenever the authorized operator commands the camera 1T to rotate and go to the 1st mechanical stop, the electro-mechanical actuator 20T drives the enclosure against the 1st mechanical stop and locks it there. When using an extremely wide field camera lens, the VR audience will see a picture of VR venue standing upright.

FIG. 20A and FIG. 20B and FIG. 20C

The detailed physical elements disclosed in the instrumentation package drawing shown in FIG. 20A and FIG. 20B and FIG. 20C are identified as follows: 1U is the y-axis of camera 3U. 2U is a camera. 3U is a top induction coil for charging the battery. 4U is the x-axis of symmetry of the instrumentation package. 5U is a microphone. 6U is a microphone. 7U is the instrumentation package. 8U is the electronics. 9U is the instrumentation package element showing the corrugated bellows segment. 10U is a bottom induction coil for charging the battery pack 34U. 11U is a camera lens. 12U is the optical axis of camera 2U. 13U is a camera lens. 14U is a radio antenna. 15U is a radio antenna. 16U is a radio antenna. 17U is a radio antenna. 18U is the instrumentation package element showing the corrugated bellows segment. 19U is a bottom induction coil for charging the battery pack. 20U is the bottom lid heat sink of the instrumentation package. 21U is a camera lens. 22U is a camera lens seal. 23U is a camera. 24U is the y-axis of symmetry of the instrumentation package. 25U is the y-axis of camera 23U. 26U is a top induction coil for charging the battery. 27U is the electronics. 28U is the z-axis of symmetry for the instrumentation package. 29U is the optical axis of camera 23U. 30U is the bottom of the instrumentation package. 31U is the fiber optics/copper cable connector. 32U is a camera and camera lens actuating device. 33U is a camera and camera lens actuating device. 34U is the battery pack. 35U is dry nitrogen gas. 36U is a gas valve. 37U is the physical and chemical sensor. 38U is a microphone. 39U is a microphone.

FIG. 20A is a top view of the two-camera and fiber optics/copper instrumentation package.

FIG. 20B is a side view of the two-camera wireless instrumentation package.

FIG. 20C is a side view of the two-camera wireless and fiber optics/copper cable instrumentation package.

Referring to drawings FIG. 20A and FIG. 20B and FIG. 20C, two different instrumentation package preferred embodiments are disclosed. The only difference between the two embodiments is that one has wireless capability only, whereas the other has both wireless and fiber optics/copper cable capabilities. The one that has wireless capability only is cheaper to produce than the one that has both wireless and fiber optics/copper cable capabilities thereby giving it a cost advantage for venues with lower budgets, like for example some colleges and high schools. The one with both wireless and fiber optics/copper cable capabilities have better bandwidth and lower noise.

The present invention contemplates each instrumentation package embodiment to be equipped with two TV cameras, two TV camera lenses, two microphones, two supporting electronics, one battery pack, four induction coils, two mechanical actuating devices and four antennas.

Each of the instrumentation package assembly preferred embodiments each contains two instrumentation package elements disclosed in FIG. 12. The single TV camera, single TV camera lens, supporting electronics, induction coil, mechanical actuating device and corrugated bellows segment are the parts of the instrumentation package element disclosed in FIG. 12 which is a primary part of the instrumentation package.

The present invention contemplates the instrumentation package to be equipped with two TV cameras, two TV camera lenses, two microphones, and four induction coils, two mechanical actuating devices, supporting electronics, a physical and chemical sensor, a battery pack and four antennas. The instrumentation package has two instrumentation package elements. The instrumentation package element is disclosed in FIG. 12. The TV camera, TV camera lens, supporting electronics, one induction coil and mechanical actuating device are the primary parts of each of the instrumentation package elements.

The preferred embodiment shown in FIG. 20B televises its pictures and sounds using wireless transmission. The alternate preferred embodiment shown in FIG. 20C televises its pictures and sounds using fiber optics/copper cable transmission. It also has the capability of televising picture and sounds by wireless transmission.

It is understood that as the state of the art in TV camera technology advances, that there will be other better TV cameras that use other than CCD and CMOS technology. The present invention will work equally well with them as they become available. Therefore, the present invention uses CCD and CMOS TV cameras as an example of TV cameras that may be used simply because they are the best that today's technology offers, and is not confined only to their sole use in the future.

Referring to the instrumentation package 7U shown in FIG. 20A and FIG. 20B and FIG. 20C, FIG. 20A is a top view of the instrumentation package, FIG. 20B is an A-A section view of the instrumentation package 7U, FIG. 20C is an A-A section view of the alternative instrumentation package 7U, preferred embodiment showing the fiber optics/copper cable connector 31U.

The instrumentation package 7U shown in FIG. 20B contains all the electronics for wirelessly televising pictures and sounds. The instrumentation package 7U shown in FIG. 20C contains all the electronics for televising pictures and sounds using fiber optics/copper cable.

The physical and chemical sensor 37U is a solid state sensor. The physical and chemical sensor 37U is used for detecting the physical VR media content and a chemical VR media content at the VR venue where the VR module is deployed i.e. like weather, the presence of gases, voltages, charge, smells, breath test, alcohol, barometric readings, shocks, vibrations etc. etc. The physical and chemical sensor 37U communicates the physical and chemical states' data of the VR venue to the CPU microprocessors. The CPU microprocessor process the data and communicates the processed data to the VR viewing audience via the bi-directional communications link.

The instrumentation package 7U shown in FIG. 20A and FIG. 20B and FIG. 20C contains two instrumentation package elements 9U and 18U. The instrumentation package elements are disclosed in FIG. 12.

The picture and sounds are taken directly by the instrumentation package two cameras 2U and 23U and microphones 5U and 6U.

The instrumentation package 7U is a compressed assemblage of all the optical, mechanical and electronic components that gather and transmit TV pictures and sounds, from a single enclosure. The main body of the instrumentation package 7U is essentially a short cylinder. It is made strong to resist being crushed. Material examples such as polycarbonates, ABS and fiber reinforced plastics are used in its construction. The x-axis of symmetry of the instrumentation package 7U is 4U. The y-axis of symmetry of the instrumentation package 7U is 24U. The center of the instrumentation package 7U is located at the intersection of the x-axis and the y-axis. The z-axis 28U of the main body of the instrumentation package 7U is mutually orthogonal to 4U and 24U.

The instrumentation package 7U contains cameras 2U and 23U, camera lenses 11U and 21U, supporting electronics 8U and 27U, induction coils 3U, 10U, 26U and 19U, battery pack 34U, radio antennas 14U, 15U, 16U, and 17U, mechanical actuating devices 32U and 33U, corrugated bellows sections 9U and 18U, microphones 5U and 6U, bottom lid 20U, and fiber optics/copper cable connector 31U.

In FIG. 20B, the part of the instrumentation package 7U that contains the camera 2U, camera lens 11U, supporting electronics 8U, induction coil 3U, mechanical actuating device 32U, and corrugated bellows section 9U is shown enlarged in FIG. 12.

In FIG. 20B, the part of the instrumentation package 7U that contains the cameras 23U, camera lens 21U, supporting electronics 27U, induction coil 3U, mechanical actuating device 33U, and corrugated bellows section 18U is shown enlarged in FIG. 12.

In FIG. 20B, camera 2U is identical to camera 23U. Camera lens 11U is identical to camera lens 21U. Induction coil 3U is identical to induction coil 26U. Mechanical actuating device 32U is identical to mechanical actuating device 33U. The corrugated bellows segment 9U is identical to corrugated bellows segment 18U.

In FIG. 20C, the part of the instrumentation package 7U that contains the camera 2U, camera lens 11U, supporting electronics 8U, induction coil 3U, mechanical actuating device 32U, and corrugated bellows section 9U is shown enlarged in FIG. 12. FIG. 12 is the instrumentation package element.

In FIG. 20C, the part of the instrumentation package 7U that contains the cameras 23U, camera lens 21U, supporting electronics 27U, induction coil 3U, mechanical actuating device 33U, and corrugated bellows section 18U.

In FIG. 20C, Camera 2U is identical to camera 23U. Camera lens 11U is identical to camera lens 21U. Supporting electronics 8U are identical to supporting electronics 27U. Induction coil 3U is identical to induction coil 26U. Mechanical actuating device 32U is identical to mechanical actuating device 33U. The corrugated bellows segment 9U is identical to corrugated bellows segment 18U.

The supporting electronics 8U and 27U shown in FIG. 20B are different from the supporting electronics 8U and 27U shown in FIG. 20C. The supporting electronics 8U and 27U shown in FIG. 20C have an additional capability beyond that specified for the supporting electronics 8U and 27U shown in FIG. 20B. The supporting electronics 8U and 27U in FIG. 20B can only televise wirelessly; whereas the supporting electronics 8U and 27U shown in FIG. 20C can televise pictures and sounds via a fiber optics/copper cable link, as well as televise wirelessly.

The picture and sounds are taken directly by the cameras 2U and 23U and microphones 5U and 6U inside the instrumentation package 7U. The instrumentation package 7U is mounted within the VR module. The instrumentation package may wirelessly or by fiber optics/copper cable communicate and televise the pictures and sounds from inside the instrumented baseball home plate to a remote base station located near the baseball field for final processing and dissemination.

In FIG. 20B, the instrumentation package 7U contains all the electronics 8U and 27U for wirelessly televising pictures and sounds. The electronics 8U is identical to the electronics 27U in FIG. 20B.

In FIG. 20C, the instrumentation package 7U contains all the electronics 8U and 27U for televising pictures and sounds using fiber optics/copper cable in addition to televising pictures and sounds wirelessly like FIG. 20B. The electronics 8U is identical to the electronics 27U in FIG. 20C.

Comparing the electronics in FIG. 20B with those in FIG. 20C, the electronics in FIG. 20C includes additional functions for televising using a fiber optics/copper cable links.

In FIG. 20C, the instrumentation package 7U contains all the electronics 8U and 27U for televising pictures and sounds using a fiber optics/copper cable link, in addition to televising pictures and sounds wirelessly like in FIG. 20B.

In a preferred embodiment we disclose a VR venue with a fiber optics cable/copper cable link buried beneath the ground and/or its floor.

The cameras 2U and 23U, camera lenses 11U and 21U, and electronics 8U and 27U are joined to the main body of the instrumentation package by the corrugated bellows segments 9U and 18U.

Cameras 2U and 23U are identical to one another. Camera lenses 11U and 21U are identical to one another. Mechanical actuating devices 32U and 33U are identical to one another.

The diameter of the instrumentation package 7U is kept to a minimum in order to minimize its footprint inside the VR module. The dimension of the outside diameter of the instrumentation package 7U is governed largely by the physical diagonal dimension of the largest components within the instrumentation package 7U, like the SD/HD camera's 2U and 23U CCD and CMOS sensor arrays and the battery pack 34U.

The instrumentation package 7U is mounted inside the VR module using a buffer plate that acts as a bearing for the instrumentation package 7U. The buffer plate supports the upper end of the instrumentation package 7U.

The instrumentation package 7U contains two miniature SD/HD TV cameras 2U and 23U, two condenser microphones 5U and 6U and supporting electronics 8U and 27U. The cameras 2U and 23U, microphones 5U and 6U, and supporting electronics 8U and 27U, are housed together within the enclosure cavity of the instrumentation package 7U. The condenser microphones 5U and 6U are attached to the top interior wall of the main body of the instrumentation package 7U. The microphones 5U and 6U hear any sounds produced by physical contact of the instrumented baseball home plate with any external thing, including for example air currents felt on the VR module.

The instrumentation package assembly 7U is filled with a dry pressurized gas like nitrogen to prevent the entry of moisture or dirt. The seals between the lid heat sink 20U and main body of the instrumentation package assembly 7U prevent the dry gas from leaking out of the instrumentation package enclosure. A desiccant is disposed near the SD/HD lenses and cameras to collect and prevent any moisture build-up within the instrumentation package 7U. The lid heat sink 20U cools the contents of the instrumentation package. In another preferred embodiment, the dry pressurized gas, and desiccant are dispensed with in order to save on space and cost.

The diameter of the instrumentation package 7U is kept to a minimum in order to minimize the space taken up inside the VR module. The dimension of the outside diameter of the instrumentation package assembly is governed largely by the physical diagonal dimensions of its largest components like the quad antennas 14U, 15U, 16U and 17U and the battery pack 19U. In an alternate preferred embodiment, in order to conserve space, the antenna elements are folded inward toward the center of the VR module.

The lines of sight 12U and 29U of the cameras 2U and 23U are parallel to one another and the mechanical axis 29U of the instrumentation package.

The camera lenses 11U and 21U are positioned at the very top of the instrumentation package 7U, with the cameras 2U and 23U directly beneath them. The cameras essentially look out of the top of the instrumentation package 7U through camera lenses 11U and 21U.

The camera lenses 11U and 21U provide imagery to cameras 2U and 23U. The camera lenses 11U and 21U image the objects they see onto cameras 2U and 23U. The optical and mechanical axis of cameras 2U and 23U and camera lenses 11U and 21U are parallel to one another.

The camera lenses 11U and 21U have o-ring seals 13U and 22U. The purpose of the seals 13U and 22U is to hold and prevent leakage of the pressurized dry nitrogen gas from the cavity of the instrumentation package. The seals 13U and 22U prevent dirt and moisture from entering the cavity and damaging and interfering with the performance of its contents. The seal 13U and 22U are made from rubber. The seals 13U and 22U are located between the front of the camera lenses 11U and 21U and the camera lens' cylindrical mounting. In an alternate preferred embodiment, the seals are dispensed with in order to save cost. This is especially true for VR venues that do not have hostile environments.

In variants of the present preferred embodiment, a variety of different camera lens types, with different lens setting capability, can be used providing they are small in size so as to physically fit in the allotted space within the instrumentation package. The auto iris setting permits the camera lenses to automatically adjust for varying lighting conditions within the VR venue. The auto focus setting permits the camera lenses to adjust focus for varying distances of the players and action subjects on the field.

The functions of the camera lenses 11U and 21U such as focus adjustment settings and iris adjustment settings are controlled wirelessly by the authorized operator by sending command and control signals to the instrumentation package inside the VR module. The authorized operator can also send command and control signals to the instrumentation package to put these settings on automatic under the control of the camera electronics. The optical and electronic zoom functions of the camera lenses 11U and 21U are operated by the authorized operator by sending command and control signals to the instrumentation package. The authorized operator can select from a wide variety of HD camera lenses. Wide angle lenses and ultra wide angle lenses are used in many VR venues to give the VR viewing audience the feeling of being there inside the VR venue. In some VR venues the authorized operator may choose to use camera lenses with more magnification and narrower fields of view to better cover the VR venue. In some VR venues the authorized operator may choose camera lenses with small f-numbers to deal with poorer lighting conditions. For HD 3-D effects where cameras 2U and 23U form a 3-D stereo camera pair, the camera lenses 11U and 21U are chosen by the authorized operator to be identical and identical lens settings are used for each.

The cameras can be independently and simultaneously commanded and controlled to auto focus. The microphones 5U and 6U will capture all the sounds of the action. Pictures and sounds are wirelessly being transmitted by the instrumentation package 7U inside the VR module under the control of the authorized operator.

The instrumentation package electronics showing the detailed flow of electrical signals and data in the instrumentation package is shown in the preferred embodiment given in FIG. 13.

The instrumentation package network transceiver is part of the electronics 8U and 27U.

In FIG. 20B, the network transceiver wirelessly transmits real-time pictures and sounds from the cameras 2U and 23U and microphones 5U and 6U via quad antenna array elements 14U, 15U, 16U and 17U, also known as intentional radiators. The quad antenna array elements 14U, 15U, 16U and 17U are mounted radially or folded inward toward the center of the VR module in 90 degrees apart from one another and extend outward through the cylindrical wall of the main body of the instrumentation package.

In an alternate preferred embodiment to FIG. 20B, the quad antenna array elements 14U, 15U, 16U and 17U can be replaced with a helix antenna (not shown) with similar dimensions wound on the inside diameter of the instrumentation package 7U.

The battery's charging coils 3U, 10U and 19U, 26U are wound on the outside at both the top and bottom of the instrumentation package 7U and act electrically as a transformer's secondary winding. The coils are wound on the outside of the instrumentation package 7U to keep any heat they may produce away from the contents of the instrumentation package 7U while the battery pack is being charged. The number of turns in each of the charging coils 3U, 10U and 19U, 26U is made large enough to inductively couple a sufficient number of magnetic lines of flux from the primary coil of the external battery charging unit so as to charge the battery pack in a reasonably short time before games. When the charging unit is placed adjacent to the VR module, the charging coils 3U, 10U and 19U, 26U receive electrical energy inductively coupled from the primary coils of the external charging unit.

Induction coil 3U is located on the top of the instrumentation package 7U. Induction coil 10U is located on the bottom of the instrumentation package 7U. The purpose of the induction coils 3U, 10U and 19U, 26U is to inductively couple electrical energy into the instrumentation package 7U to charge the battery pack 34U. The induction coils 3U, 10U and 19U, 26U are located on the exterior of the enclosure so as to minimize their heat transfer into the instrumentation package 7U enclosure cavity that would raise the temperature of the electronics within the enclosure cavity. The induction coils 3U, 10U and 19U, 26U are electrically connected through the enclosure walls to the electronics inside the enclosure.

When the instrumentation package 7U is mounted inside the host VR module, an external electrical induction coil, which is part of a battery pack charging unit, is used to magnetically inductively couple electrical power into induction coils through the VR module and into the instrumentation package 7U for the purpose of charging the battery pack 34U. A source of electrical power from the charging unit, which is external to the instrumentation package 7U, is inductively coupled into these induction coils 3U, 10U and 19U, 26U by laying the external induction coil of the charging unit flat on the top of the host sports paraphernalia coaxially above coils 3U, 10U and 19U, 26U. The induction coils 3U, 10U and 19U, 26U feed this power to the battery pack 34U in order to charge it.

The main body of the instrumentation package 7U houses the battery pack 34U which supplies electrical power to each of the elements within the instrumentation package that requires electrical power.

The instrumentation package battery pack 34U is inductively wirelessly charged on an as needed basis, by an external primary winding placed adjacent to the VR module. Charging of the battery pack 34U is accomplished wirelessly by inductive coupling. The instrumentation package inductive pickup coils 3U, 10U and 19U, 26U act as the secondary windings on an air core transformer with an external primary winding as their power source. Inductively coupled time varying magnetic flux is furnished to coils 3U, 10U and 19U, 26U.

The battery's 34U charging coils 3U, 10U and 19U, 26U are wound on the outside of the instrumentation package 7U and act electrically as a transformer's secondary winding. The coils 3U, 10U and 19U, 26U are wound on the outside of the instrumentation package 7U to keep any heat they may produce away from the contents of the instrumentation package 7U while the battery pack 34U is being charged. The number of turns in each charging coil is made large enough to inductively couple a sufficient number of magnetic lines of flux from the external primary coil so as to charge the battery pack 34U in a reasonably short time before games. When the external primary coil is placed on top of the instrumentation package the charging coils 3U, 10U and 19U, 26U receive electrical energy inductively coupled from the primary coils.

The instrumentation package network transceiver electronics 8U and 27U wirelessly transmits real-time pictures and sounds from the instrumentation package cameras 2U and 23U and microphones 5U and 6U via quad antenna array elements 14U, 15U, 16U and 17U also known as intentional radiators.

The corrugated bellows segment 9U acts to mechanically connect the camera lens 11U, camera 2U and electronics 8U to the main body of the instrumentation package. The corrugated bellows segment 9U is mechanically flexible. This flexibility allows the optical axis of the camera 2U and its lens 11U to be mechanically tilted relative to the z-axis 28U of the main body of the instrumentation package 7U and pre-set in place if so desired at the time the instrumentation package assembly 7U is mounted inside the host VR module.

The corrugated bellows segment 18U acts to mechanically connect the camera lens 21U, camera 23U and electronics 27U to the main body of the instrumentation package. The corrugated bellows segment 18U is mechanically flexible. This flexibility allows the optical axis of the camera 23U and its lens 21U to be mechanically tilted relative to the z-axis 28U of the main body of the instrumentation package 7U and pre-set in place if so desired at the time the instrumentation package 7U is mounted inside the host VR module.

The corrugated bellows sections 9U and 18U of the instrumentation package are flexible and allow the sections containing the cameras 2U and 23U and their camera lenses 11U and 21U to be bent together in order to tilt the lines of sight of the cameras 2U and 23U and their lenses 11U and 21U relative to the top of the instrumentation package if so desired by the authorized operator. Additionally, the corrugated sections 9U and 18U allow the instrumentation package 7U to act as a spring and absorb shocks and compress or expand its length without damaging the contents of the instrumentation package.

The instrumentation package 7U has flexible corrugated bellows sections 9U and 18U. The corrugated bellows sections 9U and 18U of the instrumentation package 7U allow for the part of the instrumentation package 7U containing cameras 2U and 23U and their lenses 11U and 21U to flex and bend, stretch and compress when it is impacted. This enables the instrumentation package 7U to resist shock and vibration. Additionally, the corrugated bellows sections 9U and 18U allow the instrumentation package 7U to act as a spring and compress or expand its length without damaging the contents of the instrumentation package 7U.

The two condenser microphones 5U and 6U enable the VR viewing audience to hear real-time contacts, impacts and shocks to the VR module. Simultaneously live 3-D SD/HD TV pictures are taken by the TV cameras.

Condenser microphones have good fidelity for their small size, weight and power consumption. In the future higher quality small sized microphones are likely to become available as the state of the art improves. It is anticipated that we will use these microphones as they become available.

The instrumentation package 7U has a removable lid 19U on its bottom to allow access to the contents inside the cavity of the instrumentation package 7U. The lid 19U allows access to the battery pack 21U for servicing. The removable lid 19U also allows access to camera 2U, camera lens 11U, electronics 8U, quad antennas 14U, 15U, 16U and 17U, and mechanical actuating device 19U for servicing. The lower inductive coil 10U is attached to the bottom outside of the lid 19U. The fiber optics/copper cable connector 18U is attached through the bottom of lid 19U. The lid 19U has a gas valve 36U mounted on it to allow dry nitrogen gas 22U to be injected into the cavity to pressurize the enclosure of the instrumentation package after the lid 19U is closed. The purpose of the dry nitrogen gas is to protect the contents of the instrumentation package from moisture. There is an o-ring seal around lid 19U to prevent the pressurized dry nitrogen gas from escaping from the cavity of the instrumentation package 7U enclosure.

In many venues, the two cameras are chosen to be identical to each other. However, there are occasions when they may be chosen to be different from one another when in order to accomplish their joint mission of maximizing the entertainment of the VR viewing audience. The authorized operator can choreograph the VR session and set up the cameras and their respective lens combinations like a symphony orchestra to maximize the entertainment and viewing pleasure of the on-looking VR viewing audience.

Two of the instrumentation package elements, described in FIG. 12 are assembled into the instrumentation package assembly hub 7U by loading their two corrugated bellows enclosure segments 9U and 18U into two mating machined seats in the hub 7U using their roller bearing ends of the enclosures. Assembling the instrumentation package elements into the instrumentation package hub 7U in this manner assures that the optical/mechanical axes of the instrumentation package elements is coincident with the mechanical axes 12U and 29U of the hub 7U respectively.

The angular position of the 1st primary mechanical stop for each of the instrumentation package elements is now adjusted to be aligned with the y-axis 24U direction on the hub 7U. In particular, the 1st primary mechanical stop for each of the instrumentation package elements is precisely set at twelve o'clock and then locked in place on the hub 7U. This alignment procedure assures that cameras 2U and 23U will now produce precisely centered upright images of any objects that lie along the y-axis 24U of the hub 7U in the twelve o'clock direction relative to the hub 7U of the instrumentation package. This alignment procedure also assures that the 3-D stereo picture frames of both cameras 34U and 35U are mutually congruent at each of the eight mechanical stop positions.

The authorized operator software selects either the wireless mode of communication, and/or the fiber optics/copper cable mode of communication between each of the VR modules. The authorized operator can use whichever equipment (fiber optics cable/copper cable) is installed in the VR venue with which to command and control his choice and communicate it to the instrumented sports paraphernalia on the stadium playing field.

The authorized operator selects items from a software menu of control commands that go to the network transceiver at the VR module for the purpose of adjusting various system initializations, operating parameters, radio frequency, polling system status data such as battery condition, and initiating remote mechanical adjustments such as camera focus, optical zoom, iris and movement to the cameras' field of view, etc over the selected bi-directional communications link i.e. wireless radio, fiber optics or copper cable connectivity being used within the particular VR venue.

These commands, when intercepted by the network transceiver within the VR module are applied to its microprocessor, which then in turn upon executing the instructions stored within the contents of its firmware applies a pulse coded control signal via the power and control interconnect interface inside the instrumentation package to the corresponding electronics i.e. the mechanical actuators that provides optical focus and/or zoom adjustment of the cameras and microphone gain and selection, etc as desired by the authorized operator and/or special software running on the CPU at the VR module. The power and control interconnect interface as shown in FIG. 19E (item 21U), which is represented by dotted lines, consists of the electrical control wiring to and from the electronic components of the instrumented baseball base that are being controlled.

FIG. 21A and FIG. 21B and FIG. 21C

The detailed physical elements disclosed in the instrumentation package drawing shown in FIG. 21A and FIG. 21B and FIG. 21C are identified as follows: 1V is the y-axis of camera 43V. 2V is the y-axis of symmetry of the instrumentation package. 3V is the y-axis of camera 44V. 4V is the fiber optics/copper cable connector. 5V is an upper induction coil. 6V is an upper induction coil. 7V is a camera lens. 8V is a camera lens seal. 9V is a camera lens seal. 10V is a camera lens. 11V is the instrumentation package. 12V is the bottom lid heat sink of the instrumentation package. 13V is the electronics. 14V is the electronics. 15V is the x-axis of symmetry of the instrumentation package, 16V is the bottom of the instrumentation package. 17V is the actuating device for camera 44V and camera lens 7V. 18V is the actuating device for camera 43V and camera lens 10V. 19V is the actuating device for camera 41V and camera lens 45V. 20V is the actuating device for camera 42V and camera lens 46V.

21V is the electronics. 22V is the electronics. 23V is a microphone. 24V is a microphone. 25V is a radio antenna. 26V is a radio antenna. 27V is a radio antenna. 28V is a radio antenna. 29V is the optical axis of camera 43V. 30V is the z-axis of symmetry of the instrumentation package. 31V is the optical axis of camera 44V. 32V is an instrumentation package element showing a corrugated bellows segment. 33V is an upper induction coil. 34V is an upper induction coil. 35V is the camera lens 45V seal. 36V is the camera lens 46V seal. 37V is the optical axis of camera 41V. 38V is the optical axis of camera 42V. 39V is an instrumentation package element showing a corrugated bellows segment. 40V is an instrumentation package element showing a corrugated bellows segment. 41V is a camera. 42V is a camera. 43V is a camera. 44V is a camera. 45V is a camera lens for camera 41V. 46V is a camera lens for camera 42V. 47V is dry nitrogen gas. 48V is a gas valve. 49V is an instrumentation package element showing a corrugated bellows segment. 50V is the battery pack. 51V is the microphone connector. 52V is a microphone. 53V is a microphone.

FIG. 21A is a top view of the electronics layout of a four-camera wireless instrumentation package.

FIG. 21B is a side view of the electronics layout of a four-camera wireless instrumentation package.

FIG. 21C is a side view of the electronics layout of a four-camera instrumentation package configured with wireless and fiber optics/copper cable network communications links.

Referring to drawings FIG. 21A and FIG. 21B and FIG. 21C, two different instrumentation package preferred embodiments are disclosed. The only difference between the two embodiments is that one has wireless communications capability only, whereas the other has both wireless and fiber optics cable/copper cable communications capabilities. The one that has wireless capability only, is cheaper to produce than the one that has both wireless and fiber optics or copper cable capabilities thereby giving it a cost advantage for venues with lower budgets, like for example some colleges and high schools. The instrumentation package shown in FIG. 21B, which has only wireless capability, is used to instrument VR modules. The one with both wireless and fiber optics/copper cable capabilities has better bandwidth and lower noise and is used to instrument VR modules.

The present invention contemplates each of the instrumentation package embodiments to be equipped with four TV cameras, four TV camera lenses, two microphones, four supporting electronics, one battery pack, eight induction coils, four mechanical actuating devices and four antennas.

Each of the present instrumentation package preferred embodiments contains four instrumentation package elements disclosed in FIG. 12. The single TV camera, single TV camera lens, supporting electronics, induction coil, mechanical actuating device and corrugated bellows segment are the parts of the instrumentation package element disclosed in FIG. 12 which is a primary part of the instrumentation package.

The preferred embodiment shown in FIG. 21B televises its pictures and sounds using wireless RF transmission. The alternate preferred embodiment shown in FIG. 21C televises its 3-D pictures and sounds using both fiber optics cable/copper cable transmission and wireless RF transmission.

In a preferred embodiment, the instrumentation package is an autonomous module designed as a sealed unit for being mounted inside a VR module, and making the VR module capable of wirelessly televising a VR venue from its cameras and microphones contained within the instrumentation package, to VR display apparatus.

The alternate preferred embodiment shown in FIG. 21C televises a VR venue to the VR display apparatus from its camera and microphones via a fiber optics/copper cable communication link. The fiber optics/copper cable connector built into the bottom of the instrumentation package which is mounted inside the VR module, is connected to fiber optics cable/copper cable buried in the ground of the VR venue. The fiber optics cable/copper cable buried in the ground is connected to the VR display apparatus via the Internet or other communication link.

In another preferred embodiment, the VR module operates under the complete control of an authorized operator.

It is understood that as the state of the art in TV camera technology advances, that there will be other better TV cameras that use other than CCD and CMOS technology. The present invention will work equally well with them as they become available. Therefore, the present invention uses CCD and CMOS TV cameras as an example of TV cameras that may be used simply because they are the best that today's technology offers, and is not confined only to their sole use in the future.

Referring to the instrumentation package shown in MG 21A and FIG. 21B and FIG. 21C, FIG. 21A is a top view of the instrumentation package, FIG. 21B is an A-A section view of the instrumentation package, FIG. 21C is an A-A section view of the alternative instrumentation package preferred embodiment showing the fiber optics/copper cable connector 4V.

The instrumentation package 11V shown in FIG. 21B contains all the electronics for wirelessly televising pictures and sounds. The instrumentation package 11V shown in FIG. 21C contains all the electronics for televising pictures and sounds using fiber optics cable/copper cable.

The picture and sounds are taken directly by the instrumentation package two cameras 41V, 42V, 43V and 44V and microphones 23V and 24V. The instrumentation package 11V is mounted within the VR module. Both preferred embodiments shown in FIG. 21B and FIG. 21C communicate the pictures and sounds from the instrumentation package 11V mounted inside the VR module at the VR venue to the VR display apparatus.

The instrumentation package 11V is a compressed assemblage of all the optical and electronic components that gather and transmit TV pictures and sounds, into a single enclosure. The main body of the instrumentation package 11V is essentially a short cylinder about ½ inch or less that resembles a can of tuna fish. The diameter of the cylinder is typically about one inch or less. In a preferred embodiment, the diameter of the cylinder is made less than one inch in order to fit more cameras into the VR module. These dimensions are expected to shrink as new technology permits smaller packaging. In another preferred embodiment, the diameter of the cylinder is made sometimes more than about one inch in order to reduce the cost of manufacture of the VR modules. The VR modules and the cylinder are made strong to resist being crushed. Material examples such as polycarbonates, ABS and fiber reinforced plastics are used in their construction. The x-axis of symmetry of the instrumentation package 11V is 15V. The y-axis of symmetry of the instrumentation package 11V is 2V. The center of the instrumentation package 11V is located at the intersection of the x-axis and the y-axis. The z-axis 30V of the main body of the instrumentation package 11V is mutually orthogonal to 4V and 24V.

In a preferred embodiment, the instrumentation package 11V contains cameras 41V, 42V, 43V and 44V, camera lenses 11V and 21V, supporting electronics 21V, 22V, 14V, and 13V, induction coils 5V, 6V, 33V, and 34V, radio antennas 25V, 26V, 27V, and 28V, mechanical actuating devices 19V, 20V, 18V, and 17V, corrugated bellows sections 40V, 39V, 32V, and 49V, microphones 23V and 24V, bottom lid 12V, fiber optics cable/copper cable connector 4V, gas valve 48V, dry gas 47V, and the battery pack 50V.

In FIG. 21B, the part of the instrumentation package 11V that contains the camera 43V, camera lens 10V, supporting electronics 14V, induction coil 5V, mechanical actuating device 18V, and corrugated bellows section 32V is shown enlarged in FIG. 12.

In FIG. 21B, the part of the instrumentation package 11V that contains the cameras 44V, camera lens 7V, supporting electronics 13V, induction coil 6V, mechanical actuating device 17V, and corrugated bellows section 49V is shown enlarged in FIG. 12.

In FIG. 21B, camera 41V is identical to camera 42V. Camera lens 45V is identical to camera lens 46V. Supporting electronics 14V is identical to supporting electronics 13V. Induction coil 33V is identical to induction coil 34V. Mechanical actuating device 18V is identical to mechanical actuating device 17V. The corrugated bellows segment 32V is identical to corrugated bellows segment 49V.

In FIG. 21C, the part of the instrumentation package 11V that contains the camera 41V, camera lens 45V, supporting electronics 21V, induction coil 33V, mechanical actuating device 19V, and corrugated bellows section 40V is shown enlarged in FIG. 12.

In FIG. 21C, the part of the instrumentation package 11V that contains the camera 42V, camera lens 46V, supporting electronics 22V, induction coil 34V, mechanical actuating device 20V, and corrugated bellows section 39V is shown enlarged in FIG. 12.

In FIG. 21C, camera 41V is identical to camera 42V. Camera lens 45V is identical to camera lens 46V. All the induction coils 5V, 6V, 33V and 34V are identical. Mechanical actuating device 19V is identical to mechanical actuating device 20V. The corrugated bellows segment 40V is identical to corrugated bellows segment 39V.

In FIG. 21C, the part of the instrumentation package 11V that contains the camera 43V, camera lens 10V, supporting electronics 14V, induction coil, mechanical actuating device 18V, and corrugated bellows section 32V is shown enlarged in FIG. 12.

In FIG. 21C, the part of the instrumentation package 11V that contains the camera 44V, camera lens 7V, supporting electronics 13V, induction coil, mechanical actuating device 17V, and corrugated bellows section 49V is shown enlarged in FIG. 12.

In FIG. 21C, Camera 43V is identical to camera 44V. Camera lens 10V is identical to camera lens 7V. Supporting electronics 14V are identical to supporting electronics 13V. Induction coil is identical to induction coil. Mechanical actuating device 18V is identical to mechanical actuating device 17V. The corrugated bellows segment 32V is identical to corrugated bellows segment 49V.

The supporting electronics 14V and 13V shown in FIG. 21B are different from the supporting electronics 21V and 22V shown in FIG. 21C. The supporting electronics 21V and 22V shown in FIG. 21C have an additional capability beyond that specified for the supporting electronics 14V and 13V shown in FIG. 21B. The supporting electronics 21V and 27V in FIG. 21B can only televise wirelessly to the VR display apparatus; whereas the supporting electronics 14V and 13V shown in FIG. 21C can televise pictures and sounds via a fiber optics cable/copper cable link to the VR display apparatus.

The picture and sounds are taken directly by the cameras 41V, 42V, 43V and 44V and microphones 23V and 24V inside the instrumentation package 11V. The instrumentation package 11V is mounted within the VR module that is in the VR venue. The instrumentation package may wirelessly or by fiber optics/copper cable communicate and televise the pictures and sounds from inside the VR venue to a VR display apparatus.

Microphone electrical connector 51V is mounted on the instrumentation package. 51V mates with an electrical connector which is wired by a cable to a third condenser microphone. This microphone protrudes through a hole in the top of the VR module and is recessed beneath its surface in order to protect it.

In FIG. 21B, the instrumentation package 11V contains all the electronics 14V and 13V for wirelessly televising pictures and sounds. The electronics 14V is identical to the electronics 13V in FIG. 21B.

In FIG. 21C, the instrumentation package 11V contains all the electronics 21V and 22V for televising pictures and sounds using fiber optics cable/copper cable in addition to televising pictures and sounds wirelessly like FIG. 21B. The electronics 21V is identical to the electronics 22V in FIG. 21C.

Comparing the electronics in FIG. 21B with those in FIG. 21C, the electronics in FIG. 21C includes additional functions for televising using a fiber optics/cable/copper cable link to the VR display apparatus In FIG. 21C, the instrumentation package 11V contains all the electronics 21V and 22V for televising pictures and sounds using a fiber optics cable/copper cable link, in addition to televising pictures and sounds wirelessly by radio like in FIG. 21B.

In a preferred embodiment where we have disclosed a VR venue with a fiber optics cable/copper cable link buried beneath the ground, and in particular beneath the VR module, and where the fiber optics cable/copper cable link is networked and connected to VR display apparatus at its other end, and where the electronics in FIG. 21C includes the capability to televise from inside the VR venue to the VR display apparatus via the fiber optics cable/copper cable link by connecting to the fiber optics cable/copper cable link using the fiber optics cable/copper cable connector 4V. The instrumentation package 11V in the preferred embodiment shown in FIG. 21C uses a fiber optics cable/copper cable connector 31V with which to connect to a fiber optics cable/copper cable link buried beneath the VR venue ground.

The cameras 41V and 42V, camera lenses 45V and 46V, and electronics 21V and 22V are joined to the main body of the instrumentation package 11V by the corrugated bellows segments 40V and 39V.

The cameras 43V and 44V, camera lenses 10V and 7V, and electronics 14V and 13V are joined to the main body of the instrumentation package 11V by the corrugated bellows segments 32V and 49V.

Cameras 41V and 42V are identical to one another. Camera lenses 45V and 46V are identical to one another. Mechanical actuating devices 19V and 20V are identical to one another.

Cameras 43V and 44V are identical to one another. Camera lenses 10V and 7V are identical to one another. Mechanical actuating devices 18V and 17V are identical to one another.

In variants of the present preferred embodiment, a variety of different camera lens types, with different lens setting capability, can be used providing they are small in size and also physically fit within the instrumentation package. The auto iris setting permits the camera lenses to automatically adjust for varying lighting conditions on the field. The auto focus setting permits the camera lenses to adjust focus for varying distances and action subjects in the VR venue.

The functions of the camera lenses such as focus adjustment settings and iris adjustment settings are controlled wirelessly by the authorized operator by sending command and control signals from the authorized operator's laptop to the instrumentation package inside the VR module. The authorized operator can also send command and control signals to the instrumentation package to put these settings on automatic under the control of the camera electronics. The optical and electronic zoom functions of the camera lenses are operated by the authorized operator by sending command and control signals to the instrumentation package. The authorized operator can select from a wide variety of HD camera lenses. Wide angle lenses and ultra wide angle rectilinear lenses are used in many VR venues to give the VR viewing audience the feeling of being there inside the VR venue. In some VR venues the authorized operator may choose to use camera lenses with more magnification and narrower fields of view to better cover certain events. In some VR venues the authorized operator may choose camera lenses with small f-numbers to deal with poorer lighting conditions. For HD 3-D effects where cameras form a 3-D stereo camera pair, the camera lenses are chosen by the authorized operator to be identical and identical lens settings are used for each.

The diameter of the instrumentation package 11V is kept to a minimum in order to minimize its footprint inside the VR module. The dimension of the outside diameter of the instrumentation package 11V is governed largely by the physical diagonal dimension of the largest components within the instrumentation package 11V, like the SD/HD camera's 41V, 42V, 43V, and 44V CCD sensor arrays and the battery pack 50V.

In a preferred embodiment, the instrumentation package 11V is mounted inside the VR module using a buffer plate that acts as a bearing for the instrumentation package 11V. The buffer plate supports the upper end of the instrumentation package 11V. In another preferred embodiment, the instrumentation package 11V is mounted inside the VR module without using a buffer plate in order to save space and cost of manufacture. Use of the buffer plate insures more stable camera alignment and is more costly. Saving space permits the VR module's diameter to be made smaller.

The instrumentation package 11V contains four miniature SD/HD TV cameras 41V, 42V, 43V, and 44V, two condenser microphones 23V and 24V and supporting electronics 21V, 22V, 14V, and 13V. The cameras 41V, 42V, 43V, and 44V, microphones 23V and 24V, and supporting electronics 21V, 22V, 14V, and 13V, are housed together within the enclosure cavity of the VR module. The condenser microphones 23V and 24V are attached to the top interior wall of the main body of the instrumentation package 11V. The microphones 23V and 24V hear any sounds produced by physical contact of the VR module with any external thing, including for example air currents felt on the VR module during events.

In a preferred embodiment, the instrumentation package 11V is filled with a dry pressurized gas like nitrogen to prevent the entry of moisture or dirt. The rubber o-ring seals between the lid 12V and main body of the instrumentation package 11V prevent the dry gas from leaking out of the instrumentation package enclosure. A desiccant is disposed near the SD/HD lenses 45V, 46V, 10V, and 7V and cameras 41V, 42V, 43V, and 44V to collect and prevent any moisture build-up within the instrumentation package 11V.

In another preferred embodiment, the instrumentation package 11V is not filled with anything besides dry air. This is done to reduce cost of manufacture and for VR venues that are relatively clean. There are no rubber o-ring seals between the lid 12V and main body of the instrumentation package 11V. No desiccant is disposed near the SD/HD lenses 45V, 46V, 10V, and 7V and cameras 41V, 42V, 43V, and 44V to collect and prevent any moisture build-up within the instrumentation package 11V where the VR venues are relatively free of moisture.

The diameter of the instrumentation package 11V is kept to a minimum in order to minimize the space taken up inside the VR module. The dimension of the outside diameter of the instrumentation package is governed largely by the physical diagonal dimensions of its largest components like the quad antennas 14V, 15V, 16V and 17V and the battery pack 50V. The diameter of the cylinder is typically about an inch or less. In another preferred embodiment, the diameter of the cylinder is about an inch or larger to reduce the cost of miniaturization of the enclosed components.

The lines of sight of the cameras 41V and 42V are made parallel to one another.

The lines of sight of the cameras 43V and 44V are made parallel to one another.

The camera lenses 45V, 46V, 10V and 7V are positioned at the very top of the instrumentation package 11V, with the cameras 41V, 42V, 43V, and 44V directly beneath them. The cameras 41V, 42V, 43V, and 44V essentially look out of the top of the instrumentation package 11V through camera lenses 45V, 46V, 10V and 7V.

The camera lenses 45V, 46V, 10V and 7V provide imagery to cameras 41V, 42V, 43V, and 44V. The camera lenses 45V, 46V, 10V and 7V image the objects they see onto cameras 41V, 42V, 43V, and 44V. The optical and mechanical axis of cameras 41V and 42V and camera lenses 45V and 46V are parallel and coaxial to one another.

The camera lenses 45V, 46V, 10V and 7V have o-ring seals 35V, 36V, 9V and 8V respectively. The purpose of the seals 35V, 36V, 9V and 8V is to hold and prevent leakage of the pressurized dry nitrogen gas from the cavity of the instrumentation package. The seals 35V, 36V, 9V and 8V prevent dirt and moisture from entering the cavity and damaging and interfering with the performance of its contents. The seals 35V, 36V, 9V and 8V are made from rubber. The seals 35V, 36V, 9V and 8V are located between the front of the camera lenses 45V, 46V, 10V and 7V and the camera lens' cylindrical mountings.

In variants of the present preferred embodiment, a variety of different camera lens types, with different lens setting capability, can be used providing they are small in size (so as not to be prominent and conspicuous to the players) and also physically fit within the instrumentation package. The auto iris setting permits the camera lenses to automatically adjust for varying lighting conditions on the field. The auto focus setting permits the camera lenses to adjust focus for varying distances of the players and action subjects on the field.

The camera 2V can be independently and simultaneously commanded and controlled to auto focus on their respective objects in the VR venue. If the player slides into the VR module, the cameras 41V, 42V, 43V, and 44V will catch the slide action up close. The microphones 23V and 24V will capture all the sounds of the action. While the player is running, his pictures and sounds are wirelessly being transmitted by the instrumentation package 7V inside the VR module. The conduction microphones will capture sounds through the floor and through the ground.

The instrumentation package electronics showing the detailed flow of electrical signals and data in the instrumentation package is shown in the preferred embodiment given in FIG. 22D and FIG. 22E.

The instrumentation package network transceiver is part of the electronics 21V, 22V, 14V and 13V.

In FIG. 21B, the network transceiver wirelessly transmits real-time pictures and sounds from the cameras 41V, 42V, 43V, and 44V and microphones 23V and 24V via quad antenna array elements 14V, 15V, 16V and 17V, also known as intentional radiators, to the VR display apparatus.

The quad antenna array elements 25V, 26V, 27V and 28V are mounted radially in a horizontal plane 90 degrees apart from one another and extend outward through the cylindrical wall of the main body of the instrumentation package 11V.

In an alternate preferred embodiment to FIG. 21B, the quad antenna array elements 25V, 26V, 27V and 28V can be replaced with a helix antenna (not shown) with similar dimensions wound on the inside diameter of the instrumentation package 11V.

The battery's charging coils 5V, 6V, 33V, and 34V are wound on the outside at both the top and bottom of the instrumentation package 11V and act electrically as a transformer's secondary winding. The coils are wound on the outside of the instrumentation package 11V to keep any heat they may produce away from the contents of the instrumentation package 11V while the battery pack is being charged. The number of turns in each of the charging coils 5V, 6V, 33V, and 34V is made large enough to inductively couple a sufficient number of magnetic lines of flux from the primary coil of an external battery charging unit so as to charge the battery pack in a reasonably short time. When the primary coil of an induction charging unit is placed on top of the VR module, the charging coils 5V, 6V, 33V, and 34V receive electrical energy inductively coupled from the primary coils of the external charging unit.

Induction coil 5V is located on the bottom of the instrumentation package 11V.

Induction coil 6V is located on the bottom of the instrumentation package 11V.

The purpose of the induction coils 5V, 6V, 33V, and 34V is to inductively couple electrical energy into the instrumentation package 11V to charge the battery pack 50V. The induction coils 5V, 6V, 33V, and 34V are located on the exterior of the enclosure so as to minimize their heat transfer into the instrumentation package 11V enclosure cavity that would raise the temperature of the electronics within the enclosure cavity. The induction coils 5V, 6V, 33V, and 34V are electrically connected through the enclosure walls to the electronics inside the enclosure.

When the instrumentation package 11V is mounted inside the VR module, an external electrical induction coil, which is part of a battery pack charging unit, is used to magnetically inductively couple electrical power into induction coils through the VR module and into the instrumentation package 11V for the purpose of charging the battery pack 50V. A block diagram showing the electrical battery charging circuit involving the induction coils 5V, 6V, 33V, and 30V and the battery pack 50V are shown in FIG. 23. A source of electrical power from the charging unit, which is external to the instrumentation package 11V, is inductively coupled into these induction coils 5V, 6V, 33V, and 34V by laying the external induction coil of the charging unit flat on the top of the VR module coaxially above coils 5V, 6V, 33V, and 34V.

The induction coils 5V, 6V, 33V, and 34V feed this power to the battery pack 50V in order to charge it.

The main body of the instrumentation package 11V houses the battery pack 50V which supplies electrical power to each of the elements within the instrumentation package that requires electrical power.

The instrumentation package battery pack 50V is inductively wirelessly charged on an as needed basis, by an external primary winding placed on the top of the VR module. Charging of the battery pack 50V is accomplished wirelessly by inductive coupling. The instrumentation package inductive pickup coils 5V, 6V, 33V, and 34V act as the secondary windings on an air core transformer with an external primary winding as their power source. Inductively coupled time varying magnetic flux is furnished to coils 5V, 6V, 33V, and 34V by the external primary winding placed on the top of the VR module.

The instrumentation package battery pack 50V is wirelessly charged by magnetic induction before VR session on an as needed basis, using an external charging unit. The charging unit is placed on the top of the VR module when it is charging the battery pack 50V. Charging of the battery pack 50V is accomplished wirelessly by inductive coupling. The VR module's four inductive pickup coils 5V, 6V, 33V, and 34V act as the secondary windings on an air core transformer. Time varying magnetic flux is furnished to 5V, 6V, 33V, and 34V by the primary windings of the charging unit.

The battery's 50V charging coils 5V, 6V, 33V, and 34V are wound on the outside of the instrumentation package 11V and act electrically as a transformer's secondary winding. The coils 5V, 6V, 33V, and 34V are wound on the outside of the instrumentation package 11V to keep any heat they may produce away from the contents of the instrumentation package 11V while the battery pack 50V is being charged. The number of turns in each charging coil is made large enough to inductively couple a sufficient number of magnetic lines of flux from the external primary coil so as to charge the battery pack 50V in a reasonably short time before games. When the external primary coil is placed on top of the instrumentation package the charging coils 5V, 6V, 33V, and 34V receive electrical energy inductively coupled from the primary coils.

The instrumentation package network transceiver electronics 21V, 22V, 14V and 13V wirelessly transmits real-time pictures and sounds from the instrumentation package cameras 41V, 42V, 43V, and 44V and microphones 23V and 24V via quad antenna array elements 25V, 26V, 27V and 28V also known as intentional radiators, to the VR display apparatus. The quad antenna array elements 25V, 26V, 27V and 28V are mounted in a horizontal plane 90 degrees apart from one another and extend outward through the cylindrical wall of the main body of the instrumentation package 11V.

As is shown in the alternative preferred embodiment in FIG. 21C, a fiber optics cable/copper cable connector 4V is employed to connect to a fiber optics cable/copper cable link buried in the playing field grounds beneath the VR module, to televise the pictures and sounds to the VR display apparatus whose communications network is connected to the fiber optics cable/copper cable link at its other end. Should fiber optics cable/copper cable buried in the grounds not exist in a VR venue, the VR venue may be televised wirelessly using radio signals and antennas 25V, 26V, 27V and 28V using the preferred embodiment shown in FIG. 35B. It is clear that the preferred embodiment shown in FIG. 21C is superior in this regard because it is capable of televising by both methods i.e. either wirelessly or by a fiber optics cable/copper cable link. The preferred embodiment shown in FIG. 21C is more expensive to manufacture than the preferred embodiment shown in FIG. 21B because its electronics 21V and 22V must provide for the additional fiber optics/copper cable related electronic functions.

In an alternate preferred embodiment, the quad antenna array 25V, 26V, 27V and 28V can be replaced with a helix antenna (not shown) with similar dimensions wound on the inside diameter of the instrumentation package down the length of its cylindrical wall.

A antenna array relay junction shown in FIG. 7 is deployed in the VR venue and receives radio signals from the quad antenna array 25V, 26V, 27V and 28V. Antenna array elements 25V, 26V, 27V and 28V are in quadrature to radiate radio signals to the antenna array relay junction with sufficient gain so as to overcome RF noise, and provide a large enough gain bandwidth product to accommodate real-time SD/HD picture quality requirements. The instrumentation package network transceiver electronics 8V also provides a wireless means for the instrumentation package in the VR module to receive command and control radio signals from the authorized operator.

The corrugated bellows segment 40V acts to mechanically connect the camera lens 45V, camera 41V and electronics 21V to the main body of the instrumentation package. The corrugated bellows segment 40V is mechanically flexible. This flexibility allows the optical axis of the camera 41V and its lens 45V to be mechanically tilted relative to the z-axis 30V of the main body of the instrumentation package 11V and be pre-set in place if so desired by the authorized operator at the time the instrumentation package 11V is enclosed inside the VR module.

The corrugated bellows segment 39V acts to mechanically connect the camera lens 46V, camera 42V and electronics 22V to the main body of the instrumentation package. The corrugated bellows segment 39V is mechanically flexible. This flexibility allows the optical axis of the camera 42V and its lens 46V to be mechanically tilted relative to the z-axis 30V of the main body of the instrumentation package 11V and be pre-set in place if so desired by the authorized operator at the time the instrumentation package 11V is enclosed inside the VR module.

The corrugated bellows sections 40V and 39V of the instrumentation package are flexible and allow the sections containing the cameras 41V and 42V and their camera lenses 45V and 46V to be bent together in order to tilt the lines of sight of the camera 41V and 42V and their lenses 45V and 46V relative to the top of the instrumentation package if so desired by the authorized operator. Additionally, the corrugated sections 40V and 39V allow the instrumentation package 11V to act as a spring and absorb shocks and compress or expand its length without damaging the contents of the instrumentation package. When circumstances arise where the players tend to crush the instrumentation package 11V, it will compress or expand.

The corrugated bellows segment 32V acts to mechanically connect the camera lens 10V, camera 43V and electronics 14V to the main body of the instrumentation package. The corrugated bellows segment 32V is mechanically flexible. This flexibility allows the optical axis of the camera 43V and its lens 10V to be mechanically tilted relative to the z-axis 30V of the main body of the instrumentation package 11V and be pre-set in place if so desired by the authorized operator at the time the instrumentation package 11V is enclosed inside the VR module.

The corrugated bellows segment 49V acts to mechanically connect the camera lens 7V, camera 44V and electronics 13V to the main body of the instrumentation package. The corrugated bellows segment 49V is mechanically flexible.

This flexibility allows the optical axis of the camera 44V and its lens 7V to be mechanically tilted relative to the z-axis 30V of the main body of the instrumentation package 11V and be pre-set in place if so desired by the authorized operator at the time the instrumentation package 11V is enclosed inside the VR module.

The corrugated bellows sections 32V and 49V of the instrumentation package are flexible and allow the sections containing the cameras 43V and 44V and their camera lenses 10V and 7V to be bent together in order to tilt the lines of sight of the camera 43V and 44V and their lenses 10V and 7V relative to the top of the instrumentation package if so desired by the authorized operator. Additionally, the corrugated bellows sections 32V and 49V allow the instrumentation package 11V to act as a spring and absorb shocks and compress or expand its length without damaging the contents of the instrumentation package. When circumstances arise where the players tend to crush the instrumentation package 11V, it will compress or expand.

The instrumentation package 11V has flexible corrugated bellows sections 40V and 39V. The corrugated bellows section 40V and 39V of the instrumentation package 11V allow for the part of the instrumentation package 11V containing cameras 41V and 42V and its lens 45V and 46V to flex and bend, stretch and compress when it is impacted. This enables the instrumentation package 11V to resist shock and vibration. Additionally, the corrugated bellows sections 40V and 39V allow the instrumentation package 11V to act as a spring and compress or expand its length without damaging the contents of the instrumentation package 11V. When circumstances arise which tend to crush the VR module, the instrumentation package 11V will compress or expand instead of breaking.

An antenna array relay junction shown in FIG. 30A and FIG. 30B is deployed in the VR venue and receives radio signals from the VR module's antenna array elements 25V, 26V, 27V and 28V. Antenna array elements 25V, 26V, 27V and 28V are in quadrature to radiate radio signals with sufficient gain so as to overcome RF noise and provide for a large enough gain bandwidth product to accommodate real-time SD/HD picture quality requirements. The instrumentation package network transceiver electronics which is part of electronics 21V, 22V, 14V and 13V also provides a wireless radio transmission means for the VR module to receive command and control radio signals from the authorized operator The two condenser microphones 23V and 24V enable the VR viewing audience to hear real-time contacts, impacts and shocks to the VR module. Simultaneously live SD/HD TV pictures are taken by the TV cameras 41V, 32V, 43V and 44V of their field of view of the live action in the VR venue.

Microphone electrical connector 51V is mounted on the instrumentation package. 51V mates with an electrical connector which is wired by a cable to a third condenser microphone. This microphone protrudes through the top of the VR module. Refer to VR module embodiments shown in drawings FIG. 26A and FIG. 26B and FIG. 26C. This microphone listens for sounds of the game that occur on the VR venue above the top of the VR venue and above the ground. The microphone cable carries electrical sound signals from the microphone to the microphone electrical connector which is plugged into its mating electrical connector 51V on the instrumentation package shown in the referenced drawings.

The instrumentation package 11V is filled with a dry pressurized gas 47V like nitrogen to prevent the entry of moisture or dirt into its cavity. The o-ring seal between the bottom lid 12V and the enclosure prevents the dry gas 47V from leaking out of the enclosure. Dry nitrogen gas 47V is inserted into the instrumentation package 11V through gas valve 48V. A desiccant is also disposed inside the cavity of 11V to collect moisture and prevent any moisture build-up.

The instrumentation package 11V has a removable lid heat sink 12V on its bottom to allow access to the contents inside the cavity of the instrumentation package 11V. The lid heat sink 12V allows access to the battery pack 50V for servicing. The removable lid heat sink 12V also allows access to cameras 41V, 42V, 43V and 44V, camera lenses 45V, 46V, 10V and 7V, electronics 21V, 22V, 14V and 13V, quad antennas 25V, 26V, 27V and 28V, and mechanical actuating devices 19V, 20V, 18V and 17V for servicing. The lower inductive coils 5V, 6V, 33V and 34V are attached to the bottom outside of the lid heat sink 12V. The lid heat sink 12V cools the contents of the instrumentation package.

The fiber optics cable/copper cable connector 4V is attached to the electronics through the bottom of lid heat sink 12V. The lid heat sink 12V has a gas valve 48V mounted on it to allow dry nitrogen gas 47V to be injected into the cavity to pressurize the enclosure of the instrumentation package after the lid heat sink 12V is closed. The purpose of the dry nitrogen gas 47V is to protect the contents of the instrumentation package from moisture, dirt and any foreign contaminants. There is an o-ring seal around lid heat sink 12V to prevent the pressurized dry nitrogen gas from escaping from the cavity of the instrumentation package 11V enclosure.

In many venues, the four cameras are chosen to be identical to each other. However, there are occasions when one or more of the four cameras may be chosen to be different from the others in order to accomplish their joint mission of maximizing the entertainment of the VR viewing audience. For example, the view of different baseball stadiums may be covered more optimally by using a special 3-D stereo camera pair. The authorized operator can choreograph the playing field coverage and set up the VR module's cameras and their respective lens combinations like a symphony orchestra to maximize the entertainment and VR viewing pleasure of the VR audience.

Condenser microphones have good fidelity, low weight and low power consumption for their small size. In the future higher quality small sized microphones are likely to become available as the state of the art improves. It is anticipated that we will use these microphones as they become available.

Four of the instrumentation package elements, described in FIG. 12 are assembled into the instrumentation package 16 by loading their four corrugated bellows enclosure segments 32V, 49V, 39V and 40V into four mating machined seats in the hub 16V using their roller bearing ends of the enclosures. Assembling the instrumentation package elements into the instrumentation package hub 16V in this manner assures that the optical/mechanical axes of the instrumentation package elements is coincident with the mechanical axes 29V, 31V, 38V and 37V of the hub 16V respectively. The angular position of the 1st primary mechanical stop for each of the instrumentation package elements is now adjusted to be aligned with the y-axis 2V direction on the hub 16V. In particular, the 1st primary mechanical stop for each of the instrumentation package elements is precisely set at twelve o'clock and then locked in place on the hub 16V. This alignment procedure assures that cameras 43V, 44V, 42V and 41V will now produce precisely centered upright images of any objects that lie along the y-axis 2V of the hub 16V in the twelve o'clock direction relative to the hub 16V of the instrumentation package. This alignment procedure also assures that the picture frames of all six possible combinations of the four cameras 43V, 44V, 42V and 41V that make up the 3-D stereo camera pairs, are mutually congruent at each of the eight stop positions. The six possible 3-D stereo camera pairs are 41V and 42V, 41V and 43V, 41V and 44V, 42V and 43V, 42V and 44V, and 43V and 44V.

The fiber optics cable/copper cable connector 4V is offset at a distance of about ¾ of the hub radius from the center of hub 16V at twelve o'clock along the hub's y-axis 2V and is accessible from the bottom of the instrumentation package. The fiber optics cable/copper cable connector 4V lies along side and between the instrumentation package elements which it is electrically connected to.

The authorized operator software selects either the wireless mode of communication, and/or the fiber optics/copper cable mode of communication between each of the VR modules and the VR display apparatus. The authorized operator can use whichever equipment (ie fiber optics cable/copper cable) is installed in the VR venue with which to command and control his choice and communicate it to the VR modules inside the VR venue. These choices are also physically switch selectable by the authorized operator.

The authorized operator selects items from a software menu of control commands that go to the network transceiver that are subsequently transmitted to the VR module for the purpose of adjusting various system initializations, operating parameters, radio frequency, polling system status data such as battery condition, and initiating remote mechanical adjustments such as camera focus, optical zoom, iris and movement to the cameras' field of view, etc over the selected bi-directional communications link i.e. wireless radio, fiber optics or copper cable connectivity being used within the particular VR venue.

These commands, when intercepted by the network transceiver within the VR module are applied to its microprocessor, which then in turn upon executing the instructions stored within the contents of its firmware applies a pulse coded control signal via the power and control interconnect interface inside its instrumentation package to the corresponding electronics i.e. the mechanical actuators that provides optical focus and/or zoom adjustment of the cameras and microphone gain and selection, etc as desired by the authorized operator and/or special software running on the authorized operator computer. The power and control interconnect interface as shown in FIG. 19E (item 21V), which is represented by dotted lines, consists of the electrical control wiring to and from the electronic components of the VR module that are being controlled.

Figure 22A:
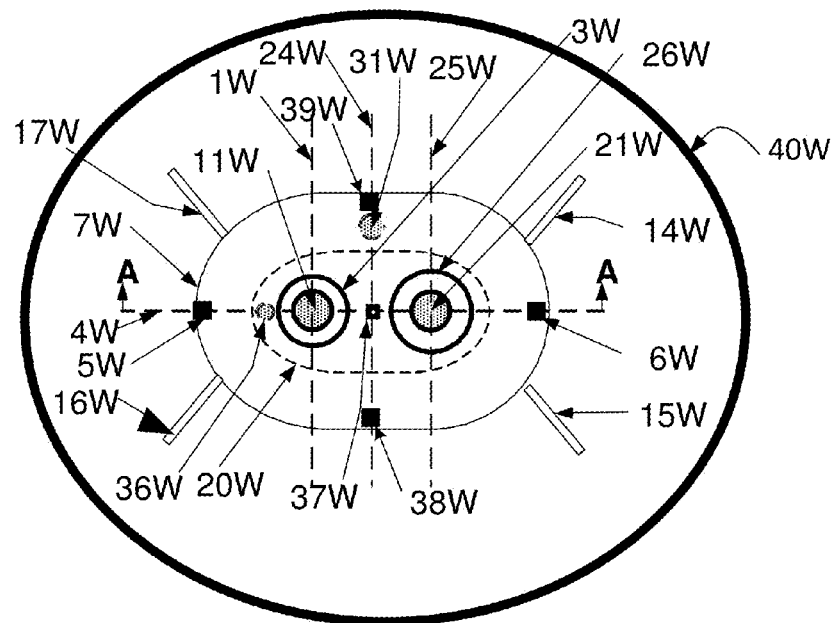
FIG. 22A shows a top view of the disk like shaped VR module having a 3-D stereo camera pair mounted on one of its flat sides.
Figure 22B:
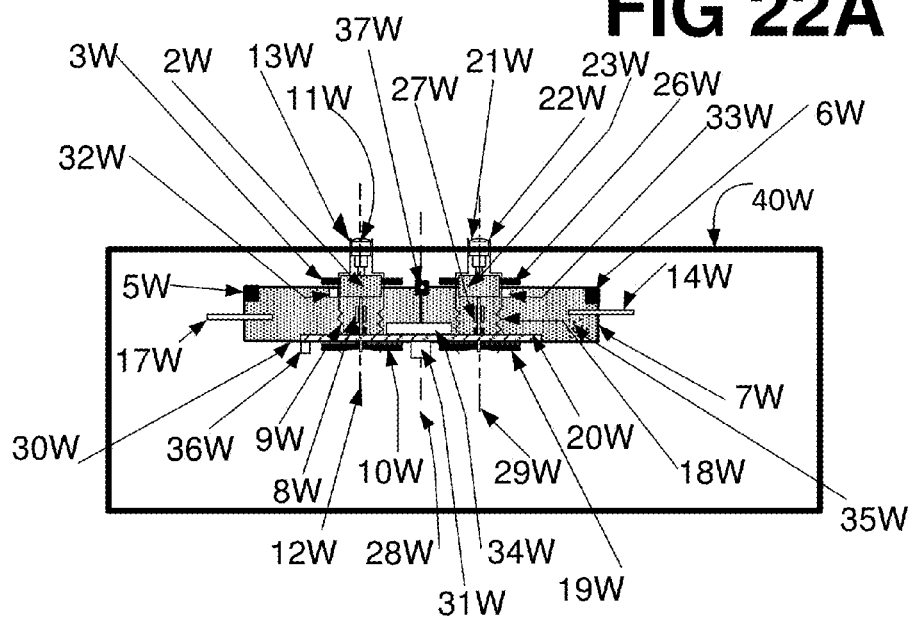
FIG. 22B shows a side view of the disk like shaped VR module having a 3-D stereo camera pair mounted on one of its flat sides.

FIG. 22A and FIG. 22B

The detailed physical elements disclosed in the VR module drawing shown in FIG. 22A and FIG. 22B, and also disclosed in the VR module's instrumentation package shown in FIG. 20A and FIG. 20B and FIG. 20C, are identified as follows: 1W is the y-axis of camera 3W. 2W is a camera. 3W is a top induction coil for charging the battery. 4W is the x-axis of symmetry of the instrumentation package. 5W is a microphone. 6W is a microphone. 7W is the instrumentation package. 8W is the electronics. 9W is the instrumentation package element showing the corrugated bellows segment. 10W is a bottom induction coil for charging the battery pack 34W. 11W is a camera lens. 12W is the optical axis of camera 2W. 13W is a camera lens. 14W is a radio antenna. 15W is a radio antenna. 16W is a radio antenna. 17W is a radio antenna. 18W is the instrumentation package element showing the corrugated bellows segment. 19W is a bottom induction coil for charging the battery pack. 20W is the bottom lid heat sink of the instrumentation package. 21W is a camera lens. 22W is a camera lens seal. 23W is a camera. 24W is the y-axis of symmetry of the instrumentation package. 25W is the y-axis of camera 23W. 26W is a top induction coil for charging the battery. 27W is the electronics. 28W is the z-axis of symmetry for the instrumentation package. 29W is the optical axis of camera 23W. 30W is the bottom of the instrumentation package. 31W is the fiber optics/copper cable connector. 32W is a camera and camera lens actuating device. 33W is a camera and camera lens actuating device. 34W is the battery pack. 35W is dry nitrogen gas. 36W is a gas valve. 37W is the physical and chemical sensor. 38W is a microphone. 39W is a microphone.

FIG. 22A shows a top view of the disk like shaped VR module having a 3-D stereo camera pair mounted on one of its flat sides.

FIG. 22B shows a side view of the disk like shaped VR module having a 3-D stereo camera pair mounted on one of its flat sides.

The VR module is deployed inside a VR venue for capturing VR media content,

In a preferred embodiment, FIG. 22A and FIG. 22B shows a disk shaped right circular cylinder VR module 40W having an array of one 3-D stereo camera pair mounted on one flat side of its disk. The lines of sight of both cameras comprising the 3-D stereo camera pair are parallel to one another. The lines of sight may be adjusted by bending the corrugated bellows that each camera is attached to. The instrumentation package is shown in detail in FIG. 20A and FIG. 20C. The lines of sight shown in FIG. 22A and FIG. 22B are perpendicular to the flat surface of the VR module. In another preferred embodiment, the lines of sight are adjusted using the corrugated bellows to look in a direction which is not perpendicular to the flat surface of the VR module. This is done in order to center objects in the field of view of the cameras that lie off to the side of the VR module.

In the preferred embodiments shown in FIG. 22A and FIG. 22B, the present VR module has an array of one 3-D stereo camera pair comprised of a first video camera and a second video camera having lines of sight pointing in the same direction zero degrees apart, for capturing video media content from the VR venue. The first video camera and the second video camera comprise a flat image sensor array of pixel elements disposed in a circular shape where the pixel elements that are disposed in the circular shape are configured in an x-y image plane centered around the optical z-axis of the flat image sensor array for capturing video media content and for enabling the CPU to process upright images of the video media content regardless of what the z-axis angular orientation of the video media content.

In an alternate preferred embodiment, the first video camera and the second video camera comprise a flat image sensor array of pixel elements disposed in a standard rectangular letterbox shape i.e. with an aspect ratio of 9/16, configured in an x-y image plane of the flat image sensor array for capturing video media content and for enabling the CPU to process the video media content. In this embodiment, the mechanical actuator would have to be relied on for the CPU to process upright images for video media content having arbitrary z-axis angular orientation.

As in previous embodiments, the corrugated bellows in the instrumentation package is for adjusting the line of sight of the 3-D stereo camera pair relative to the z-axis.

The corrugated bellows segment 9W acts to mechanically connect the camera lens 13W and electronics 8W to the main body of the instrumentation package. The corrugated bellows segment 9W is mechanically flexible. This flexibility allows the optical axis of the camera 3W and its lens 13W to be mechanically tilted relative to the z-axis 11W of the main body of the instrumentation package 7W and be pre-set in place if so desired by the authorized operator at the time the instrumentation package 7W is enclosed inside the VR module.

The corrugated bellows segment 18W acts to mechanically connect the camera lens 22W, camera 23W and electronics 27W to the main body of the instrumentation package. The corrugated bellows segment 18W is mechanically flexible. This flexibility allows the optical axis of the camera 23W and its lens 22W to be mechanically tilted relative to the z-axis 21W of the main body of the instrumentation package 7W and be pre-set in place if so desired by the authorized operator at the time the instrumentation package 7W is enclosed inside the VR module.

The corrugated bellows sections 9W and 18W of the instrumentation package are flexible and allow the sections containing the cameras 3W and 23W and their camera lenses 13W and 22W to be bent together in order to tilt the lines of sight of the camera 3W and 23W and their lenses 13W and 22W relative to the top of the instrumentation package if so desired by the authorized operator. Additionally, the corrugated sections 9W and 18W allow the instrumentation package 7W to act as a spring and absorb shocks and compress or expand its length without damaging the contents of the instrumentation package. When circumstances arise where the players tend to crush the instrumentation package 7W, it will compress or expand.

An array of four microphones comprised of a first microphone and a second microphone and a third microphone and a fourth microphone captures audio media content from the VR venue. The first microphone and the third microphone are for capturing airborne sounds, and the second microphone and the fourth microphone are for capturing conducted sounds.

In another preferred embodiment, a physical and chemical sensor 37W is for capturing the physical VR media content and a chemical VR media content i.e. like weather, temperature, humidity, the presence of gases, voltages, charge, smells, breath test, alcohol, barometric readings, shocks, vibrations etc., in the VR venue where the VR module is deployed.

A physical passage or opening exists (not shown) between 40W and 37W to permit the gases and weather etc. to be captured by 37W.

When a first VR module and a second VR module are deployed together and separated by a physical spatial distance at a VR venue, the distance between the first video camera of the first VR module, and the second video camera of the second VR module becomes the interpupillary distance.

The shape of the VR module is a disk shaped right circular cylinder. This shape is chosen for deploying the VR module's flat base surface 40W flush with the VR venue's flat surface at the position where the VR module is deployed. The shape of the VR module is a disk shaped right circular cylinder for placement of the VR module into a cylindrical bore in a chosen flat surface of the VR venue. For example, if the VR module is deployed at a basketball game, it can be mounted in the floor of the gym in a cylindrical bore. The top surface of the VR module is mounted flush with the surface of the gym floor so as not to interfere with the players. Looking up from the gym floor level, the VR module can capture awesome video media content of the game. In another example, the VR module is deployed in a boxing ring. It can be mounted in the floor of the ring in a cylindrical bore. The top surface of the VR module is a base of the cylinder and is mounted flush with the surface of the ring floor so as not to interfere with the boxers. Again, looking up from the ring floor level, the VR module can capture awesome video media content of the boxing match.

The CPU microprocessors shown in item 7W of the instrumentation package' instrumentation package element's signal and data electronics block diagram shown in FIG. 13, are configured with special software for processing the video media content and the audio media content. The CPU microprocessors process the video media content and the audio media content for recording and for storing and for retrieving the processed video media content and processed audio media content. The CPU microprocessors are further configured for processing the physical and chemical media content of the VR venue and for recording and for storing and for retrieving the processed physical and chemical media content as well.

The bi-directional communication link is configured for transmitting the processed video media content and the processed audio media content via a wired communication link and a wireless communication link, to the VR viewing audience and to the antenna array relay junction, and to an authorized operator, and to a TV viewing audience and to a streaming Internet audience. The bi-directional communication link is also configured for transmitting the processed physical and chemical media content to the antenna array relay junction.

The bi-directional communication link is further configured for receiving command and control signals from an authorized operator. The command and control signals are for controlling the electronic, optical and mechanical functions of said VR module object i.e. mechanical function like movements, mechanical actuator etc. The bi-directional communication link is further configured for transmitting status signals to said authorized operator, and where the status signals are for notifying said authorized operator of the state of the electronic, optical and mechanical functions of the VR module object i.e. navigating.

The antenna array relay junction is configured for receiving the processed video media content and the processed audio media content via a wired communication link and a wireless communication link from the VR module.

The antenna array relay junction is also configured for transmitting the processed video media content and the processed audio media content to a VR viewing audience, and to an authorized operator. The VR audience can be live or waiting for a recording.

The antenna array relay junction is further configured for receiving said processed physical and chemical state media content via at least one of a wired communication link and wireless communication link, and The antenna array relay junction is even further configured for transmitting the processed physical and chemical media content to a VR viewing audience and to an authorized operator.

The authorized operator's laptop computer is configured for transmitting the command and control signals to the bi-directional communication link for controlling the electronic, optical and mechanical functions of the VR module. The laptop computer is even further configured for receiving the processed video media content and the processed audio media content and the processed physical and chemical media content from the fixed VR module, via a wired communication link and a wireless communication link, for notifying said authorized operator of the status of the VR module's electronic, mechanical and optical functions. There can be more than one authorized operator.

The laptop computer is yet further configured for enabling the selection of the interpupillary distance of said 3-D stereo camera pairs for a VR module by the authorized operator for increasing or decreasing the 3-D effects to the VR viewing audience. The laptop computer is yet further configured for enabling the selection of the interpupillary distance of two physically separated 3-D stereo camera pairs i.e. for two physically separated VR modules at a VR venue by the authorized operator for increasing or decreasing the 3-D effects to the VR viewing audience.

What is claimed as being new and desired to be protected by Letters Patent of the United States is as follows:

1. At least one VR camera set-up system object deployed inside a venue for capturing video media content and audio media content, each comprising:
    an array of two 3-D stereo camera pairs, each comprised of:
        a first 3-D video camera and a second 3-D video camera having lines of sight pointing in opposite directions for capturing said video media content, and
    an array of at least two dual microphones comprised of:
        a first dual microphone comprised of a first microphone and a second microphone
        a second dual microphone comprised of a third microphone and a fourth microphone for capturing said audio media content, and
    a CPU for processing said video media content and said audio media content for creating at least one of a archival multimedia database and a real-time multimedia database for transmitting to a VR viewing audience, and
    a robotic mobile platform for transporting said VR camera set-up system object from place to place inside said venue under the control of a laptop computer operated by an authorized operator, and
    a gyroscope transducer configured for encoding and for transmitting pitch, roll, and yaw orientation data of said VR camera set-up system object to said CPU, and
    a physical and chemical sensor for capturing at least one of a physical media content and a chemical media content.

2. The at least one VR camera set-up system object of claim 1, wherein said laptop computer is for controlling a interpupillary distance for controlling 3-D effects.

3. The at least one VR camera set-up system object of claim 2, wherein a first VR camera set-up system object and a second VR camera set-up system object deployed and separated by a controlled physical distance for varying said interpupillary distance for changing said 3-D effects.

4. The at least one VR camera set-up system object of claim 1, wherein said CPU is furthermore for processing said pitch, roll, and yaw orientation data for stabilizing said video media content and said audio media content.

5. The at least one VR camera set-up system object of claim 1, wherein said robotic mobile platform is navigated both between pre-determined points and arbitrary points inside said venue by said laptop computer.

6. The at least one VR camera set-up system object of claim 1, wherein said CPU is further configured for processing said video media content for producing upright images.

7. The at least one VR camera set-up system object of claim 1, wherein said first microphone and said third microphone are for capturing airborne sounds, and said second microphone and said fourth microphone are for capturing conducted sounds.

8. The at least one VR camera set-up system object of claim 1, wherein said CPU is furthermore configured for processing said physical media content and said chemical media content for creating at least one of a physical and chemical archival multimedia database and a real-time physical and chemical multimedia database for transmitting to said VR viewing audience.

9. At least one VR module object deployed inside a venue for capturing video media content, each said VR module object comprising:
- an array of four 3-D stereo camera pairs mounted in an x-y plane around the rim of a symmetrical structure
  - wherein said symmetrical structure has a z-axis of rotational symmetry wherein each said 3-D stereo camera pair has a line of sight looking radially outward from said z-axis of rotational symmetry in a direction perpendicular to said z-axis of rotational symmetry,
  - wherein the four said 3-D stereo camera pairs each has an identical picture frames having a letterbox format,
  - wherein each of the four said identical picture frames has a angular field of view in the height dimension of its said letterbox format,
  - wherein each of the four said 3-D stereo camera pairs are equally angularly spaced around the rim of said symmetrical structure by an angular amount equal to said angular field of view in the height dimension,
  - wherein the x-y plane of said symmetrical structure is perpendicular to said z-axis of rotational symmetry, and
- a CPU configured for processing and joining each of the abutting widths of said identical picture frames each having said letterbox format and having been simultaneously captured by each of the four said 3-D stereo camera pairs thereby producing a seamless continuous 360 degree annular field of view collage of said identical picture frames without artifacts, and
- a means for causing said VR module object to revolve about an axis of symmetry perpendicular to said z-axis of rotational symmetry thereby producing a collage of said identical picture frames covering a entire 360 degree three dimensional spatial sphere surrounding said VR module object.

10. The at least one VR module object of claim 9, wherein said CPU is configured for processing a seamless collage of said identical picture frames by joining each of the abutting heights of said identical picture frames simultaneously captured by each of the four said 3-D stereo camera pairs as said VR module object revolves about an axis of symmetry perpendicular to said z-axis of rotational symmetry thereby producing a seamless continuous 360 degree field of view data base collage of pictures covering said entire 360 degree three dimensional spatial sphere surrounding said VR module object without artifacts.

11. The at least one VR module object of claim 9, wherein the form of said symmetrical structure is a disk shaped right circular cylinder.

12. The at least one VR module object of claim 10, wherein said CPU is further configured for recording and for storing and for retrieving said 360 degree field of view data base collage of pictures.

13. A method of configuring a venue for capturing video media content and audio media content of said venue for transmission to a VR viewing audience, comprising:
  a. machining a physical surface of said venue with a pattern of sequentially spaced contiguous right circular cylindrical holes,
  b. mounting a VR module object in each of the holes flush with said physical surface, wherein each said VR module object has the form of a disk-like right circular cylinder,
  c. configuring a bi-directional communication link in said venue having at least one of a wired communication link and a wireless communication link from each said VR module object for transmitting said video media content and said audio media content to said VR viewing audience.

14. The method of claim 13, wherein said physical surface is a floor of said venue wherein each said VR module object looks upward from said floor.

* * * * *